(12) United States Patent
Wu et al.

(10) Patent No.: US 11,141,018 B2
(45) Date of Patent: Oct. 12, 2021

(54) HOUSING ASSEMBLY AND COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Yuquan Wu, Foshan (CN); Chuanbin Zhu, Foshan (CN); Wei Yuan, Foshan (CN); Yuehong Qu, Foshan (CN); Wei Chen, Foshan (CN); Xianhuai Chen, Foshan (CN); Zhengting Fu, Foshan (CN); Linbo Zhu, Foshan (CN); Zhixiao Luo, Foshan (CN)

( * ) Notice: Subject to any disclaimer, the term of this patent is extended or adjusted under 35 U.S.C. 154(b) by 289 days.

(21) Appl. No.: 16/492,169

(22) PCT Filed: Dec. 6, 2017

(86) PCT No.: PCT/CN2017/114776
§ 371 (c)(1),
(2) Date: Sep. 9, 2019

(87) PCT Pub. No.: WO2018/161660
PCT Pub. Date: Sep. 13, 2018

(65) Prior Publication Data
US 2020/0037805 A1 Feb. 6, 2020

(30) Foreign Application Priority Data

Mar. 9, 2017 (CN) .......................... 201710138013.9
Mar. 9, 2017 (CN) .......................... 201710138784.8
(Continued)

(51) Int. Cl.
*A47J 27/088* (2006.01)
*A47J 27/00* (2006.01)
*H05B 6/12* (2006.01)

(52) U.S. Cl.
CPC ........... *A47J 27/088* (2013.01); *A47J 27/002* (2013.01); *A47J 27/004* (2013.01); *H05B 6/12* (2013.01); *H05B 2206/02* (2013.01)

(58) Field of Classification Search
CPC ...... H05B 6/12; H05B 6/1209; H05B 6/1227; H05B 6/1245; H05B 6/36; A47J 27/088
See application file for complete search history.

(56) References Cited

U.S. PATENT DOCUMENTS 9,220,277 B1 * 12/2015 Allen .................. A21B 3/137
2019/0301744 A1 * 10/2019 Yang ..................... F24C 3/122

FOREIGN PATENT DOCUMENTS

| CN | 1714722 A | 1/2006 |
|---|---|---|
| CN | 201243972 Y | 5/2009 |

(Continued)

*Primary Examiner* — John J Norton
(74) *Attorney, Agent, or Firm* — Kilpatrick Townsend & Stockton

(57) ABSTRACT

The present disclosure provides a housing assembly and a cooking appliance. The housing assembly includes a metal housing and an insulating member. The metal housing takes the shape of a disconnected ring on the whole, with a notch formed at a disconnected portion of the metal housing; the insulating member connects a disconnected end of the metal housing and covers the notch so that the housing assembly forms a closed-loop open circuit structure. According to the housing assembly provided by the present disclosure, as the metal housing is disconnected, and the disconnected portion of the metal housing is connected by the insulating member, so that the housing assembly is disconnected on the circuit, therefore, the magnetic field induction of the metal housing can be weaken to reduce the temperature rise.

18 Claims, 39 Drawing Sheets

(30) Foreign Application Priority Data

Mar. 9, 2017 (CN) .......................... 201720226072.7
Mar. 9, 2017 (CN) .......................... 201720226804.2

(56) References Cited

FOREIGN PATENT DOCUMENTS

| | | | |
|---|---|---|---|
| CN | 202386472 | U | 8/2012 |
| CN | 202515459 | U | 11/2012 |
| CN | 202723607 | U | 2/2013 |
| JP | H03182213 | A | 8/1991 |
| KR | 100875308 | B1 | 10/2008 |
| KR | 100875308 | B1 * | 12/2008 |
| KR | 1020100102314 | A | 9/2010 |
| WO | 2008043127 | A | 4/2008 |

* cited by examiner

G-G

K'-K'

M'-M'

N'-N'

R'-R'

HOUSING ASSEMBLY AND COOKING APPLIANCE

CROSS-REFERENCES TO RELATED APPLICATIONS

The present disclosure claims the priority of Chinese Application No. 201710138013.9, filed in the Chinese Patent Office on Mar. 9, 2017, and entitled "HOUSING ASSEMBLY AND COOKING APPLIANCE", Chinese Application No. 201720226072.7, filed in the Chinese Patent Office on Mar. 9, 2017, and entitled "HOUSING ASSEMBLY AND COOKING APPLIANCE", Chinese Application No. 201720226804.2, filed in the Chinese Patent Office on Mar. 9, 2017, and entitled "HOUSING ASSEMBLY AND COOKING APPLIANCE", and Chinese Application No. 201710138784.8, filed in the Chinese Patent Office on Mar. 9, 2017, and entitled "HOUSING ASSEMBLY AND COOKING APPLIANCE", the entire contents of which are herein incorporated by reference.

FILED

The present disclosure relates to the field of kitchen appliances, and particularly relates to a housing assembly and a cooking appliance including the housing assembly.

BACKGROUND

At present, for IH rice cookers and other electromagnetic induction heating cooking appliances, a metal housing thereof is generally formed integrally by adopting a tail end riveting mode, such that the metal housing forms a closed loop and is liable to sensing a magnetic field generated by an electromagnetic coil disk to generate heat, thus resulting in a very high temperature.

SUMMARY

Embodiments of the present disclosure provides a housing assembly.

In one embodiment, provided is a housing assembly for an electromagnetic induction heating cooking appliance, the housing assembly being sleeved on the outer side of a liner of the cooking appliance, the housing assembly including: a metal housing which is an annular housing on the whole with one or a plurality of disconnected potions, with one or a plurality of notches correspondingly formed at each of the disconnected portions of the metal housing; and one or a plurality of insulating members, each connecting two ends of one of the disconnected portions of the metal housing and covering the notch correspondingly formed by the one of the disconnected portions so that the housing assembly forms a closed-loop open circuit structure.

Embodiments of the present disclosure discloses, as the metal housing is of disconnected potions, and the disconnected potions of the metal housing are connected by the insulating member, so that the housing assembly is open on the circuit, therefore, the magnetic field induction of the metal housing can be weaken to reduce the temperature rise, and the problem that the metal housing forms a closed loop circuit to easily induce a magnetic field generated by an induction coil disk to produce heat, resulting in too high temperature rise in the prior art is solved; and the insulating member connects the disconnected portion of the metal housing and covers the notch so that the housing assembly forms the closed loop structure, thereby guaranteeing the integrity of the housing assembly, and guaranteeing the appearance of the cooking appliance as a result.

In one embodiment In one embodiment, a buckle is arranged on one of the metal housing and the insulating member, a clamping hole is formed in the other of the metal housing and the insulating member, and the buckle is matched with the clamping hole, so that the metal housing is clamped with the insulating member.

some embodiments, locating ribs matched with the notch are arranged on the insulating member.

In some embodiments, a plurality of locating ribs are disposed, and the plurality of locating ribs are arranged in parallel along the axial direction of the metal housing.

In one embodiment, In one embodiment, the metal housing is an insert, the insulating member is made of plastic, and the insulating member and the metal housing are integrally formed by injection molding.

In one embodiment, in which the insulating member is partially embedded is formed in the metal housing; and/or, a stopper protrusion is arranged on the metal housing, and the stopper protrusion is embedded in the insulating member.

In one embodiment, the number of the insulating members is equal to the number of the notches, and the insulating members correspond to the notches one by one.

In one embodiment, a clamping hole is formed in one of the metal housing and the insulating member, a clamping member is arranged on the other of the metal housing and the insulating member, and the clamping member is matched with the clamping hole, so that the insulating member is clamped with the metal housing.

In one embodiment, In one embodiment, the clamping member is a L-shaped buckle, and the L-shaped buckle penetrates the clamping hole and abuts against the one of the metal housing and the insulating member.

In one embodiment, the number of L-shaped buckles is plural and are divided into two groups, and the two groups of L-shaped buckles are respectively located on the two sides of the notch; the two groups of L-shaped buckles face to the same direction; or, the L-shaped buckles are located on the insulating member, and the two groups of L-shaped buckles face to the notch; or, the L-shaped buckles are located on the metal housing, and the two groups of L-shaped buckles face away from the notch.

In one embodiment, a barb is arranged at the tail of at least one of the L-shaped buckles in each group of L-shaped buckles, a bump is arranged on one of the metal housing and the insulating member, and the barb is hooked on the bump.

In one embodiment, In one embodiment, the clamping member comprises a plurality of elastic buckles, and the plurality of elastic buckles are arranged back to back and enclose an elastic column buckle; or, the clamping member comprises a connecting column with a radial through hole and a spring latch matched with the radial through hole, and the connecting column penetrates the clamping hole, and the spring latch penetrates the radial through hole and is clamped on the connecting column.

In one embodiment, a rim for protecting the clamping member is arranged on the peripheral edge of the clamping hole.

In one embodiment, a through hole is formed in one of the metal housing and the insulating member, and a connecting column having the ability of plastic deformation is arranged on the other of the metal housing and the insulating member; the connecting column penetrates the clamping hole, a portion of the connecting column protruding from the through hole deforms into a stopper projection with a section size being greater than the size of the through hole, and the stopper projection abuts against the one of the metal housing and the insulating member, so that the insulating member is fixedly connected with the metal housing.

In one embodiment, when the connecting column is arranged on the metal housing, the connecting column is a hollow connecting column.

In one embodiment, through holes are formed in both of the insulating member and the metal housing, a fastener penetrates the through holes in the insulating member and the metal housing, so that the insulating member is fixedly connected with the metal housing; or a jagged through hole is formed in one of the metal housing and the insulating member, a connecting column is arranged on the other of the metal housing and the insulating member, and the connecting column penetrates the jagged through hole and is limited in the jagged through hole, so that the insulating member is fixedly connected with the metal housing.

In one embodiment, a folded plate is arranged on the metal housing, a connecting hole matched with the folded plate is formed in the insulating member, and the folded plate is pressed on the insulating member after penetrating the connecting hole, so that the insulating member is fixedly connected with the metal housing.

In one embodiment, a boss is further arranged on the insulating member, the boss is located on an edge of the connecting hole, and the folded plate is firstly bent and pressed on the boss and then is bent and pressed on the insulating member.

In one embodiment, edges of the metal housing located on two sides of the notch are bent to form two first rail grooves with opposite openings, two ends of the insulating member are bent to form two second rail grooves with opposite openings, and the two first rail grooves are hooked with the two second rail grooves, so that the insulating member is fixedly connected with the metal housing.

In one embodiment, the openings of the two first rail grooves face away from the notch, and the openings of the two second rail grooves face to the notch.

In one embodiment, a free end of one of the first rail grooves and the second rail grooves is provided with a folded edge, and the folded edge abuts against the other of the first rail groove and the second rail groove.

In one embodiment, the number of the insulating member are plural, each of the insulating member comprise a first insulating member and a second insulating member, and the first insulating member and the second insulating member connect the ends of one of the disconnected portions of the metal housing and cover the notch correspondingly formed at this disconnected portion, so that the housing assembly forms the closed-loop open circuit structure.

In one embodiment, In one embodiment, the first insulating member and the second insulating member are located on different sides of inner and outer sides of the metal housing; or, the first insulating member and the second insulating member are located on the same side of the metal housing, and the second insulating member is located between the first insulating member and the metal housing.

In one embodiment, one or a plurality of clamping members are arranged on the first insulating member, one or a plurality of first clamping holes and one or a plurality of second clamping holes are formed in the metal housing and the second insulating member respectively, and each of the clamping member is matched with corresponding first clamping hole and second clamping hole, so that the first insulating member and the second insulating member are clamped on the metal housing.

In one embodiment, the clamping member is an L-shaped buckle, which penetrates the first clamping hole and the second clamping hole and is locked on one, which is away from the first insulating member, of the metal housing and the second insulating member.

In one embodiment, the number of the L-shaped buckle are plural and are divided into two groups, and the two groups of the L-shaped buckles are located on the two sides of the notch respectively; the two groups of the L-shaped buckles face to the same direction; or, the two groups of the L-shaped buckles face to the notch.

In one embodiment, in each group of the L-shaped buckles, a barb is arranged at the tail of at least one of the L-shaped buckles, a slot or a bump is arranged on one, which is away from the first insulating member, of the metal housing and the second insulating member, and the barb is clamped in the slot or is hooked on the bump.

In one embodiment, the clamping member comprises a plurality of elastic buckles, and the plurality of elastic buckles are arranged opposite each other and enclose an elastic column buckle; or, the clamping member comprises a connecting column with a radial through hole and a spring latch matched with the radial through hole, and the connecting column penetrates the first clamping hole and the second clamping hole, and the spring latch penetrates the radial through hole and is clamped on the connecting column.

In one embodiment, a connecting column capable of plastic deformation is arranged on the first insulating member, a first through hole and a second through hole are formed in the metal housing and the second insulating member respectively, and the connecting column penetrates the first through hole and the second through hole, a portion of the connecting column protruding from the first through hole and the second through hole deforms into a stopper projection with a section size greater than the size of one, which is away from the first insulating member, of the first through hole and the second through hole, and the stopper projection abuts against one, which is away from the first insulating member, of the metal housing and the second insulating member, so that the first insulating member and the second insulating member are fixedly connected with the metal housing; or, a first connecting hole, a second connecting hole and a third connecting hole are formed in the first insulating member, the metal housing and the second insulating member respectively, and a fastener penetrates the first connecting hole, the second connecting hole and the third connecting hole, so that the first insulating member and the second insulating member are fixedly connected with the metal housing.

In one embodiment, a glue tank is formed in at least one of the first insulating member and the second insulating member, and the first insulating member and the second insulating member are adhered with the metal housing through an adhesive.

In one embodiment, a locating column is arranged on the first insulating member, a first locating hole and a second locating hole are formed in the metal housing and the second insulating member respectively, and the locating column penetrates the first locating hole and the second locating hole.

In one embodiment, the first insulating member is located on the outer side of the second insulating member along the radial direction of the metal housing.

In one embodiment, provided is a housing assembly for an electromagnetic induction heating cooking appliance, the housing assembly being sleeved on the outer side of a liner of the cooking appliance, the housing assembly including: a base; a housing cover arranged above the base; a metal housing arranged between the base and the housing cover and connected with the base and the housing cover, and the metal housing is an annular housing on the whole with a disconnected potion, with a notch formed at a disconnected portion of the metal housing; and a shielding piece, and the shielding piece is an insulating member, and the shielding piece covers the notch to form a closed-loop open circuit structure with the metal housing.

In one embodiment, as the metal housing is of disconnected portions, and the disconnected portions of the metal housing is shielded by the insulating shielding piece, so that the housing assembly is open on the circuit, therefore, the magnetic field induction of the metal housing can be weaken to reduce the temperature rise, and the problem that the metal housing forms a closed loop circuit to easily induce a magnetic field generated by an induction coil disk to produce heat, resulting in too high temperature rise in the prior art is solved; and the metal housing is connected with the base and the housing cover, that is, the metal housing is retained between the base and the housing cover, thereby ensuring that the disconnected end of the metal housing does not drop, and the shielding piece covers the notch of the metal housing, thereby guaranteeing the integrity of the housing assembly, and guaranteeing the appearance of the cooking appliance as a result.

In addition, the housing assembly In one embodiment provided by the present disclosure can also have the following additional technical features:

In one embodiment, the shielding piece is fixedly connected with the base; or, the shielding piece and the base are of an integrated structure; or, the shielding piece is fixedly connected with the housing cover; or, the shielding piece and the housing cover are of an integrated structure.

In one embodiment, the shielding piece is adhered on the metal housing; or the shielding piece is fixed to the metal housing through a fastener.

In one embodiment, the metal housing is clamped between the base and the housing cover, and the base is fixedly connected with the housing cover through a fastener; or, the metal housing is fixedly connected with the base through a fastener; or, the metal housing is fixedly connected with the housing cover through a fastener.

In one embodiment, the shielding piece is located on the inner side of the metal housing.

In one embodiment, the shielding piece is located on the outer side of the metal housing.

In one embodiment, portions of the metal housing located on two sides of the notch are depressed inward to form sinking steps matched with the size of the insulating member, so that an outer surface of the insulating member is flush with an outer surface of the metal housing.

In one embodiment, the width of the notch along the circumferential direction of the metal housing is greater than or equal to 2 mm.

In one embodiment, a mounting groove is arranged at a top end of the tail of the metal housing, the number of the notch is one, and the notch is located below the mounting groove and communicates with the mounting groove.

In one embodiment, the notch is square.

In one embodiment, provided is an electromagnetic induction heating cooking appliance, including: an electromagnetic induction heating device; a liner, and a magnetic line of flux produced by the electromagnetic induction heating device can penetrate the liner, so that the liner performs induction heating; and the housing assembly in any one of the, which is sleeved on the outer side of the liner.

One embodiment, includes the housing assembly in any one of the, the cooking appliance has all beneficial effects of any one of the above-mentioned embodiments, which will not repeated herein.

In one embodiment, the cooking appliance is an IH rice cooker or an IH electric pressure cooker.

BRIEF DESCRIPTION OF THE DRAWINGS

Embodiments of the present disclosure will become apparent and easily understood from the following description of embodiments in conjunction with the drawings.

The corresponding relationship between the reference signs and component names in FIGS. 1 to 15 are as follows:

10 metal housing, 11 notch, 12 through hole, 13 stopper protrusion, 14 clamping hole, 15 sinking step, 16 bump, 17 mounting groove, 20 insulating member, 21 buckle, 211 barb, 22 locating rib.

Figure 16:
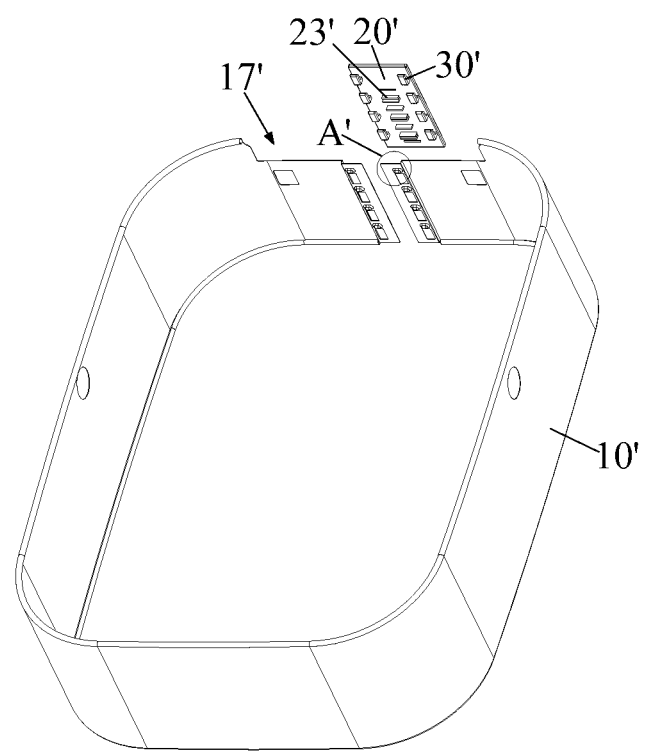
Figure 17:
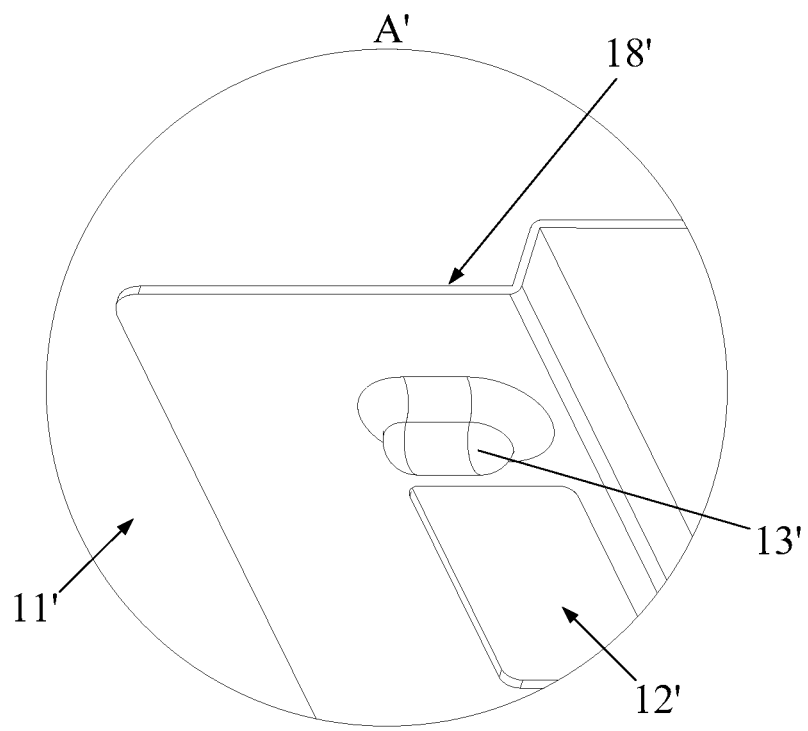
Figure 18:
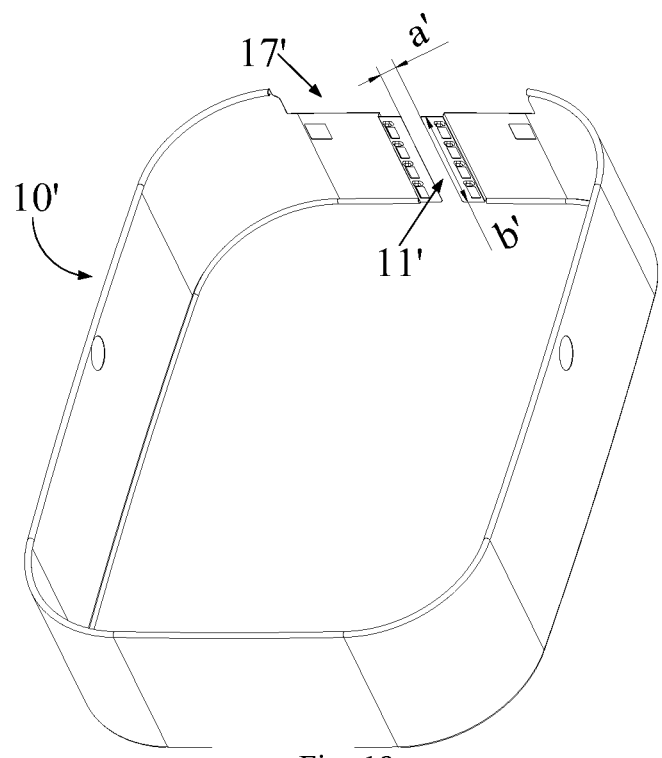
Figure 19:
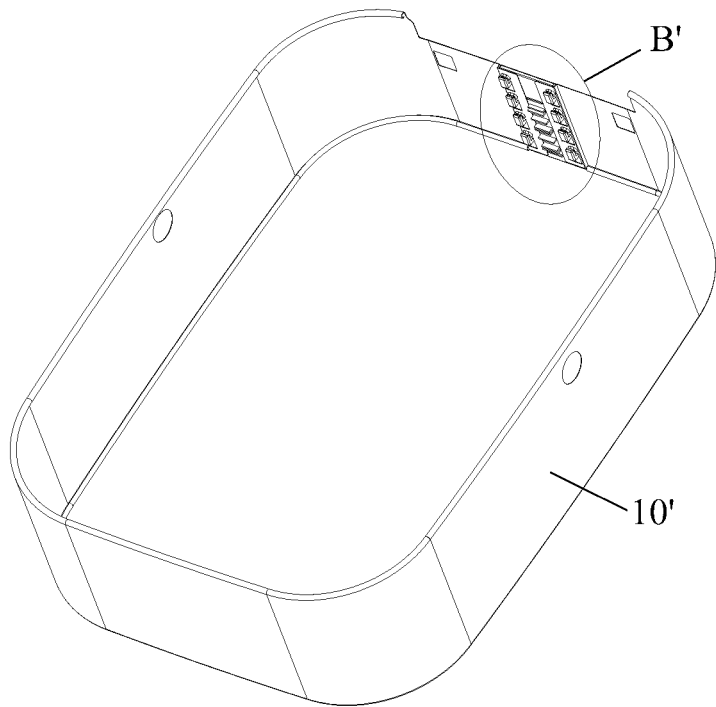
Figure 20:
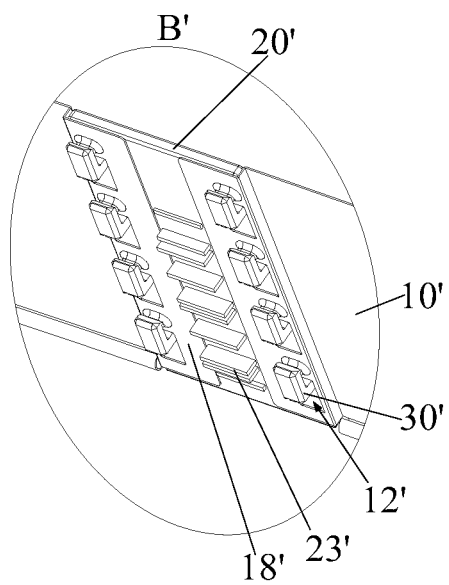
Figure 21:
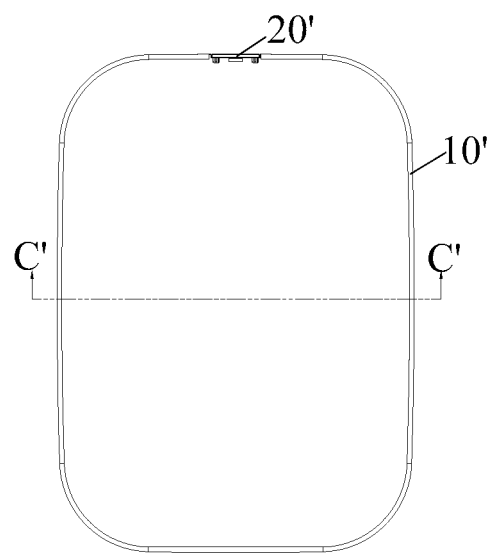
Figure 22:
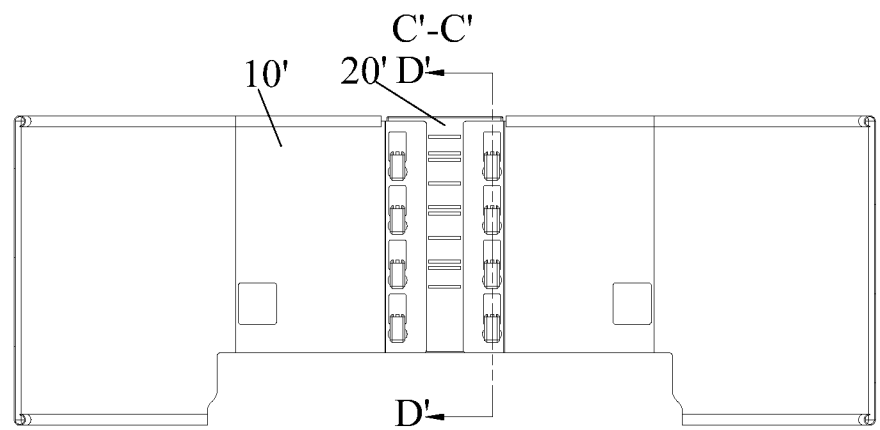
Figure 23:
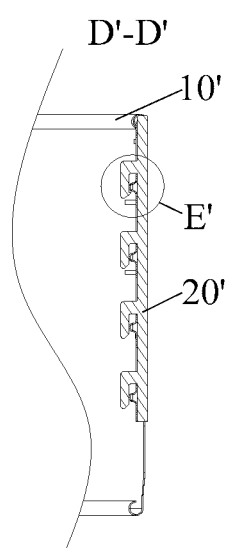
Figure 24:
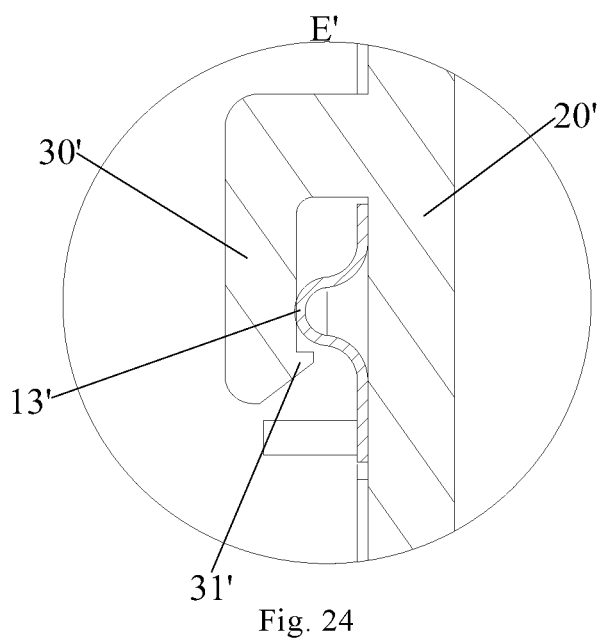
Figure 25:
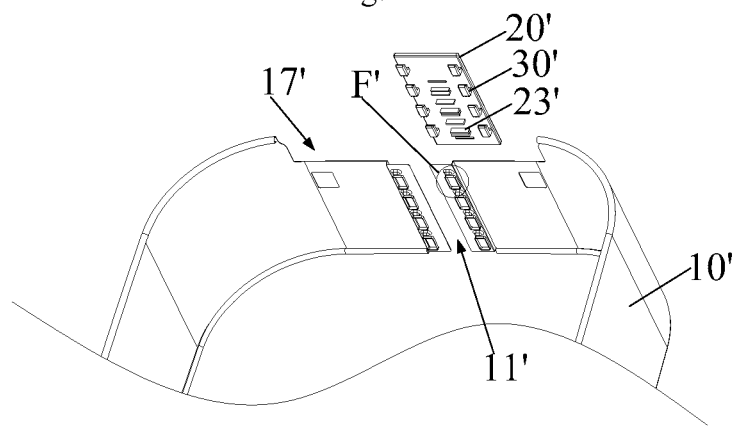
Figure 26:
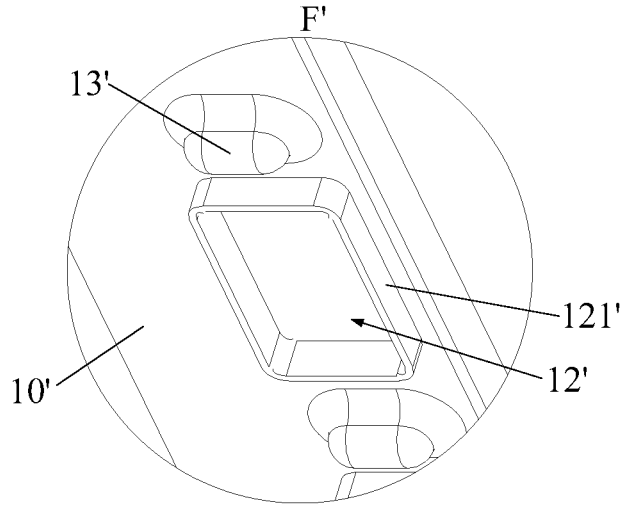
Figure 27:
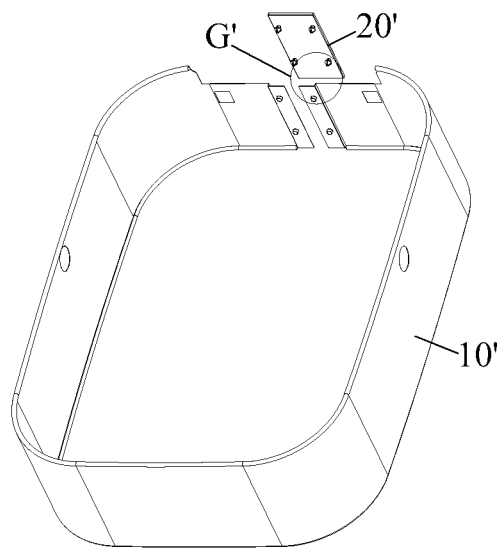
Figure 28:
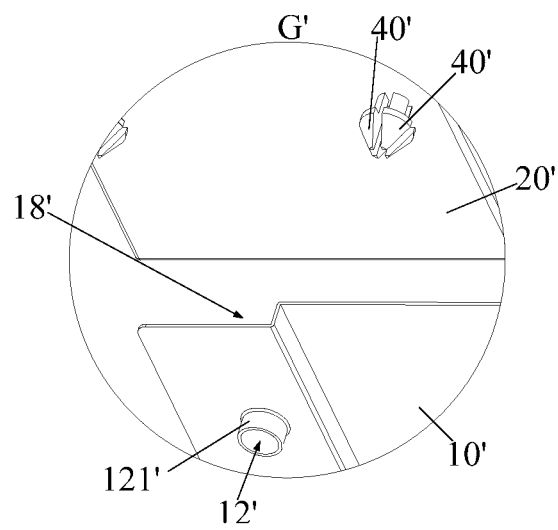
Figure 29:
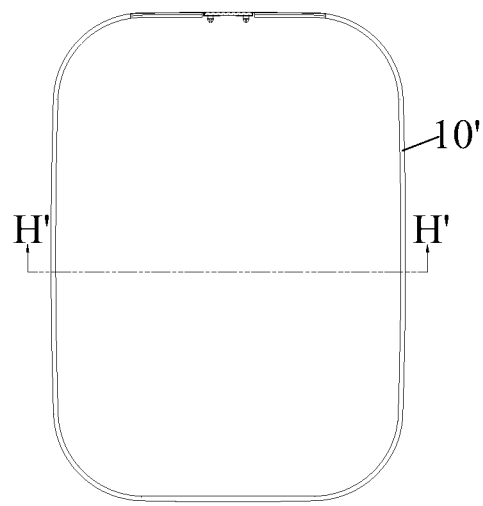
Figure 30:
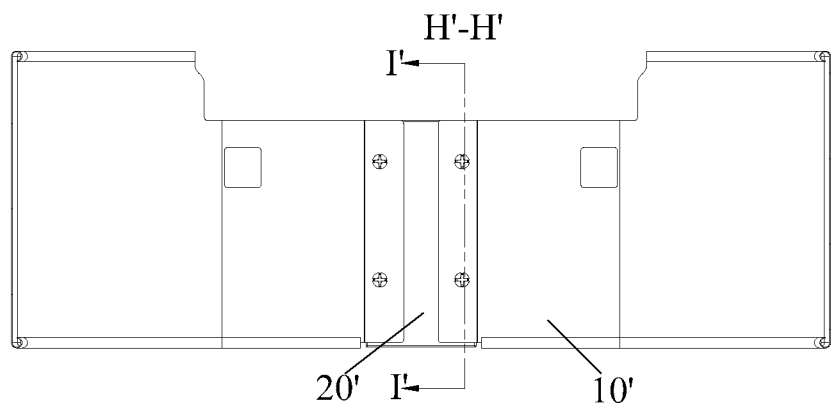
Figure 31:
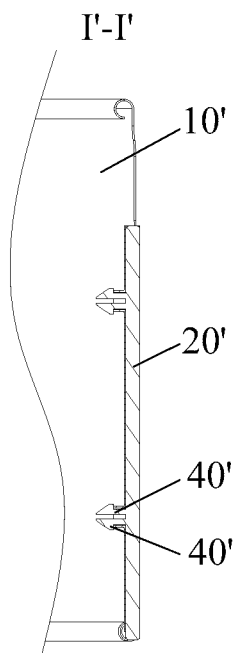
Figure 32:
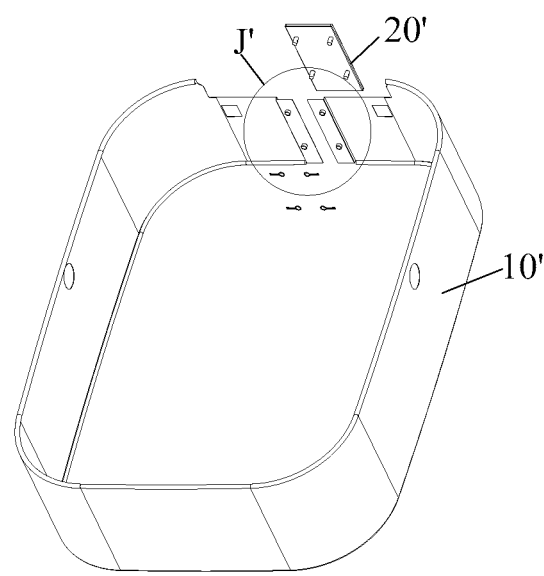
Figure 33:
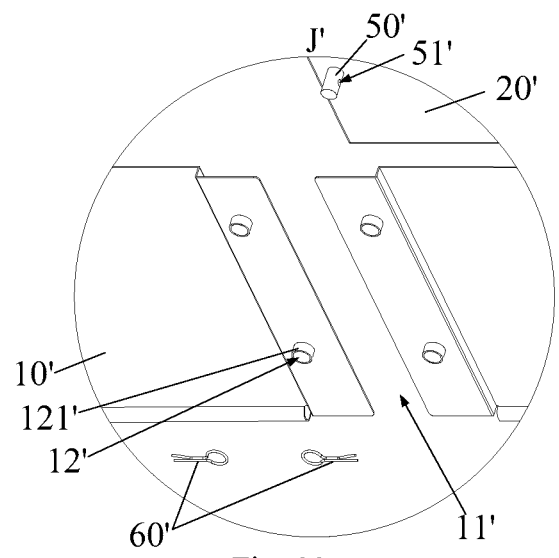
Figure 34:
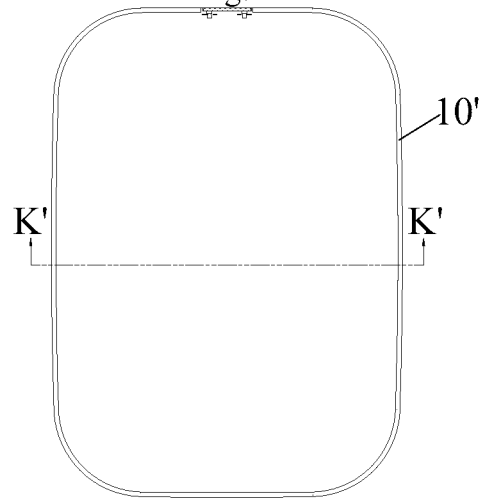
Figure 35:
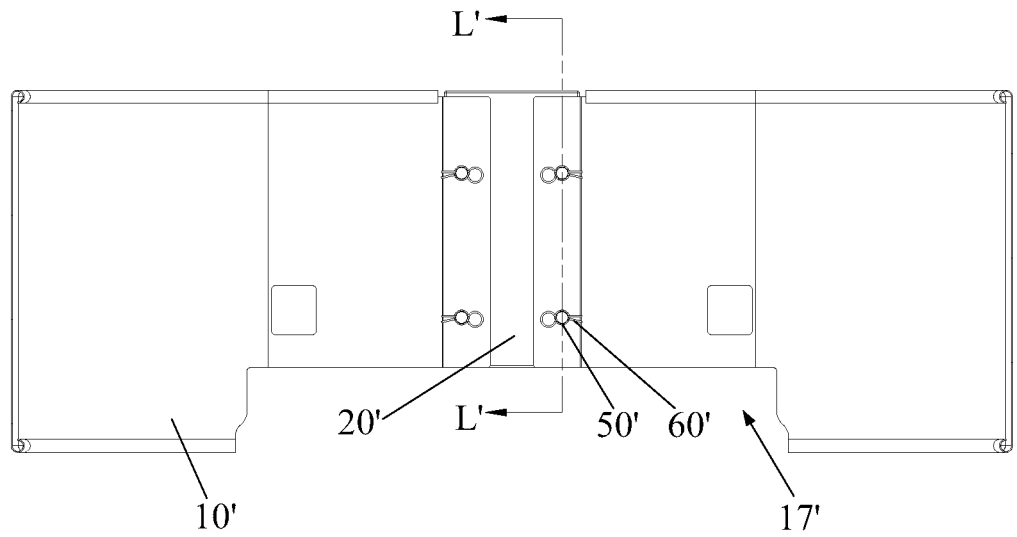
Figure 36:
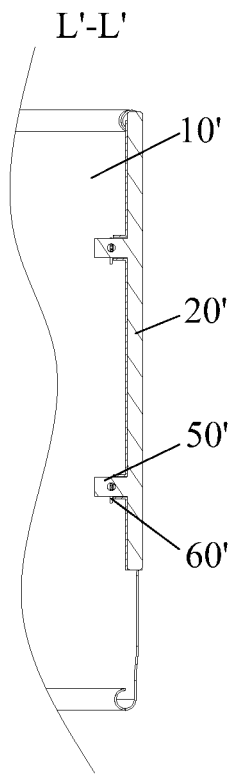
Figure 37:
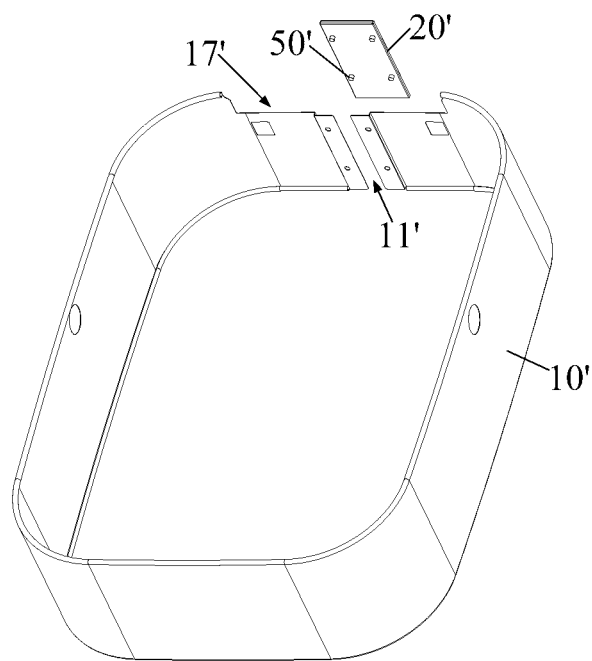
Figure 38:
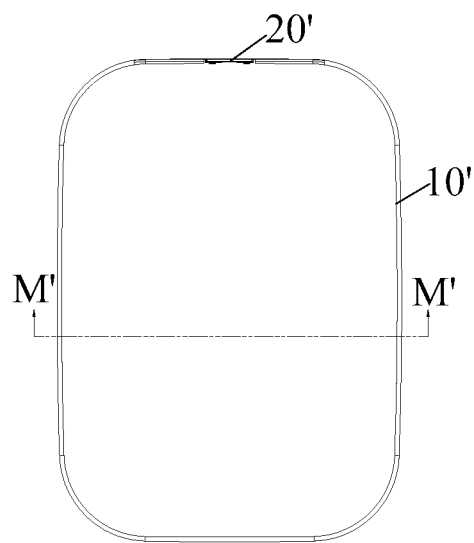
Figure 39:
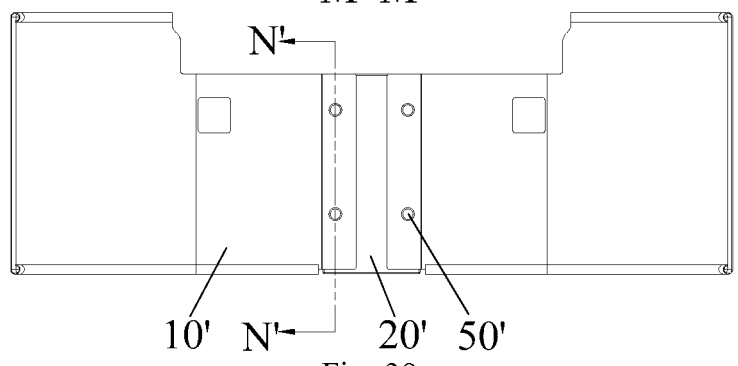
Figure 40:
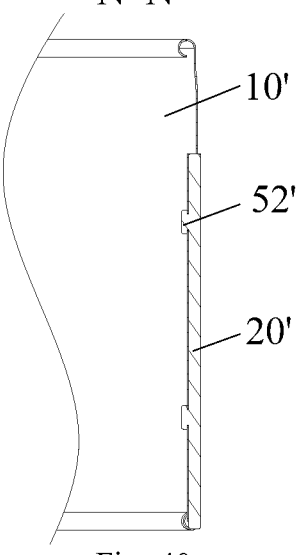
Figure 41:
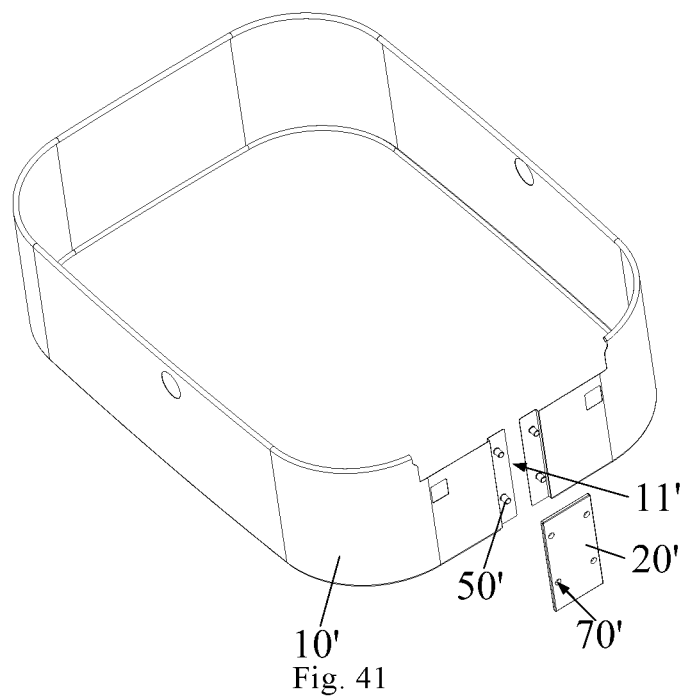
Figure 42:
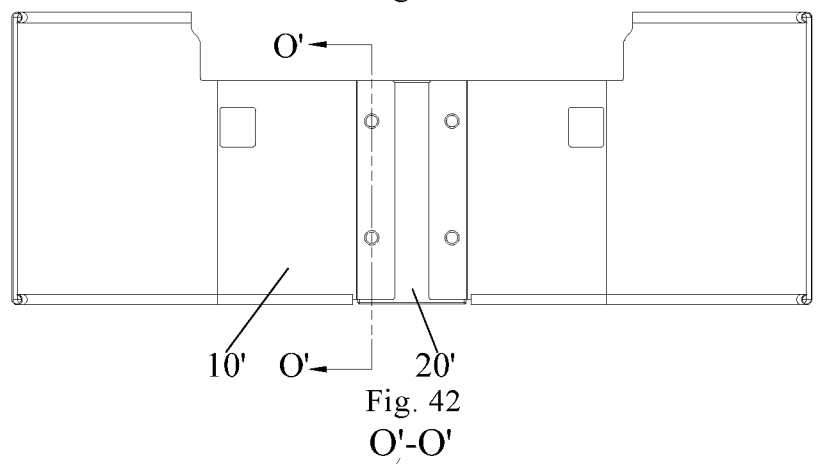
Figure 43:
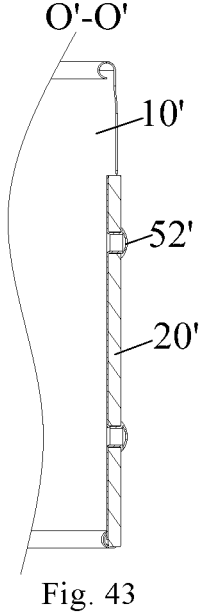
Figure 44:
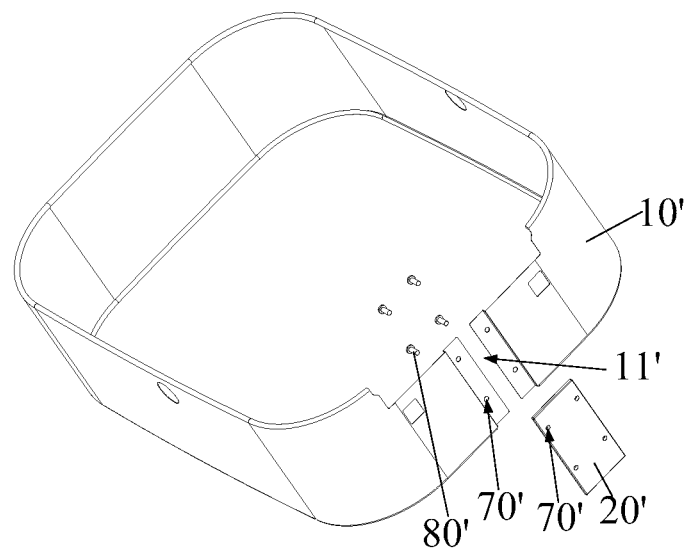
Figure 45:
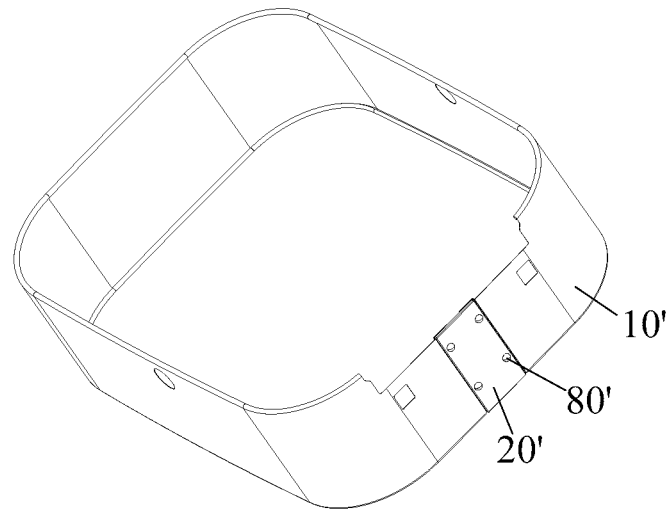
Figure 46:
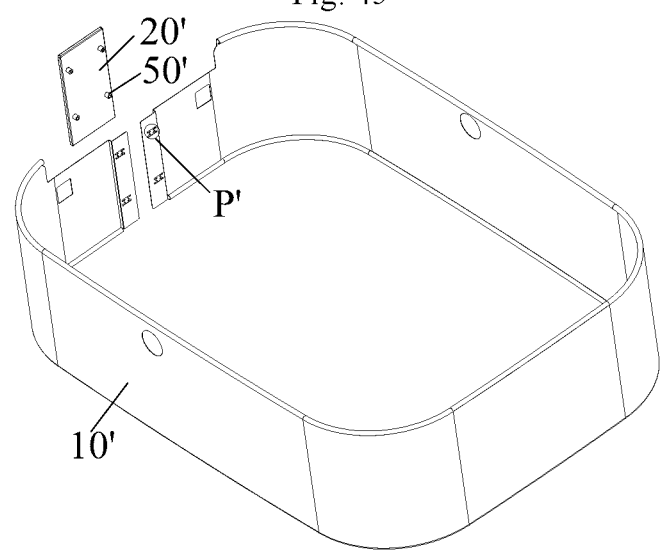
Figure 47:
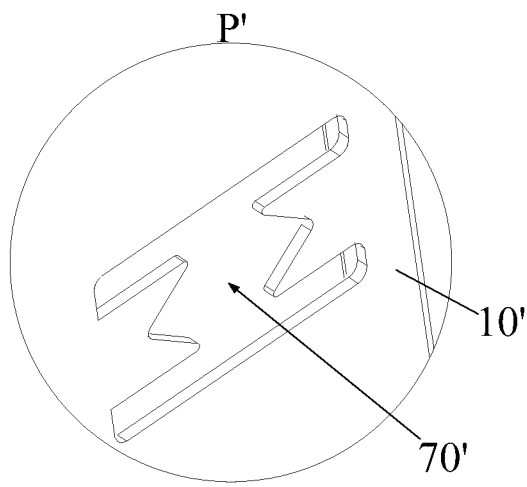
Figure 48:
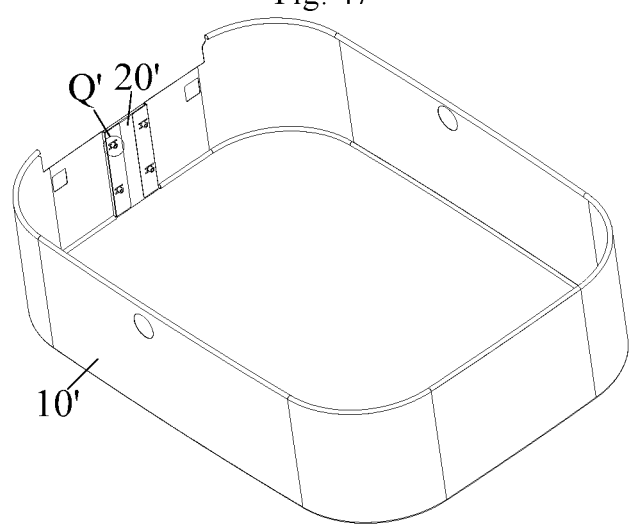
Figure 49:
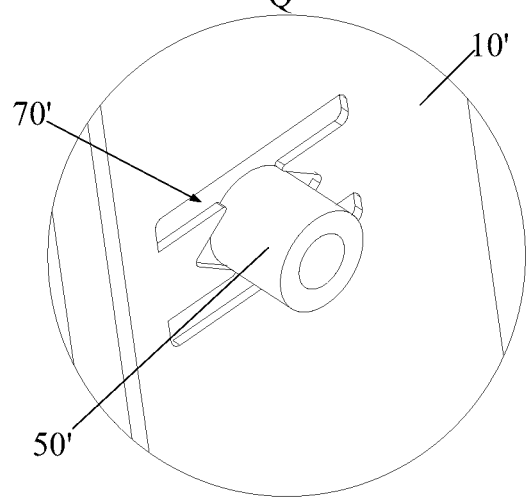
Figure 50:
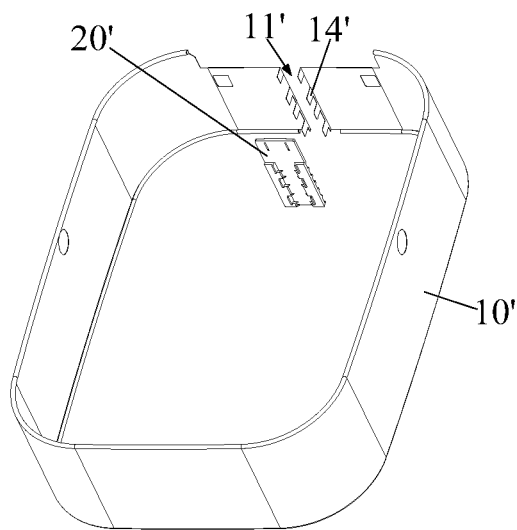
Figure 51:
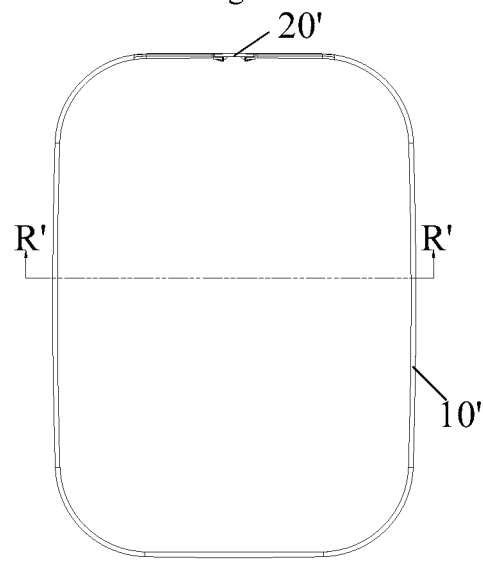
Figure 52:
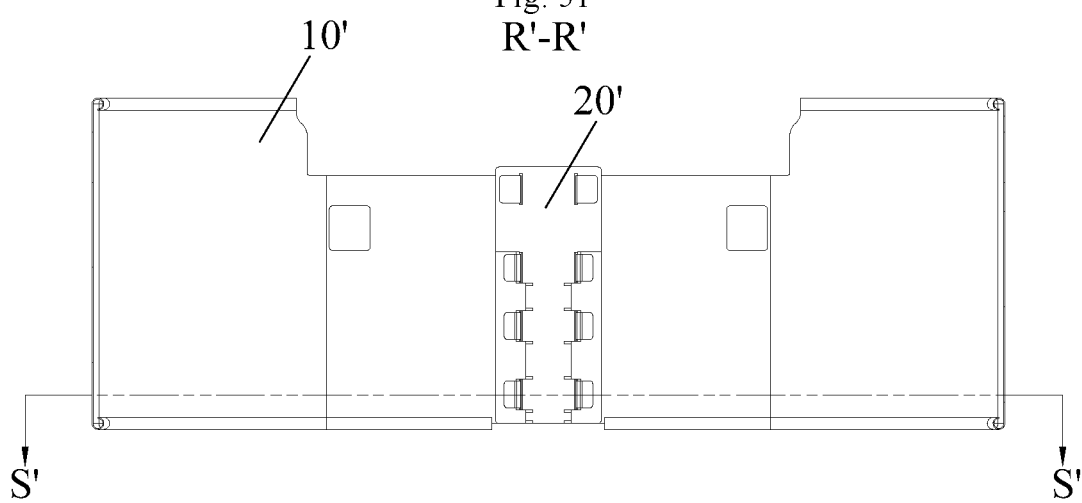
Figure 53:
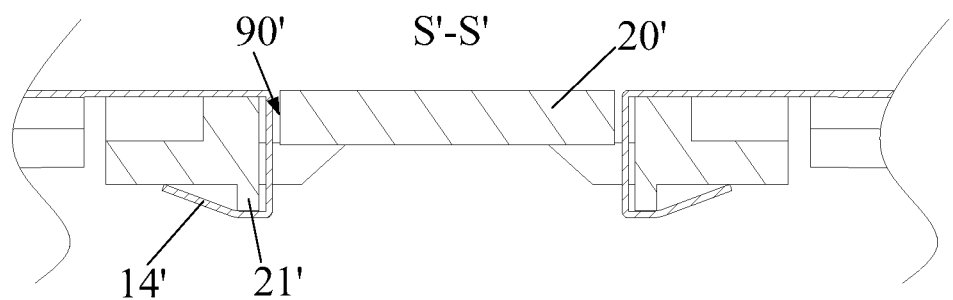
Figure 54:
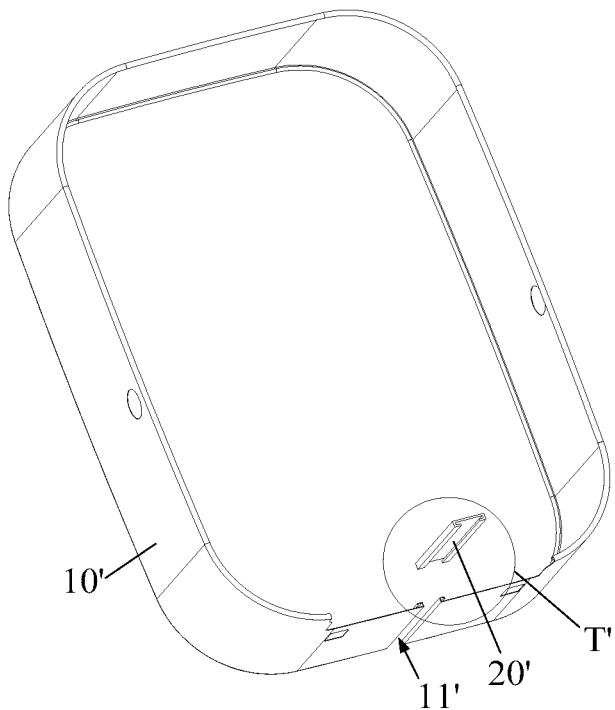
Figure 55:
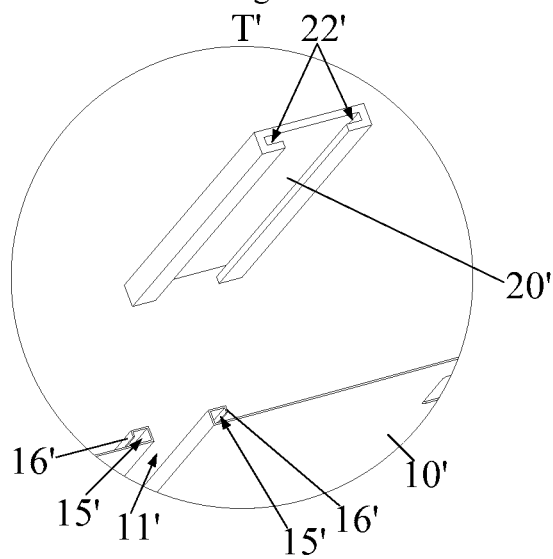
Figure 56:
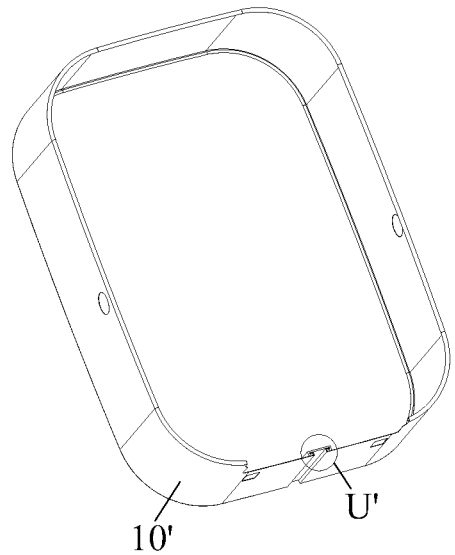
Figure 57:
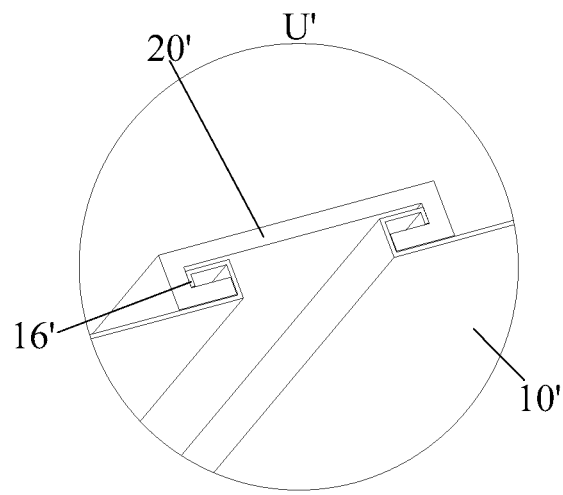

FIG. 16 is a disassembled structure diagram of a housing assembly in a third embodiment of the present disclosure;

FIG. 17 is an enlarged structure diagram of a portion A' in FIG. 16;

FIG. 18 is a stereoscopic structure diagram of a metal housing in FIG. 16;

FIG. 19 is an assembled structure diagram of the housing assembly as shown in FIG. 16;

FIG. 20 is an enlarged structure diagram of a portion B' in FIG. 19;

FIG. 21 is a top structure diagram of the housing assembly as shown in FIG. 19;

FIG. 22 is a sectional structure diagram in a C'-C' direction of the housing assembly as shown in FIG. 21;

FIG. 23 is a partial sectional structure diagram in a D'-D' direction of the housing assembly as shown in FIG. 22;

FIG. 24 is an enlarged structure diagram of a portion E' in FIG. 23;

FIG. 25 is a partial structure diagram of a housing assembly in a fourth embodiment of the present disclosure;

FIG. 26 is an enlarged structure diagram of a portion F' in FIG. 25;

FIG. 27 is a disassembled structure diagram of a housing assembly in a fifth embodiment of the present disclosure;

FIG. 28 is an enlarged structure diagram of a portion G' in FIG. 27;

FIG. 29 is a top structure diagram of the housing assembly as shown in FIG. 28;

FIG. 30 is a sectional structure diagram in an H'-H' direction of the housing assembly as shown in FIG. 29;

FIG. 31 is a partial sectional structure diagram in an I'-I' direction of the housing assembly as shown in FIG. 30;

FIG. 32 is a disassembled structure diagram of a housing assembly in a sixth embodiment of the present disclosure;

FIG. 33 is an enlarged structure diagram of a portion J' in FIG. 32;

FIG. 34 is an assembled top structure diagram of the housing assembly as shown in FIG. 32;

FIG. 35 is a sectional structure diagram in a K'-K' direction of the housing assembly as shown in FIG. 34;

FIG. 36 is a partial sectional structure diagram in an L'-L' direction of the housing assembly as shown in FIG. 35;

FIG. 37 is a disassembled structure diagram of a housing assembly in a seventh embodiment of the present disclosure;

FIG. 38 is an assembled top structure diagram of the housing assembly as shown in FIG. 37;

FIG. 39 is a sectional structure diagram in an M'-M' direction of the housing assembly as shown in FIG. 38;

FIG. 40 is a partial sectional structure diagram in an N'-N' direction of the housing assembly as shown in FIG. 39;

FIG. 41 is a disassembled structure diagram of a housing assembly in an eighth embodiment of the present disclosure;

FIG. 42 is an assembled partial structure diagram of the housing assembly as shown in FIG. 41;

FIG. 43 is a partial sectional structure diagram in an O'-O' direction of the housing assembly as shown in FIG. 42;

FIG. 44 is a disassembled structure diagram of a housing assembly in a ninth embodiment of the present disclosure;

FIG. 45 is an assembled structure diagram of the housing assembly as shown in FIG. 44;

FIG. 46 is a disassembled structure diagram of a housing assembly in a tenth embodiment of the present disclosure;

FIG. 47 is an enlarged structure diagram of a portion P' in FIG. 46;

FIG. 48 is an assembled structure diagram of the housing assembly as shown in FIG. 46;

FIG. 49 is an enlarged structure diagram of a portion Q' in FIG. 48;

FIG. 50 is a disassembled structure diagram of a housing assembly in an eleventh embodiment of the present disclosure;

FIG. 51 is an assembled top structure diagram of the housing assembly as shown in FIG. 50;

FIG. 52 is a sectional structure diagram in an R'-R' direction of the housing assembly as shown in FIG. 51;

FIG. 53 is a partial sectional structure diagram in an S'-S' direction of the housing assembly as shown in FIG. 52;

FIG. 54 is a disassembled structure diagram of a housing assembly in a twelfth embodiment of the present disclosure;

FIG. 55 is an enlarged structure diagram of a portion T' in FIG. 54;

FIG. 56 is an assembled structure diagram of the housing assembly as shown in FIG. 54;

FIG. 57 is an enlarged structure diagram of a portion U' in FIG. 56.

The corresponding relationship between the reference signs and component names in FIGS. 16 to 57 are as follows:

10' metal housing, 11' notch, 12' clamping hole, 121' rim, 13' bump, 14' folding hole, 15' first rail groove, 16' folded edge, 17' mounting groove, 18' sinking step, 20' insulating member, 21' boss, 22' second rail groove, 23' locating rib, 30' L-shaped buckle, 31' barb, 40' elastic buckle, 50' connecting column, 51' radial through hole, 52' stopper projection, 60' spring latch, 70' through hole, 80' rivet, 90' connecting hole.

Figure 58:
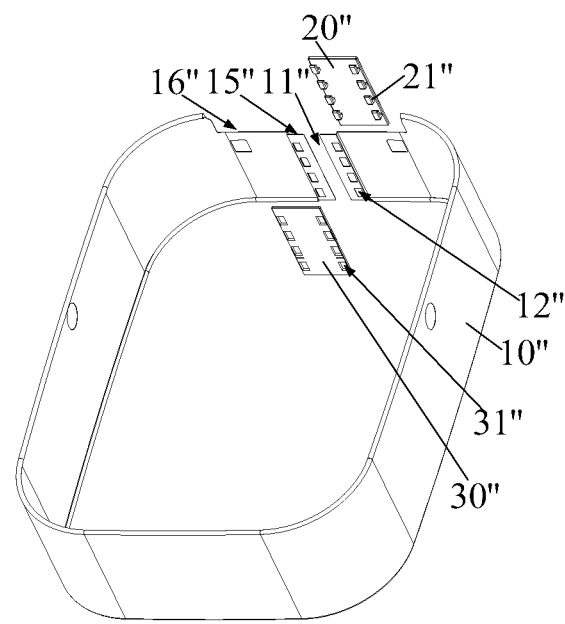
Figure 59:
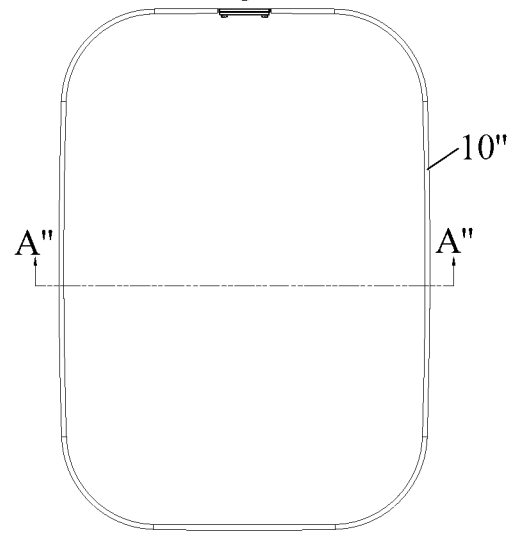
Figure 60:
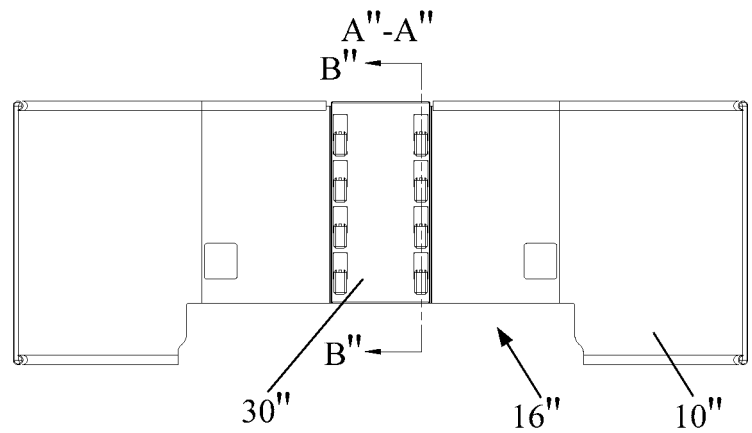
Figure 61:
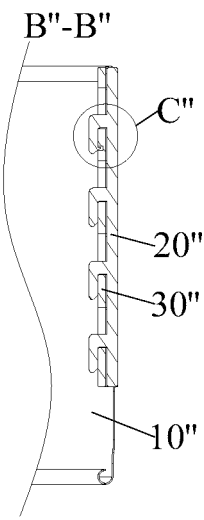
Figure 62:
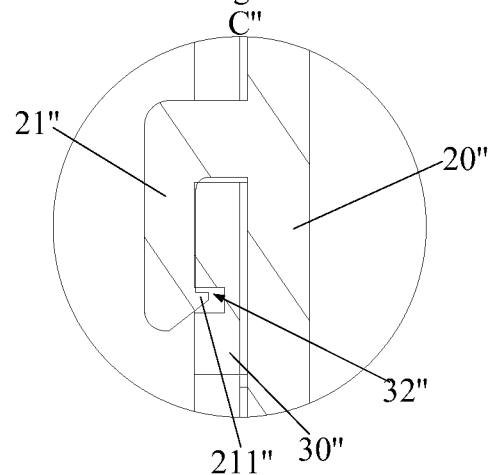
Figure 63:
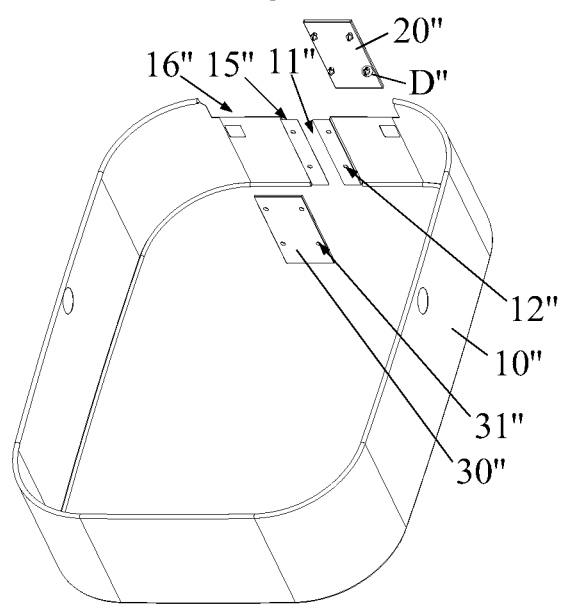
Figure 64:
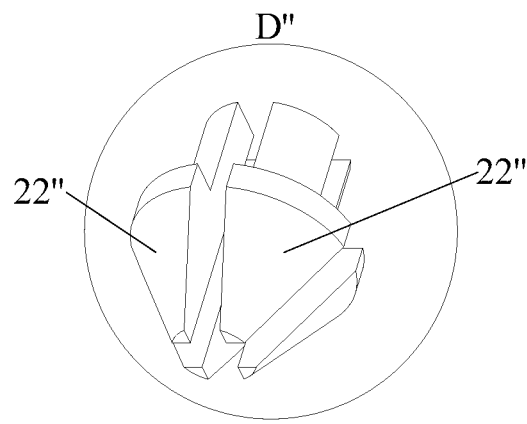
Figure 65:
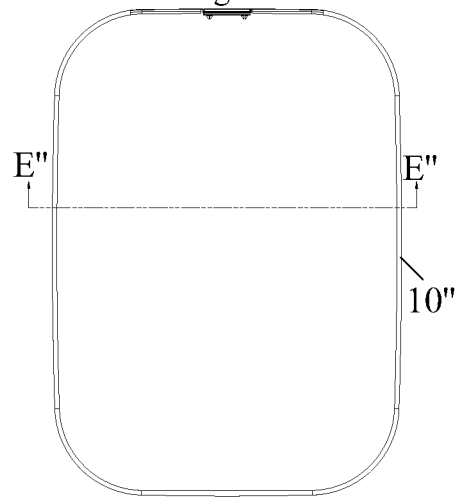
Figure 66:
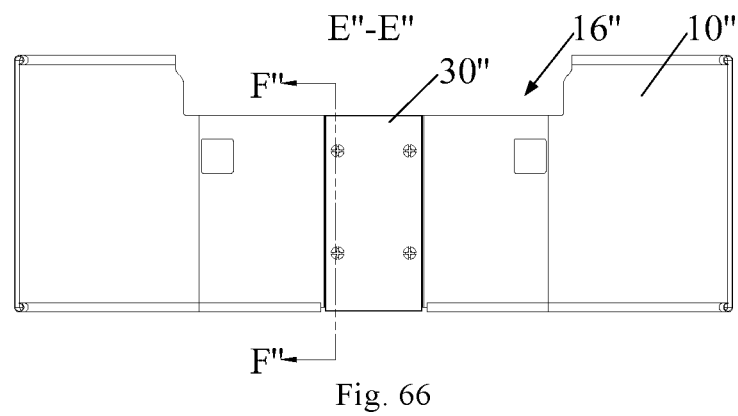
Figure 67:
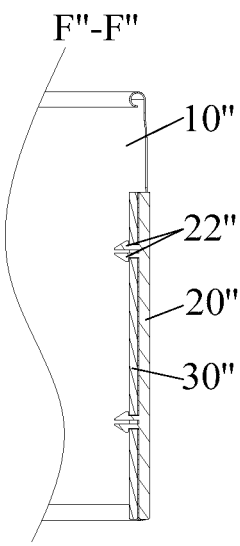
Figure 68:
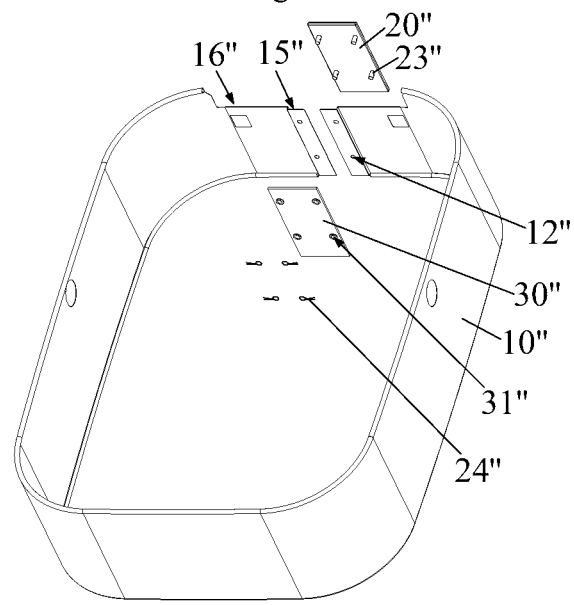
Figure 69:
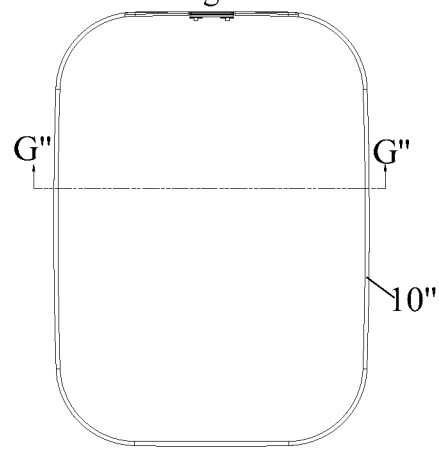
Figure 70:
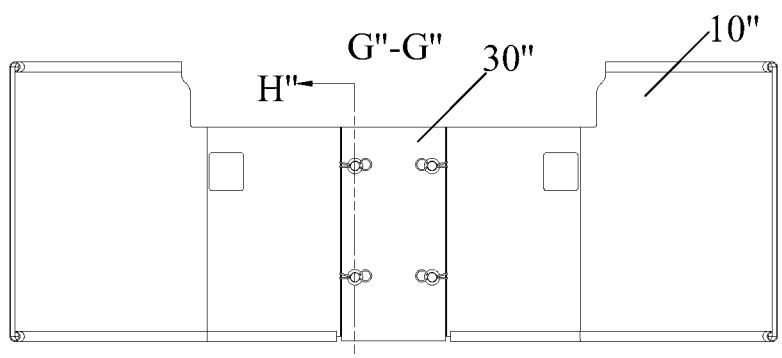
Figure 71:
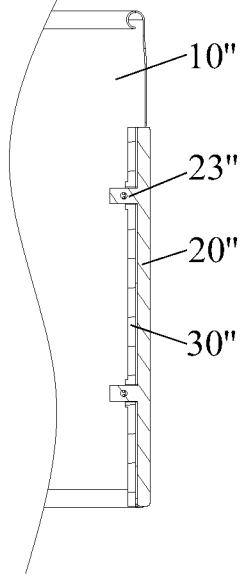
Figure 72:
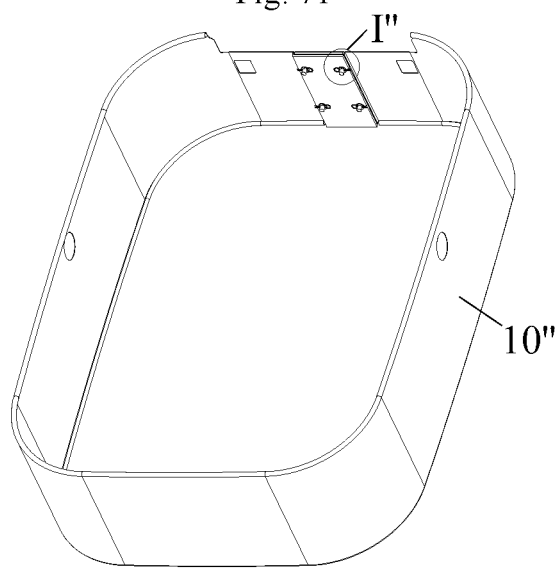
Figure 73:
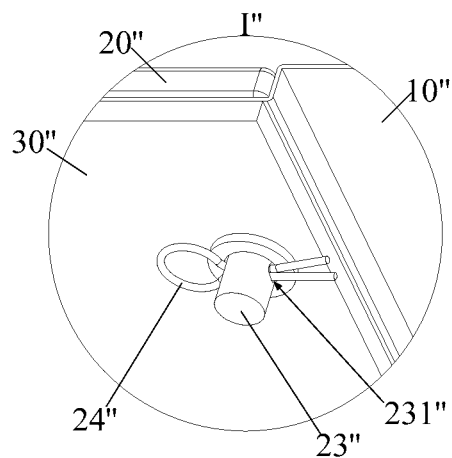
Figure 74:
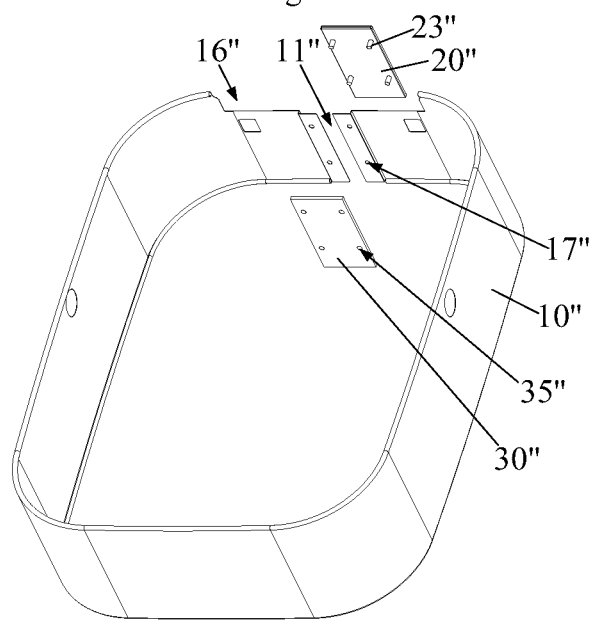
Figure 75:
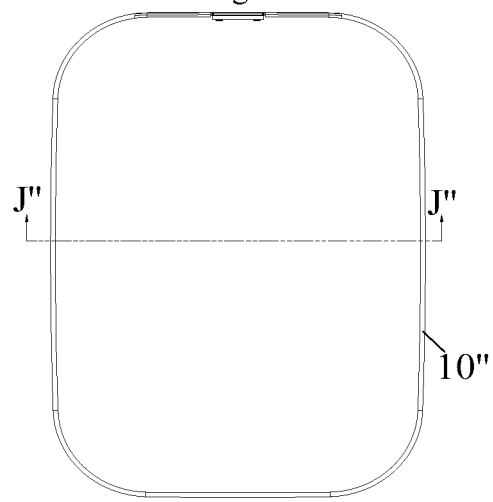
Figure 76:
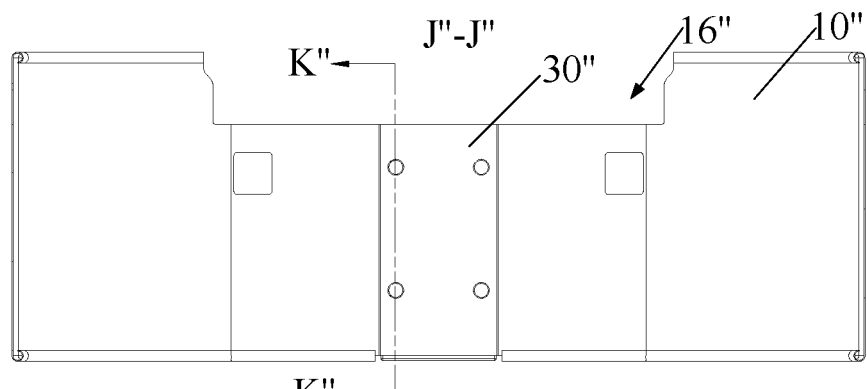
Figure 77:
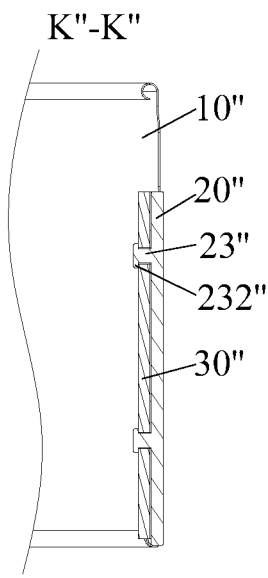
Figure 78:
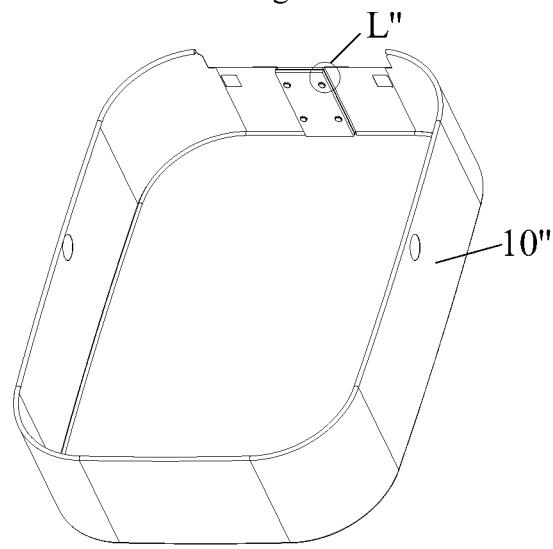
Figure 79:
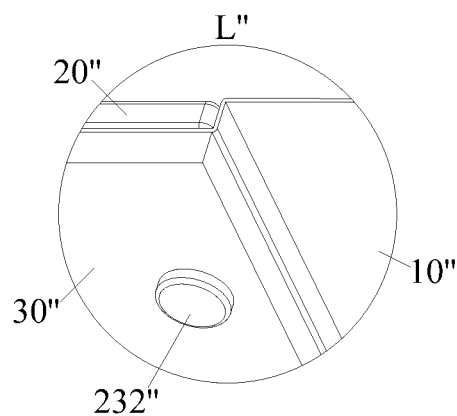
Figure 80:
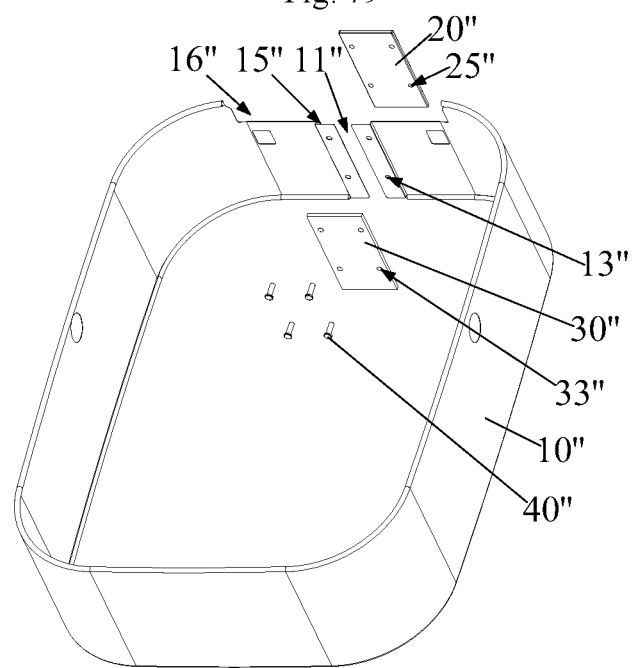
Figure 81:
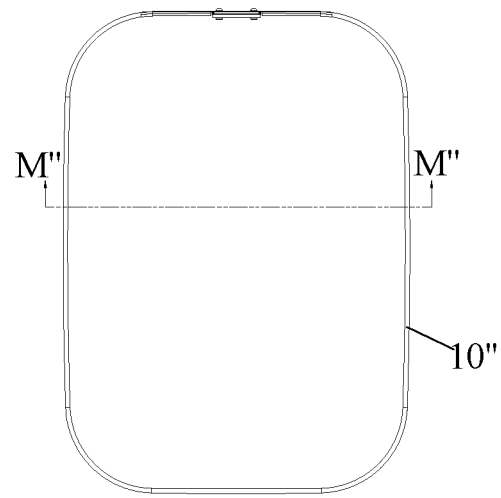
Figure 82:
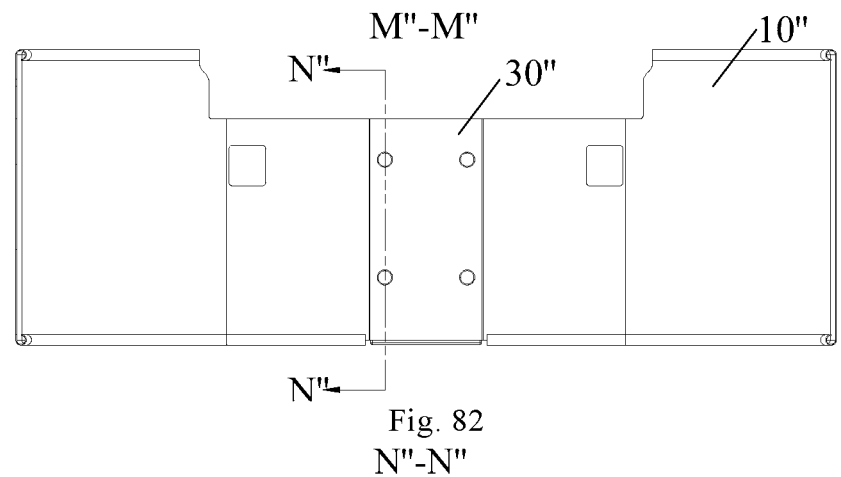
Figure 83:
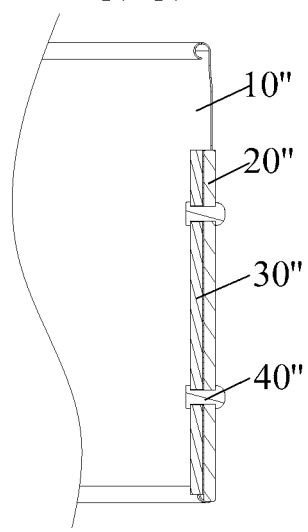
Figure 84:
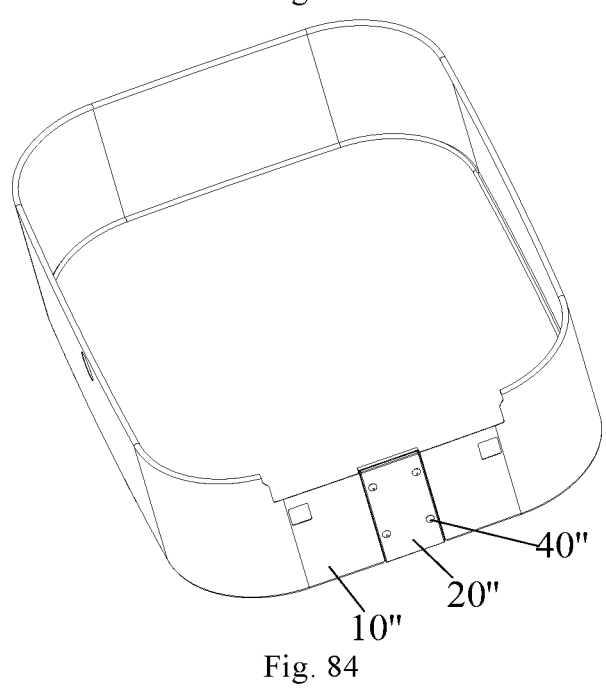
Figure 85:
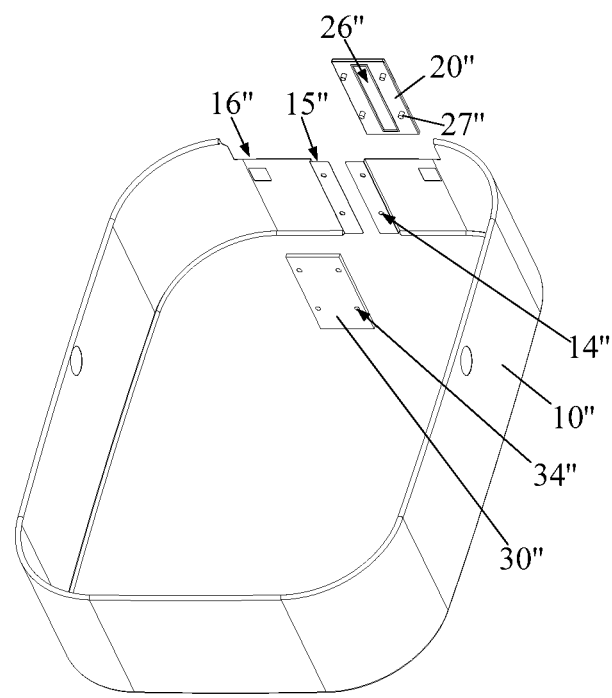
Figure 86:
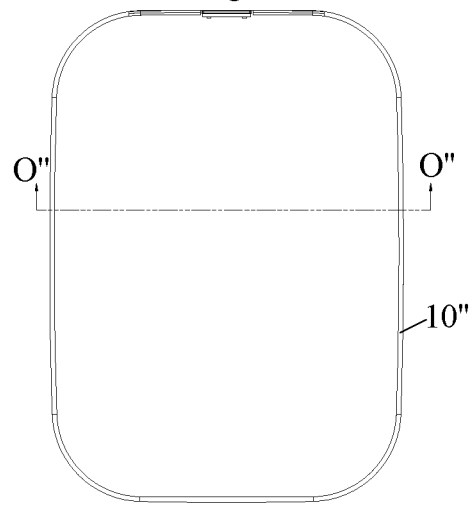
Figure 87:
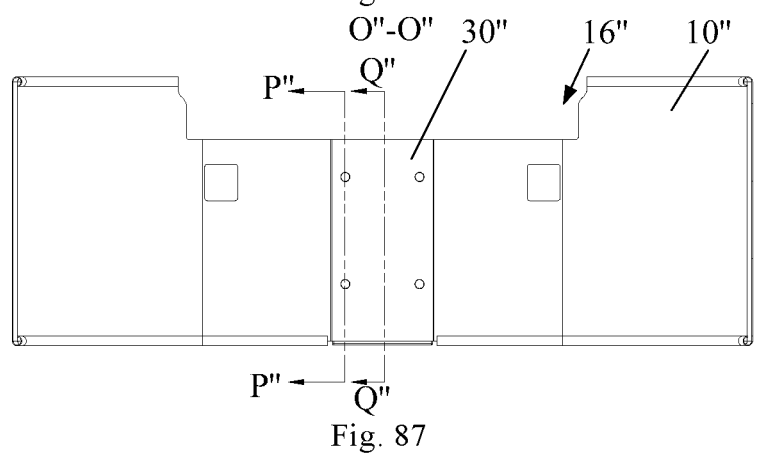
Figure 88:
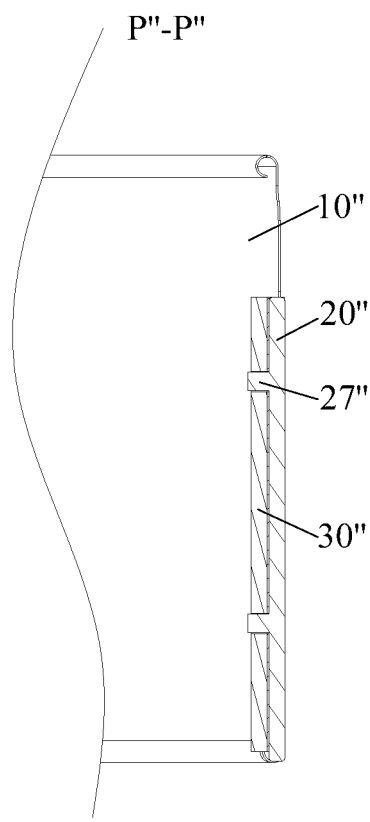
Figure 89:
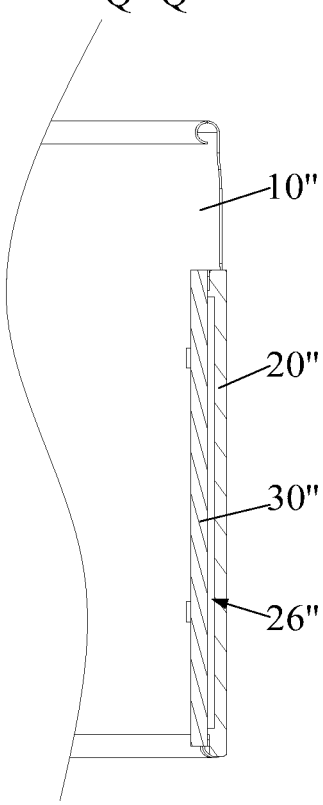

FIG. 58 is a disassembled structure diagram of a housing assembly in a thirteenth embodiment of the present disclosure;

FIG. 59 is an assembled top structure diagram of the housing assembly as shown in FIG. 58;

FIG. 60 is a sectional structure diagram in an A"-A" direction of the housing assembly as shown in FIG. 59;

FIG. 61 is a partial sectional structure diagram in a B"-B" direction of the housing assembly as shown in FIG. 60;

FIG. 62 is an enlarged structure diagram of a portion C" in FIG. 61;

FIG. 63 is a disassembled structure diagram of a housing assembly in a fourteenth embodiment of the present disclosure;

FIG. 64 is an enlarged structure diagram of a portion D" in FIG. 63;

FIG. 65 is an assembled top structure diagram of the housing assembly as shown in FIG. 63;

FIG. 66 is a sectional structure diagram in an E"-E" direction of the housing assembly as shown in FIG. 65;

FIG. 67 is a partial sectional structure diagram in an F"-F" direction of the housing assembly as shown in FIG. 66;

FIG. 68 is a disassembled structure diagram of a housing assembly in a fifteenth embodiment of the present disclosure;

FIG. 69 is an assembled top structure diagram of the housing assembly as shown in FIG. 68;

FIG. 70 is a sectional structure diagram in a G"-G" direction of the housing assembly as shown in FIG. 69;

FIG. 71 is a partial sectional structure diagram in an H"-H" direction of the housing assembly as shown in FIG. 70;

FIG. 72 is a an assembled stereoscopic structure diagram of the housing assembly as shown in FIG. 68;

FIG. 73 is an enlarged structure diagram of a portion I" in FIG. 72;

FIG. 74 is a disassembled structure diagram of a housing assembly in a sixteenth embodiment of the present disclosure;

FIG. 75 is an assembled top structure diagram of the housing assembly as shown in FIG. 74;

FIG. 76 is a sectional structure diagram in a J"-J" direction of the housing assembly as shown in FIG. 75;

FIG. 77 is a partial sectional structure diagram in a K"-K" direction of the housing assembly as shown in FIG. 76;

FIG. 78 is a an assembled stereoscopic structure diagram of the housing assembly as shown in FIG. 74;

FIG. 79 is an enlarged structure diagram of a portion L" in FIG. 78;

FIG. 80 is a disassembled structure diagram of a housing assembly in a seventeenth embodiment of the present disclosure;

FIG. 81 is an assembled top structure diagram of the housing assembly as shown in FIG. 80;

FIG. 82 is a sectional structure diagram in an M"-M" direction of the housing assembly as shown in FIG. 81;

FIG. 83 is a partial sectional structure diagram in an N"-N" direction of the housing assembly as shown in FIG. 82;

FIG. 84 is a an assembled stereoscopic structure diagram of the housing assembly as shown in FIG. 80;

FIG. 85 is a disassembled structure diagram of a housing assembly in an eighteenth embodiment of the present disclosure;

FIG. 86 is an assembled top structure diagram of the housing assembly as shown in FIG. 85;

FIG. 87 is a sectional structure diagram in an O"-O" direction of the housing assembly as shown in FIG. 86;

FIG. 88 is a partial sectional structure diagram in a P"-P" direction of the housing assembly as shown in FIG. 87;

FIG. 89 is a partial sectional structure diagram in a Q"-Q" direction of the housing assembly as shown in FIG. 87;

The corresponding relationship between the reference signs and component names in FIGS. 58 to 89 are as follows:

10" metal housing, 11" notch, 12" first clamping hole, 13" second connecting hole, 14" first locating hole, 15" sinking step, 16" mounting groove, 17" first through hole, 20" first insulating member, 21" L-shaped buckle, 211" barb, 22" elastic buckle, 23" connecting column, 231" radial through hole, 232" stopper projection, 24" spring latch, 25" first connecting hole, 26" glue tank, 27" locating column, 30" second insulating member, 31" second clamping hole, 32" slot, 33" third connecting hole, 34" second locating hole, 35" second through hole, 40" rivet.

Figure 90:
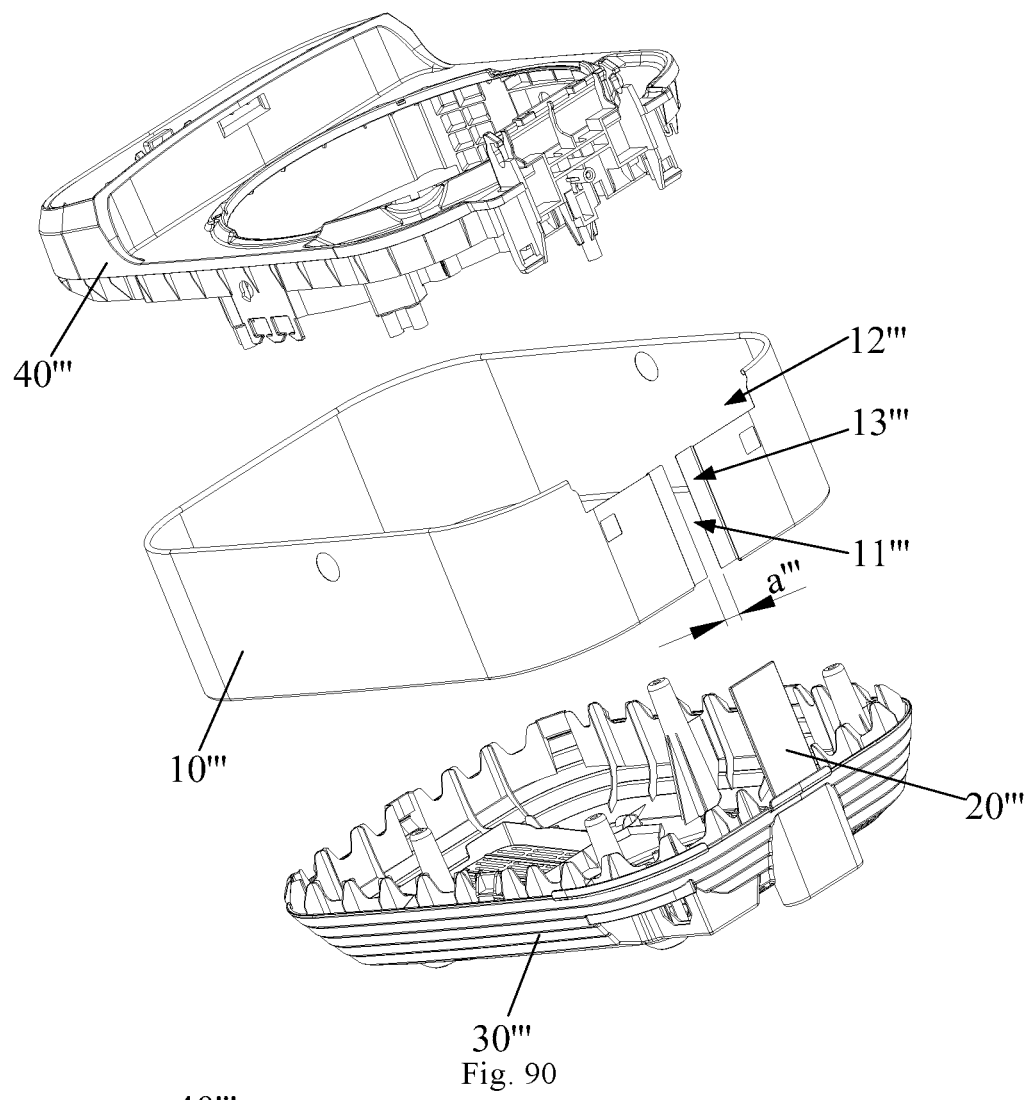
Figure 91:
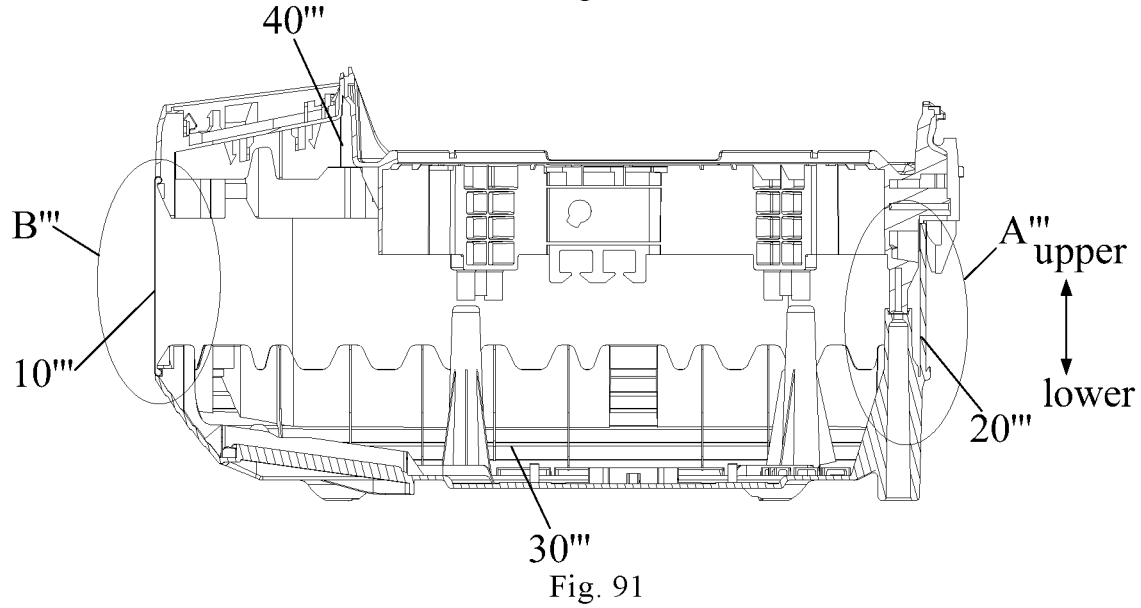
Figure 92:
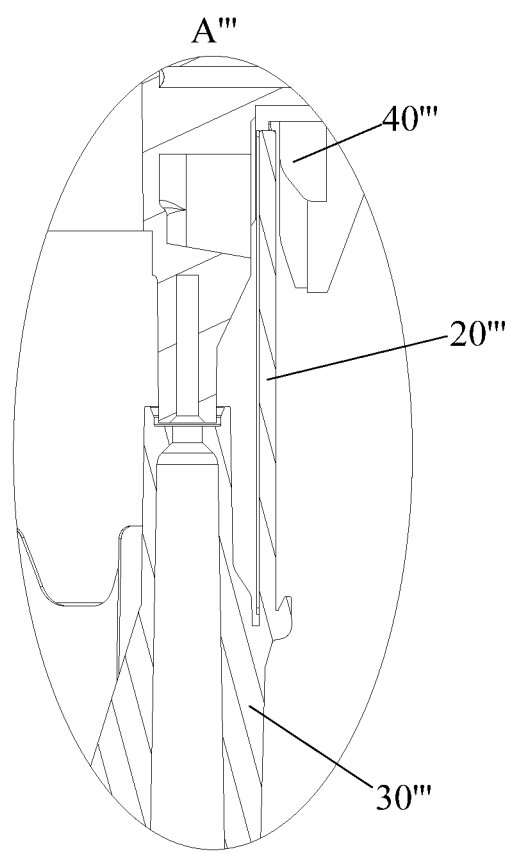
Figure 93:
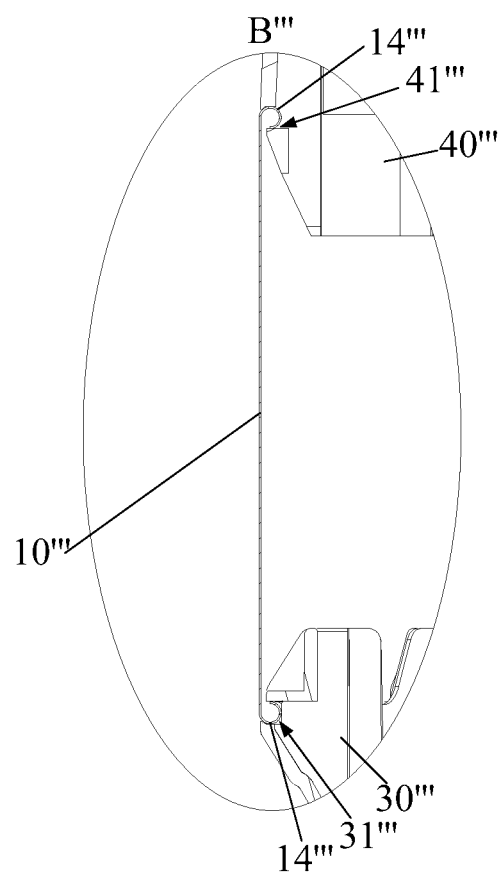
Figure 94:
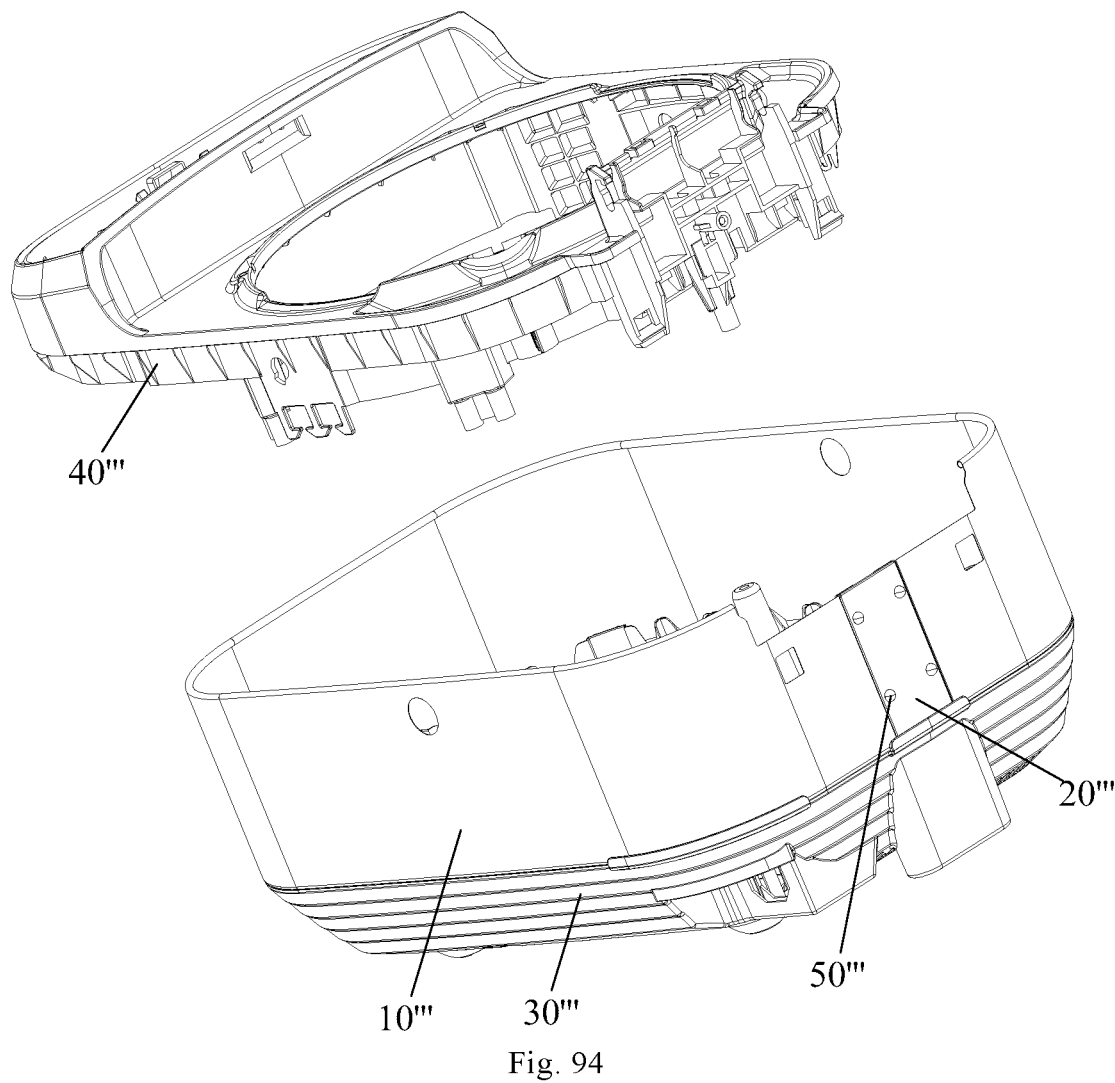
Figure 95:
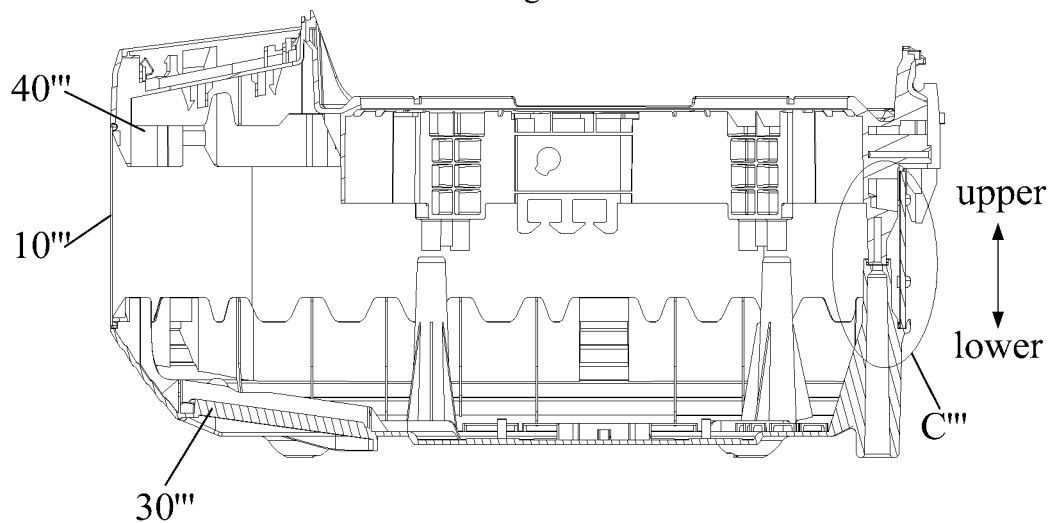
Figure 96:
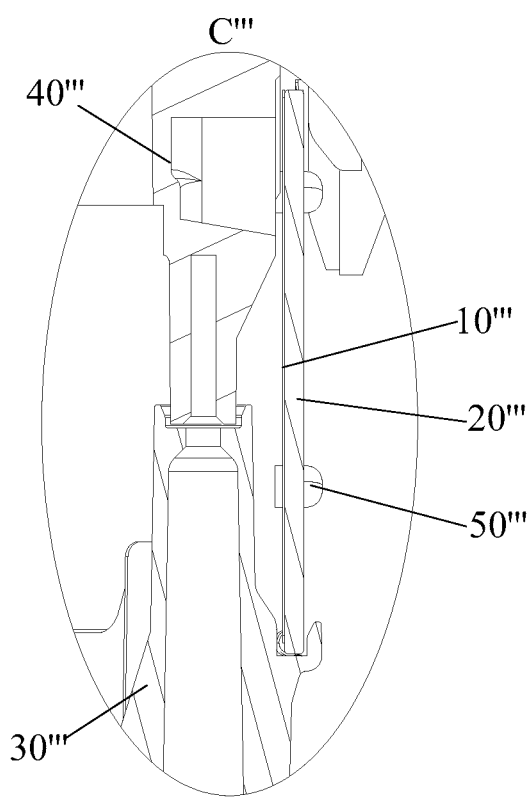

FIG. 90 is a disassembled structure diagram of a housing assembly in a nineteenth embodiment of the present disclosure;

FIG. 91 is an assembled sectional structure diagram of the housing assembly as shown in FIG. 90;

FIG. 92 is an enlarged structure diagram of a portion A''' in FIG. 91;

FIG. 93 is an enlarged structure diagram of a portion B''' in FIG. 92;

FIG. 94 is a partial disassembled structure diagram of a housing assembly in a twenty first embodiment of the present disclosure;

FIG. 95 is an assembled sectional structure diagram of the housing assembly as shown in FIG. 94;

FIG. 96 is an enlarged structure diagram of a portion C''' in FIG. 95;

The corresponding relationship between the reference signs and component names in FIGS. 90 to 96 are as follows:

10''' metal housing, 11''' notch, 12''' mounting groove, 13''' sinking step, 14''' curled edge, 20''' shielding piece, 30''' base, 31''' first stopper groove, 40''' housing cover, 41''' second stopper groove, and 50''' rivet.

DETAILED DESCRIPTION OF THE INVENTION

In one embodiment of the present disclosure can be understood more clearly, a further detailed description of the present disclosure will be given below in combination with drawings and embodiments. It should be noted that the embodiments of the present application and the features in the embodiments may be combined with each other without conflict.

In the following description, many specific details are set forth in order to fully understand the present disclosure. However, the present disclosure may also be implemented in other manners than those described herein. Therefore, the scope of protection of the present disclosure is not limited to the specific embodiments described below.

A housing assembly and a cooking appliance according to some embodiments of the present disclosure are described below with reference to FIGS. 1 to 96.

Figure 1:
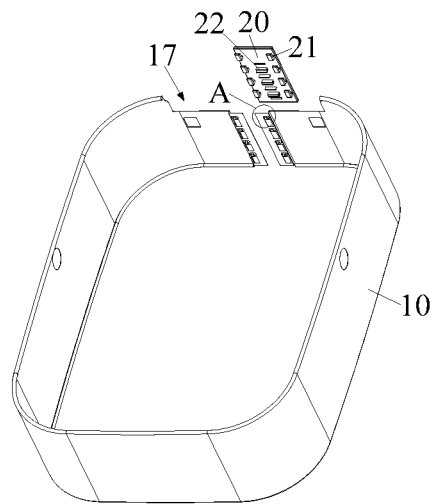
FIG. 1 is a disassembled structure diagram of a housing assembly in a first embodiment of the present disclosure.
Figure 2:
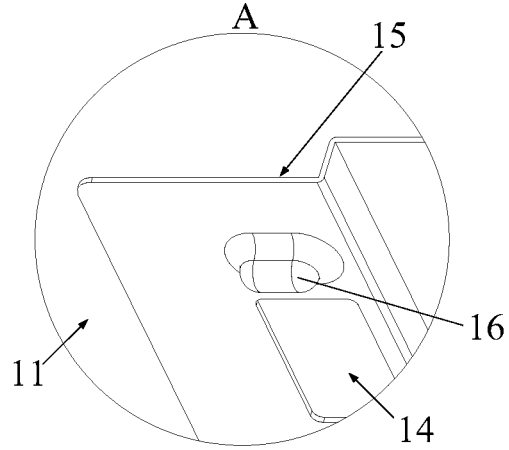
FIG. 2 is an enlarged structure diagram of a portion A in FIG. 1.

As shown in FIGS. 1 to 89, the housing assembly provided by the embodiment of the present disclosure is applied to an electromagnetic induction heating cooking appliance, the housing assembly being sleeved on the outer side of a liner of the cooking appliance, the housing assembly including a metal housing 10 and an insulating member 20.

In one embodiment, the metal housing 10 takes the shape of a disconnected ring on the whole, and a notch 11 is formed at a disconnected portion of the metal housing 10; and the insulating member 20 connects two disconnected ends of the metal housing 10 and covers the notch 11 so that the housing assembly forms a closed-loop open circuit structure.

According to the housing assembly provided by the embodiment of the present disclosure, as the metal housing 10 is disconnected, and the disconnected portion of the metal housing is connected by the insulating member 20, so that the housing assembly is open on the circuit, therefore, the magnetic field induction of the metal housing 10 can be weaken to reduce the temperature rise, and the problem that the metal housing 10 forms a closed loop circuit to easily induce a magnetic field generated by an induction coil disk to produce heat, resulting in too high temperature rise in the prior art is solved; and the insulating member 20 connects the disconnected portion of the metal housing 10 and covers the notch 11 so that the housing assembly forms the closed loop structure, thereby guaranteeing the integrity of the housing assembly, and guaranteeing the appearance of the cooking appliance as a result.

It can be understood that one notch 11 corresponds to two disconnected ends of the metal housing 10, so that the insulating member 20 at one notch 11 should be connected with the two disconnected ends of the metal housing 10 at the notch 11 to ensure that the housing assembly forms a complete ring-shaped structure. The number of the insulating members 20 at one notch 11e may be one or two (for example, one insulating members 20 are installed on each of the inner and outer sides of the metal housing 10 respectively), and is not limited specifically.

Further, the width a of the notch 11 along the circumferential direction of the metal housing 10 is greater than or equal to 2 mm, as shown in FIGS. 1, 3, 4 and 10.

In one embodiment, a mounting groove 17 is formed in a top end of the tail of the metal housing 10, one notch 11 is formed, and the notch 11 is located below the mounting groove 17 and communicates with the mounting groove 17, as shown in FIGS. 1, 3, 4, 7,10, 12 and 14.

Figure 3:
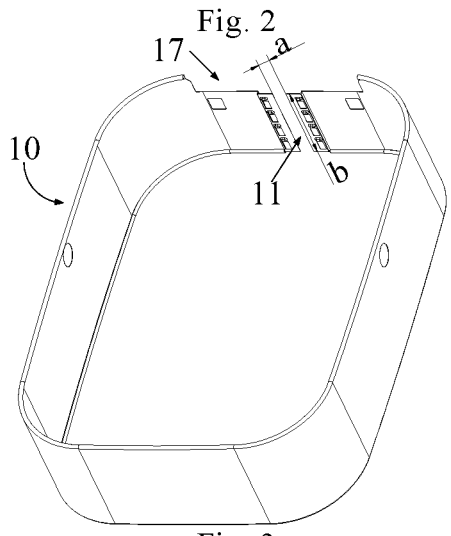
FIG. 3 is a stereoscopic structure diagram of a metal housing in FIG. 1.
Figure 10:
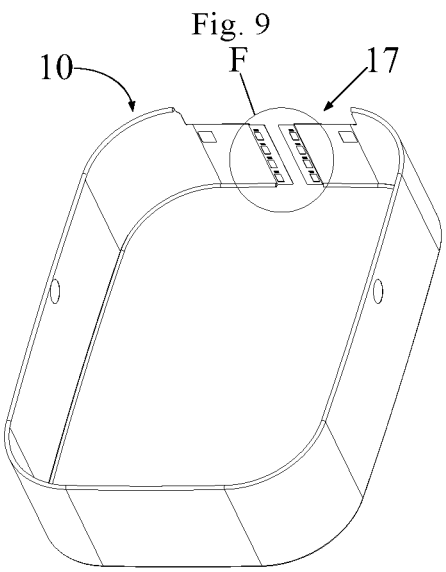
FIG. 10 is a stereoscopic structure diagram of a metal housing in a second embodiment of the present disclosure.

In one embodiment, the notch 11 is square, as shown in FIGS. 1, 3 and 10.

In the above-mentioned embodiment, the width of the notch 11 along the circumferential direction of the metal housing 10 is greater than or equal to 2 mm, in order to ensure a certain distance at the disconnected portion of the metal housing 10 so as to avoid the occurrence of sparks, heating and other situations at the disconnected portion due to a very small distance, thereby guaranteeing the safety and the use reliability of the product.

Since one notch 11 can ensure that the housing assembly does not form a closed loop on the circuit, only one notch 11 is formed in embodiments of the present disclosure; and one notch 11 can minimize the number of the insulating members 20, thus not only reducing the cost, but also improving the production efficiency. As the notch 11 is formed in the tail of the metal housing 10, on one hand, the notch 11 and the insulating member 20 are located at unusual positions of the cooking appliance, thereby improving the overall aesthetic degree of the cooking appliance; and on the other hand, the tail of the metal housing 10 is generally provided with the mounting groove 17 for mounting a hinge or matched with other structure of the cooking appliance, the notch 11 is formed herein to reduce the size of the notch 11 relatively, thus further improving the aesthetic degree of the product.

As for the specific height b (along the axial direction of the metal housing 10) and the specific width a (along the circumferential direction of the metal housing 10, being greater than or equal to 2 mm) of the notch 11, adjustment may be made according to the structure of the product.

Of course, a plurality of notches 11 can also be formed, the plurality of notches 11 are all connected by the insulating member 20, which are in accordance with embodiments of the present disclosure, and thus is also within the protection scope of the present disclosure; when there is one notch 11, it can also be formed in other position of the metal housing 10.

The notch 11 is square (rectangular or foursquare), which is convenient to process and form, and is convenient to assemble with the insulating member 20, and has a regular shape and beautiful appearance. Of course, the shape of the notch 11 is not limited to the above-mentioned square, but can also be other shape, which will not be enumerated herein, but all shall fall within the protection scope of the present disclosure.

The assembly structure of the insulating member 20 and the metal housing 10 will be described in detail below in conjunction with some specific embodiments.

First Embodiment (as Shown in FIGS. 1 to 9)

A buckle 21 is arranged on one of the metal housing 10 and the insulating member 20, a clamping hole 14 is formed in the other, and the buckle 21 is matched with the clamping hole 14, so that the metal housing 10 is clamped with the insulating member 20, as shown in FIGS. 1, 4, 5 and 7.

In the embodiment, the metal housing 10 and the insulating member 20 are clamped together through the cooperation of the buckle 21 and the clamping hole 14, which not only guarantees the fixed connection between the metal housing 10 and the insulating member 20, but also ensures a simpler and quicker assembly process, and helps to improve the assembly efficiency.

Figure 4:
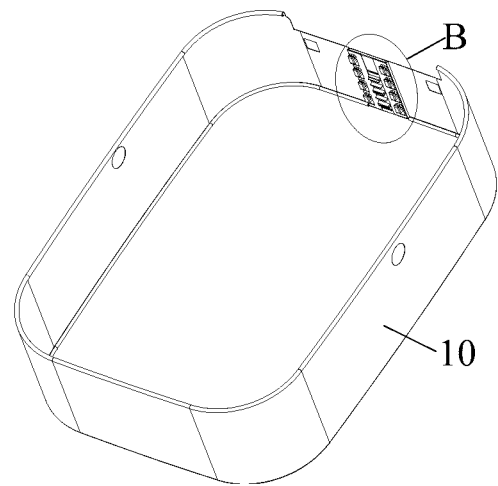
FIG. 4 is an assembled structure diagram of the housing assembly as shown in FIG. 1.
Figure 5:
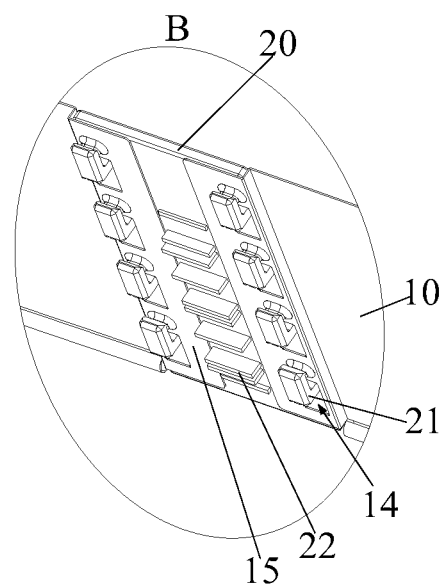
FIG. 5 is an enlarged structure diagram of a portion B in FIG. 4.
Figure 6:
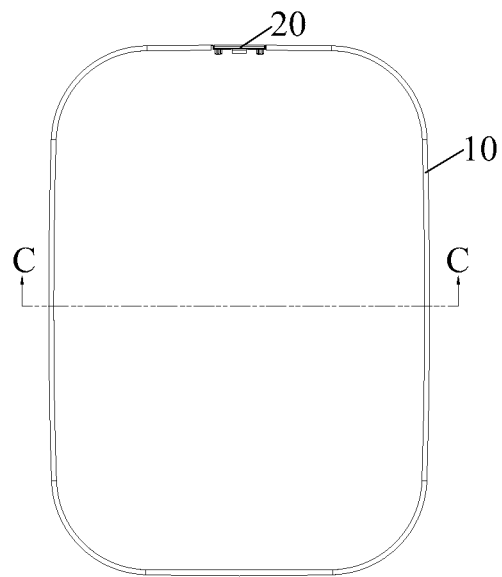
FIG. 6 is a top structure diagram of the housing assembly as shown in FIG. 4.
Figure 9:
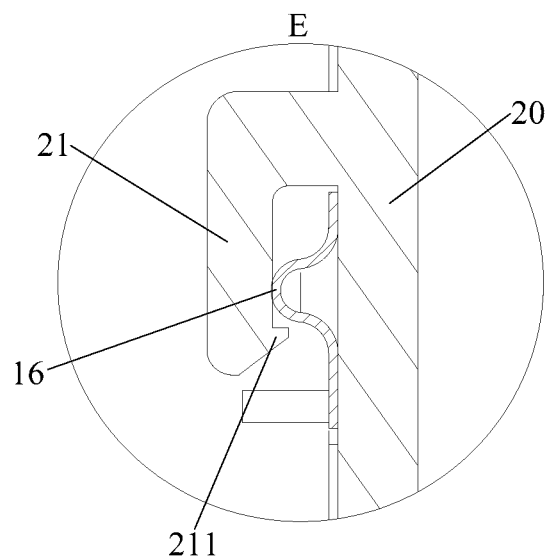
FIG. 9 is an enlarged structure diagram of a portion E in FIG. 8.

In one embodiment, as mentioned above, one insulating member 20 is connected with the two disconnected ends of the metal housing 10, therefore, two groups of buckles 21 and clamping holes 14 are disposed, which are respectively located on the two sides of the notch 11 to guarantee the reliable connection between the insulating member 20 and the metal housing 10, as shown in FIGS. 1, 4 and 5. In one embodiment, in each group of buckles 21, a barb 211 is arranged at the tail of at least one of the buckles 21, a bump 16 is correspondingly arranged on the metal housing 10 or the insulating member 20, and the barb 211 is hooked on the bump 16 after the buckle 21 penetrates through the clamping hole so as to prevent the buckle 21 from disengaging from the clamping hole, as shown in FIG. 9.

In one embodiment, the buckle 21 is arranged on the insulating member 20, and the clamping hole 14 is formed in the metal housing 10, as shown in FIGS. 1 to 9, in this way, the specific cooperation structure of the buckle 21 and the clamping hole 14 can be hidden within the housing assembly instead of being exposed to the outside, such that the appearance of the housing assembly is smoother, and thus the aesthetic degree of the cooking appliance is further improved; and on the other hand, compared with the solution of forming the clamping hole 14 in the insulating member 20, providing the clamping member on the insulating member 20 is conducive to improving the strength of the insulating member 20 to prolong the service life of the insulating member 20.

In one embodiment, the metal housing 10 and the insulating member 20 can also be fixed together in other manners, such as fasteners (screws, rivet or the like), adhesion or the like, and will not be enumerated herein.

Further, locating ribs 22 matched with the notch 11 are arranged on the insulating member 20, as shown in FIGS. 1, 4, 5 and 7.

Figure 7:
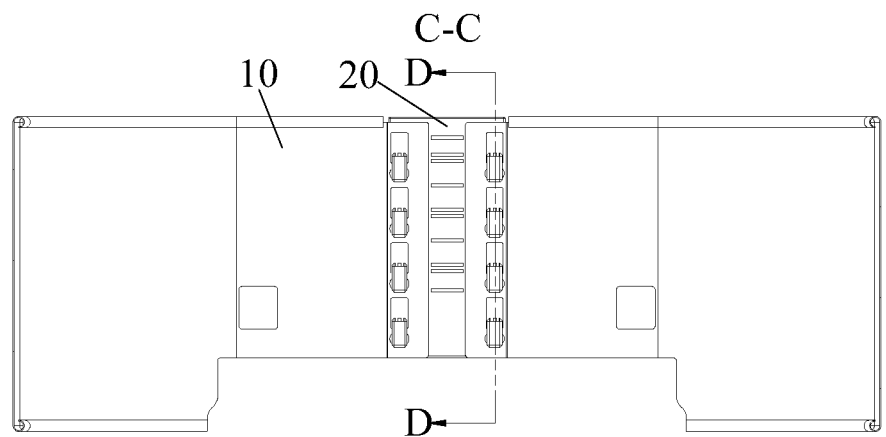
FIG. 7 is a sectional structure diagram in a C-C direction of the housing assembly as shown in FIG. 6.
Figure 8:
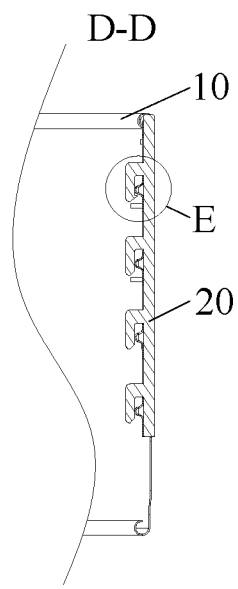
FIG. 8 is a partial sectional structure diagram in a D-D direction of the housing assembly as shown in FIG. 7.

In one embodiment, a plurality of locating ribs 22 are disposed, and the plurality of locating ribs 22 are arranged along the axial direction of the metal housing 10 in parallel, as shown in FIGS. 1, 5 and 7.

The locating ribs 22 matched with the notch 11 and arranged on the insulating member 20 can be used for fool-proof purpose during the assembly. In one embodiment, during the assembly, the locating ribs 22 can be inserted into the notch 11 at first, in this way, the relative position relationship between the insulating member 20 and the metal housing 10 can be determined to achieve a locating effect, and the mutually connected portions (for example, the buckle 21 and the clamping hole 14) of the metal housing 10 and the insulating member 20 can be aligned quickly, thus improving the assembly efficiency of the housing assembly.

Since the notch 11 penetrates through the axial direction of the metal housing 10, it has a certain height, accordingly the plurality of locating ribs 22 are arranged along the axial direction of the metal housing 10 in parallel and can be matched with a plurality of portions of the notch 11, and thus the locating is more accurate. In one embodiment, the heights of the plurality of locating ribs 22 can be the same or different, and the distances between the adjacent locating ribs 22 can be the same or different.

Second Embodiment (as Shown in FIGS. 10 to 15)

The metal housing 10 is an insert, the insulating member 20 is a plastic part, and the insulating member 20 and the metal housing 10 are of an integrated structure formed by injection molding.

The insulating member 20 is the plastic part, which is a good insulator and can effectively ensure that the housing assembly is disconnected on the circuit, and thus no closed loop circuit is formed; moreover, the plastic part is simple in molding process and is easy to process into various necessary shapes through injection molding, therefore, the requirement on the shape of the notch 11 is relatively low so that can facilitate various rational designs based on the specific structure of the product.

In one embodiment, the metal housing 10 is placed in a mold as the insert, and then the liquid plastic is injected into the mold, the liquid plastic fills the disconnected portion of the metal housing 10 to cover the notch 11 and adheres to the metal housing 10, so that they are connected together, a complete housing assembly can be formed in the mold by using a secondary injection molding process, and the plastic part on the metal housing 10 after curing is the insulating member 20.

Figure 11:
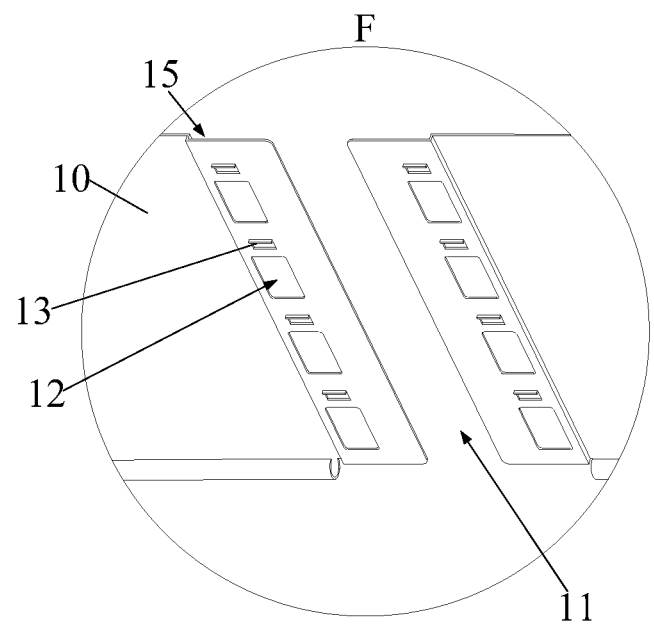
FIG. 11 is an enlarged structure diagram of a portion F in FIG. 10.
Figure 12:
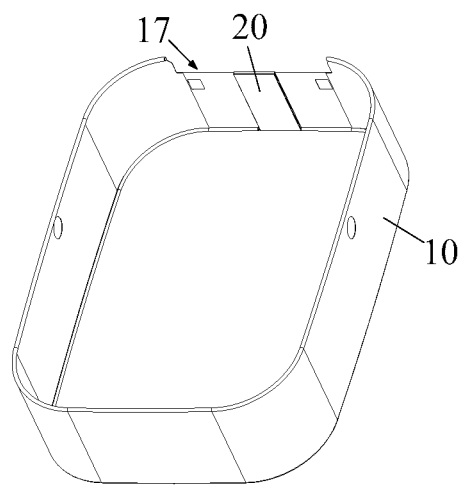
FIG. 12 is a stereoscopic structure diagram of a housing assembly in the second embodiment of the present disclosure.
Figure 13:
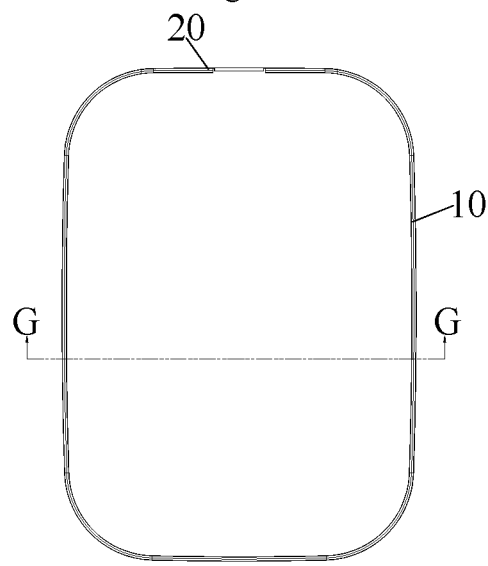
FIG. 13 is a top structure diagram of the housing assembly as shown in FIG. 12.
Figure 14:
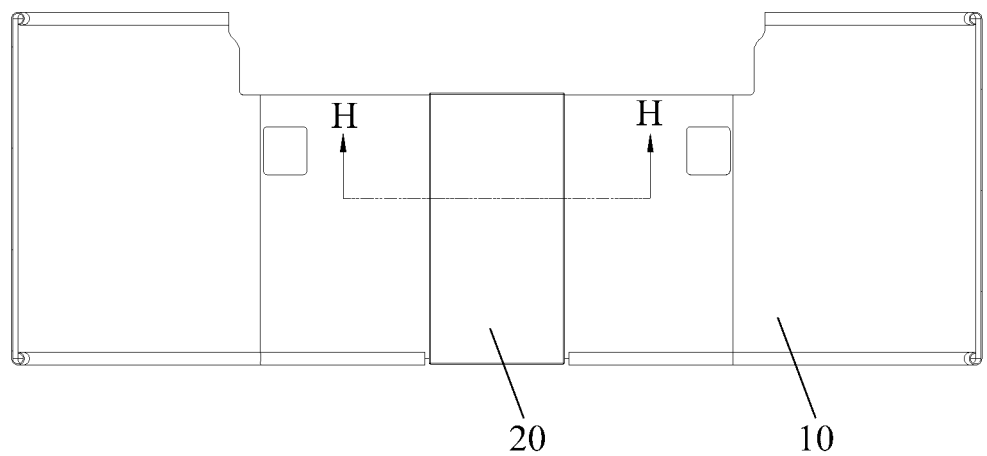
FIG. 14 is a sectional structure diagram in a G-G direction of the housing assembly as shown in FIG. 13.
Figure 15:
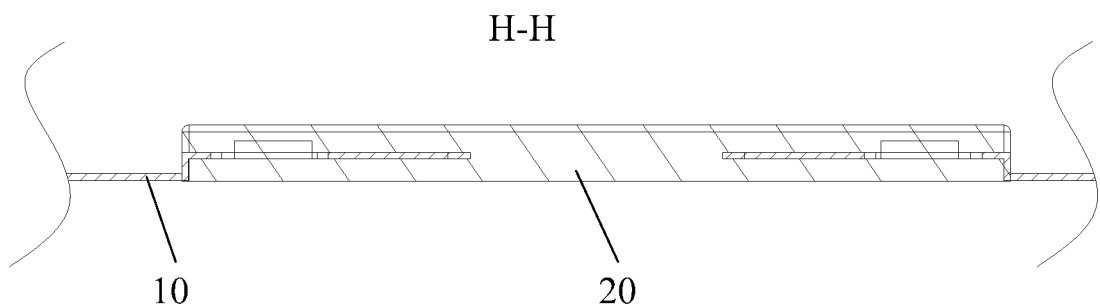
FIG. 15 is a partial sectional structure diagram in an H-H direction of the housing assembly as shown in FIG. 14.

Further, a through hole 12 is formed in the metal housing 10, as shown in FIGS. 10, 11 and 15, and the insulating member 20 is partially embedded in the through hole 12.

Further, a stopper protrusion 13 is arranged on the metal housing 10, as shown in FIGS. 10, 11 and 15, and the stopper protrusion 13 is embedded in the insulating member 20.

As the through hole 12 is formed in the metal housing 10, and the liquid plastic fills the through hole 12 in the metal housing 10 during the forming process, after the liquid plastic is hardened, a part of the structure of the insulating member 20 formed by the liquid plastic is embedded in the metal housing 10, so that the insulating member 20 and the metal housing 10 are embedded with each other, thereby not only improving the adhesion force between the insulating member 20 and the metal housing 10 to improve the connection strength between the insulating member 20 and the metal housing 10, but also achieving some retaining effect to guarantee the relative stability between the metal housing 10 and the insulating member 20, thus further improving the use reliability of the housing assembly.

In one embodiment, at least one through hole 12 is formed in each of two sides of the notch 11 to guarantee that the insulating member 20 can be reliably connected with the disconnected ends of the metal housing 10 on the two sides of the notch 11, as shown in FIGS. 10 and 11; the through holes 12 in the two sides of the notch 11 are symmetrical to each other, such that the forces on the disconnected ends of the metal housing 10 are more uniform, as shown in FIGS. 10 and 11; and further, as for the situation that a plurality of through holes 12 are formed in each of the two sides of the notch 11, the plurality of through holes 12 on the same side may have the same size or different sizes, which is not specifically limited, as shown in FIGS. 10 and 11.

Similarly, as the stopper protrusion 13 is arranged on the metal housing 10, after the liquid plastic is hardened, the stopper protrusion 13 is embedded in the insulating member 20, namely, a part of structure of the metal housing 10 is also embedded in the insulating member 20, so that the insulating member 20 and the metal housing 10 are embedded with each other, thereby not only improving the adhesion force between the insulating member 20 and the metal housing 10 to improve the connection strength between the insulating member 20 and the metal housing 10, but also achieving some retaining effect to guarantee the relative stability between the metal housing 10 and the insulating member 20, thus further improving the use reliability of the housing assembly.

In one embodiment, at least one stopper protrusion 13 is arranged on each of the two sides of the notch 11, as shown in FIGS. 10 and 11, to further guarantee that the insulating member 20 can be reliably connected with the disconnected ends of the metal housing 10 on the two sides of the notch 11; the stopper protrusions 13 on the two sides of the notch 11 are symmetrical to each other, such that the forces on the disconnected ends of the metal housing 10 are more uniform; and further, the stopper protrusions 13 are close to the through holes 12.

In the above-mentioned two embodiments, portions of the metal housing 10 located on two sides of the notch 11 are depressed inward to form sinking steps 15 matched with the size of the insulating member 20, as shown in FIGS. 1, 2, 10 and 11, so that an outer surface of the insulating member 20 is flush with an outer surface of the metal housing 10, as shown in FIGS. 5, 8, 12 and FIG. 15.

As the sinking steps 15 are arranged on the metal housing 10, the outer surface of the insulating member 20 can be flush with the outer surface of the metal housing 10, thus improving the aesthetic degree of the housing assembly, and thereby improving the level of the cooking appliance.

As shown in FIGS. 16 to 57, in some embodiments of the present disclosure, the number of the insulating members is equal to the number of the notches, and the insulating members are in one-to-one correspondence with the notches.

In these embodiments, the metal housing 10' is disconnected, and the disconnected portion of the metal housing is connected by the insulating member 20', so that the housing assembly is disconnected on the circuit, therefore, the magnetic field induction of the metal housing 10' can be weaken to reduce the temperature rise, and the problem that the metal housing 10' forms a closed loop circuit to easily induce a magnetic field generated by an induction coil disk to produce heat, resulting in too high temperature rise in the prior art is solved; and the insulating member 20' connects the disconnected portion of the metal housing 10' and covers the notch 11' so that the housing assembly forms the closed loop structure, thereby guaranteeing the integrity of the housing assembly, and guaranteeing the appearance of the cooking appliance as a result; and in addition, the number of the insulating members 20' is equal to the number of the notches 11', and the insulating members are in one-to-one correspondence with the notches, that is, only one insulating member 20' is installed at one notch 11', thereby not only guaranteeing the integrity of the housing assembly, but also reducing the number of the insulating members 20', accordingly, the cost can be reduced, and the assembly efficiency can also be improved.

It can be understood that as one notch 11' corresponds to the two disconnected ends of the metal housing 10', the one insulating member 20' at one notch 11' should be connected with the two disconnected ends of the metal housing 10' at the notch 11' to guarantee that the housing assembly forms a complete ring-shaped structure.

When the number of the insulating members 20' is equal to the number of the notches, the assembly structure of the insulating member 20' and the metal housing 10' will be described below in combination with some specific embodiments.

Third Embodiment (as Shown in FIGS. 16 to 24)

A clamping hole 12' is formed in one of the metal housing 10' and the insulating member 20', a clamping member is arranged on the other, and the clamping member is matched with the clamping hole 12', so that the insulating member 20' is clamped with the metal housing 10'.

The clamping member is an L-shaped buckle 30', and the L-shaped buckle 30' penetrates through the clamping hole 12' and abuts against one of the metal housing 10' and the insulating member 20'.

The metal housing 10' and the insulating member 20' are clamped together through the cooperation of the clamping member and the clamping hole 12', which not only guarantees the fixed connection between the metal housing 10' and the insulating member 20', but also ensures a simpler and quicker assembly process, and helps to improve the assembly efficiency. In one embodiment, as mentioned above, as one insulating member 20' is connected with the two disconnected ends of the metal housing 10', two groups of clamping members and two groups of clamping holes 12' are provided and are respectively located on the two sides of the notch 11' so as to guarantee the reliable connection between the insulating member 20' and the metal housing 10'.

The clamping member is the L-shaped buckle 30', namely, the clamping member takes the shape of a single-sided hook, during mounting, the L-shaped buckle 30' penetrates through the clamping hole 12' at first, and after the insulating member 20' and the metal housing 10' are pressed in place, the L-shaped buckle 30' is pushed along the bent direction of the L-shaped buckle 30' until one end of the buckle abuts against the wall of the clamping hole 12', at this time, the other end of the buckle abuts against the metal housing 10' or the insulating member 20' to achieve the clamping between the metal housing 10' and the insulating member 20'.

In one embodiment, a plurality of L-shaped buckles 30' are disposed and are divided into two groups, and the two groups of L-shaped buckles 30' are respectively located on the two sides of the notch 11'; the two groups of L-shaped buckles 30' face to the same direction; or, the L-shaped buckles 30' are located on the insulating member 20', and the two groups of L-shaped buckles 30' face to the notch 11'; or, the L-shaped buckles 30' are located on the metal housing 10', and the two groups of L-shaped buckles 30' face away from the notch 11'.

As the plurality of L-shaped buckles 30' are disposed, the reliable connection between the metal housing 10' and the insulating member 20' can be further ensured; as the two groups of L-shaped buckles 30' face to the same direction (for example, both of them facing upward, or downward, or leftward or rightward), all L-shaped buckles 30' can be synchronously assembled to achieve one-step mounting; when the L-shaped buckles 30' are located on the insulating member 20', the two groups of L-shaped buckles 30' all face to the notch 11', namely, the directions of the two groups of L-shaped buckles 30' are opposite, and when the two groups of L-shaped buckles are assembled in place, as the two disconnected ends of the metal housing 10' have a trend of separating toward the two sides, which is just opposite to the disengaging direction of the L-shaped buckles 30' (when the two disconnected ends approach to each other, the L-shaped buckles 30' can be disengaged), therefore the L-shaped buckles 30' are not liable to disengage from the clamping holes 12', and the connection is more reliable; and similarly, when the L-shaped buckles 30' are located on the metal housing 10', the two groups of L-shaped buckles 30' face away from the notch 11', that is, the directions of the two groups of L-shaped buckles 30' are opposite, and when the two groups of L-shaped buckles are assembled in place, as the two disconnected ends of the metal housing 10' have a trend of separating toward the two sides, which is just opposite to the disengaging direction of the L-shaped buckles 30' (when the two disconnected ends approach to each other, the L-shaped buckles 30' can be disengaged), therefore the L-shaped buckles 30' are not liable to disengage from the clamping holes 12', and the connection is more reliable.

In one embodiment, in each group of L-shaped buckles 30', a barb 31' is arranged at the tail of at least one of the L-shaped buckles 30', a bump 13' is arranged on one of the metal housing 10' and the second insulating member 20', and the barb 31' is hooked on the bump 13'.

The barb 31' is matched with the bump 13' for retaining the L-shaped buckles 30' to prevent the L-shaped buckles 30' from sliding oppositely to result in the drop of the insulating member 20', thus further ensuring the reliable connection between the metal housing 10' and the insulating member 20'.

Fourth Embodiment (as Shown in FIGS. 25 and 26)

The difference from the third embodiment lies in that a rim 121' for protecting the clamping member is arranged on the peripheral edge of the clamping hole 12'.

As for the embodiment in which the clamping hole 12' is formed in the metal housing 10', the rim 121' is arranged on the peripheral edge of the clamping hole 12' to increase the depth of the clamping hole 12', thereby avoiding too sharpness at the clamping hole 12' to prevent the metal housing 10' from cutting the clamping member on the insulating member 20' in a drop process so as to protect the clamping member.

Fifth Embodiment (as Shown in FIGS. 27 to 31)

The difference from the third embodiment lies in that the clamping member includes a plurality of elastic buckles 40', the plurality of elastic buckles 40' are arranged back to back and enclose an elastic column buckle.

The clamping member includes the plurality of elastic buckles 40', the plurality of elastic buckles 40' are arranged back to back and enclose the elastic column buckle, during the mounting, the plurality of elastic buckles 40' are squeezed by the side wall of the clamping hole 12' to approach to each other, so that the diameter of the elastic column buckle becomes smaller; and when the insulating member 20' and the metal housing 10' are pressed in place, the end parts of the plurality of elastic buckles 40' protrude from the clamping hole 12' and restore the deformation, in this way, the diameter of the elastic column buckle is greater than the clamping hole 12' to be hooked on the metal housing 10', such that the metal housing 10' is firmly clamped, the clamping between the metal housing 10' and the insulating member 20' is achieved, the structure is simple, and the assembly is fast.

Sixth Embodiment (as Shown in FIGS. 32 to 36)

The difference from the third embodiment lies in that the clamping member includes a connecting column 50' with a radial through hole 51' and a spring latch 60' matched with the radial through hole 51', and the connecting column 50' penetrates through the clamping hole 12', and the spring latch 60' penetrates through the radial through hole 51' and is clamped on the connecting column 50'.

The clamping member includes the connecting column 50' and the spring latch 60', the radial through hole 51' is formed in the connecting column 50', during the mounting, the connecting column 50' firstly penetrates through a through hole 70', and after the insulating member 20' and the metal housing 10' are pressed in place, the spring latch 60' penetrates through the radial through hole 51', then the spring latch 60' is clamped on the connecting column 50' to avoid the connecting column 50' disengaging from the through hole 70', the clamping between the metal housing 10' and the insulating member 20' is achieved, also the structure is simple, and the assembly is fast.

In the above-mentioned four embodiments (the third embodiment to the sixth embodiment) the clamping member is arranged on the insulating member 20', and the clamping hole 12' is formed in the metal housing 10', in this way, on one hand, the specific cooperation structure of the clamping member and the clamping hole 12' can be hidden within the housing assembly instead of being exposed to the outside, such that the appearance of the housing assembly is smoother, and thus the aesthetic degree of the cooking appliance is further improved; and on the other hand, compared with the solution of forming the clamping hole 12' in the insulating member 20', providing the clamping member on the insulating member 20' is conducive to improving the strength of the insulating member 20' to prolong the service life of the insulating member 20'.

Seventh Embodiment (as Shown in FIGS. 37 to 40)

A through hole 70' is formed in the metal housing 10', and a connecting column 50' capable of plastic deformation is arranged on the insulating member 20; and the connecting column 50' penetrates through the through hole 70', a portion of the connecting column 50' protruding from the through hole 70' deforms into a stopper projection 52' with a section size greater than the size of the through hole 70', and the stopper projection 52' abuts against the metal housing 10', so that the insulating member 20' is fixedly connected with the metal housing 10'.

The through hole 70' is formed in the metal housing 10', and the connecting column 50' is arranged on the insulating member 20', during the mounting, the connecting column 50' penetrates through the through hole 70' at first, and after the insulating member 20' and the metal housing 10' are pressed in place, the portion of the connecting column 50' protruding from the through hole 70' is welded flat by using a heat welding process or an ultrasonic welding process, so that the connecting column 50' approaches to the metal housing 10', the portion of the connecting column 50' protruding from the through hole 70' forms the stopper projection 52' after being cooled, as the size of the stopper projection 52' is greater than that of the through hole 70', the stopper projection 52' can abut against the metal housing 10' to firmly clamp the metal housing 10' so as to achieve the fixed connection between the metal housing 10' and the insulating member 20'.

Eighth Embodiment 9 (as Shown in FIGS. 41 to 43)

A through hole 70' is formed in the insulating member 20', and a connecting column 50' capable of plastic deformation is arranged on the metal housing 10'; and the connecting column 50' penetrates through the through hole 70', a portion of the connecting column 50' protruding from the through hole 70' deforms into a stopper projection 52' with a section size greater than the size of the through hole 70', and the stopper projection 52' abuts against the insulating member 20', so that the insulating member 20' is fixedly connected with the metal housing 10'.

In one embodiment, the connecting column 50' is a hollow connecting column 50'.

The through hole 70' is formed in the insulating member 20', and the connecting column 50' is arranged on the metal housing 10', during the mounting, the connecting column 50' penetrates through the through hole 70' at first, and after the insulating member 20' and the metal housing 10' are pressed in place, a portion of the connecting column 50' protruding from the through hole 70' is pressed flat or punched to deformation by using a punch press or other tool to form the stopper projection 52' with a size greater than that of the through hole 70', the stopper projection 52' abuts against the insulating member 20' to firmly clamp the insulating member 20', so that the insulating member 20' and the metal housing 10' form a stable entirety.

In one embodiment, as for the embodiment in which the connecting column 50' is arranged on the metal housing 10', the connecting column 50' is designed to be hollow because the hollow connecting column 50' is easier to generate the plastic deformation than a solid connecting column 50', so that the processing difficulty can be reduced, and the production efficiency can be improved.

Ninth Embodiment (as Shown in FIGS. 44 and 45)

Through holes 70' are formed in both of the insulating member 20' and the metal housing 10', a fastener penetrates through the through holes 70' in the insulating member 20' and the metal housing 10', so that the insulating member 20' is fixedly connected with the metal housing 10'.

The through holes 70' are formed in both of the insulating member 20' and the metal housing 10', the fastener penetrates through the through holes 70' to fixedly connect the insulating member 20' with the metal housing 10' to form a stable entirety, which is very reliable. In one embodiment, the fastener can be a screw, a rivet 80' or other single component, and can also be screw-and-nut, bolt-and-nut, or other combined parts, which are not enumerated herein.

Tenth Embodiment (as Shown in FIGS. 46 to 49)

A jagged through hole 70' is formed in one of the metal housing 10' and the insulating member 20', a connecting column 50' is arranged on the other, and the connecting column 50' penetrates through the jagged through hole 70' and is retained in the jagged through hole 70', so that the insulating member 20' is fixedly connected with the metal housing 10'.

The jagged through hole 70' is formed in the metal housing 10', the connecting column 50' (hollow or solid) is arranged on the insulating member 20', the connecting column 50' penetrates through the through hole 70' at first, and after the insulating member 20' and the metal housing 10' are pressed in place, the insulating member 20' is firmly clamped by the interference fit between a sharp edge of a jagged metal plate and the connecting column 50' on the insulating member 20' and/or the pre-tightening force formed by the elastic deformation of the jagged metal plate and the connecting column 50' (hollow), so that the metal housing 10' and the insulating member 20' cooperate with each other to form a stable entirety.

Or, the connecting column 50' is arranged on the metal housing 10', the jagged through hole 70' is formed in the insulating member 20', the connecting column 50' penetrates through the through hole 70' at first, and after the insulating member 20' and the metal housing 10' are pressed in place, the insulating member 20' is firmly clamped by the interference fit between the connecting column 50' and the through hole 70' and/or the pre-tightening force formed by the elastic deformation of the through hole 70' in the insulating member 20', and the metal housing 10' and the insulating member 20' can also cooperate with each other to form a stable entirety.

In one embodiment, the jagged through hole 70' is formed in the metal housing 10', the connecting column 50' is arranged on the insulating member 20', in this way, on one hand, the specific cooperation structure of the connecting column 50' and the through hole 70' can be hidden within the housing assembly instead of being exposed to the outside, such that the appearance of the housing assembly is smoother, and thus the aesthetic degree of the cooking appliance is further improved; and on the other hand, compared with the solution of forming the through hole 70' in the insulating member 20', providing the connecting column 50' on the insulating member 20' is conducive to improving the strength of the insulating member 20' to prolong the service life of the insulating member 20'.

Eleventh Embodiment (as Shown in FIGS. 50 to 53)

A folded plate 14' is arranged on the metal housing 10', a connecting hole 90' matched with the folded plate 14' is formed in the insulating member 20', and the folded plate 14' is locked on the insulating member 20' after penetrating through the connecting hole 90', so that the insulating member 20' is fixedly connected with the metal housing 10'.

In one embodiment, a boss 21' is further arranged on the insulating member 20', the boss 21' is located on the edge of the connecting hole 90', and the folded plate 14' is firstly bent and pressed on the boss 21' and then is bent and pressed on the insulating member 20'.

The folded plate 14' is arranged on the metal housing 10', the connecting hole 90' is formed in the insulating member 20', the folded plate 14' is firstly passed through the connecting hole 90', and then the folded plate 14' is bent and locked on the insulating member 20', thus the folded plate 14' forms a structure similar to the L-shaped buckle 30', and the fixed connection between the insulating member 20' and the metal housing 10' is achieved.

The boss 21' is arranged on the edge of the connecting hole 90', the folded plate 14' is firstly bent and pressed on the boss 21' and then is bent and pressed on the insulating member 20', thus the L-shaped folded plate 14' forms an inner locking structure on the insulating member 20', thereby on one hand the folded plate 14' scratching the user is avoided, and on the other hand, the boss 21' functions to retain the folded plate 14' and reduces the movement probability of the folded plate 14', thereby further ensuring the reliable connection between the insulating member 20' and the housing.

Twelfth Embodiment (as Shown in FIGS. 54 to 57)

Edges of the metal housing 10' located on two sides of the notch 11' are bent to form two first rail grooves 15' with opposite openings, two ends of the insulating member 20' are bent to form two second rail grooves 22' with opposite openings, and the two first rail grooves 15' are hooked with the two second rail grooves 22', so that the insulating member 20' is fixedly connected with the metal housing 10'.

In one embodiment, the openings of the two first rail grooves 15' face away from the notch 11', and the openings of the two second rail grooves 22' face to the notch 11'.

In one embodiment, a free end of one of the first rail groove 15' and the second rail groove 22' is provided with a folded edge 16', and the folded edge 16' abuts against the other of the first rail groove 15' and the second rail groove 22'.

The disconnected portion of the metal housing 10' is bent to form the two first rail grooves 15', and two ends of the insulating member 20' are bent to form the two second rail grooves 22', the cross sections of the first rail grooves 15' and the second rail grooves 22' are approximately n-shaped and are hooked with each other, so that the insulating member 20' and the metal housing 10' can form a stable entirety. In one embodiment, the insulating member 20' can be located on the outer side of the metal housing 10' and can also be located on the inner side of the metal housing 10'.

The openings of the first rail grooves 15' face away from the notch 11', and the openings of the second rail grooves 22' face to the notch 11', so that the structure is simpler, moreover, the two second rail grooves 22' faces to opposite directions to form two L-shaped buckles 30' facing to opposite directions, thereby drawing together the two disconnected ends of the metal housing 10' to some extent, and further improving the connection reliability thereof.

The free end of one of the first rail groove 15' and the second rail groove 22' is also provided with the folded edge 16', and the folded edge 16' abuts against the inner wall surface of the other rail groove to achieve some retaining effect, so that the derail of the first rail groove 15' and the second rail groove 22' can be avoided, and thus the connection reliability of the insulating member 20' and the metal housing 10' can be further improved.

In the above-mentioned third embodiment to the twelfth embodiment, the width a' of the notch 11' along the circumferential direction of the metal housing 10' is greater than or equal to 2 mm, as shown in FIGS. 16, 18 and 19.

The width a' of the notch 11' along the circumferential direction of the metal housing 10' is greater than or equal to 2 mm, in order to ensure a certain distance at the disconnected portion of the metal housing 10' so as to avoid the occurrence of sparks, heating and other situations at the disconnected portion due to a very small distance, thereby guaranteeing the safety and the use reliability of the product In the above-mentioned third embodiment to the twelfth embodiment, a mounting groove 17' is formed in a top end of the tail of the metal housing 10', one notch 11' is formed, and the notch 11' is located below the mounting groove 17 and communicates with the mounting groove 17', as shown in FIGS. 16 to 57.

Since one notch 11' can ensure that the housing assembly does not form a closed loop on the circuit, only one notch 11' is formed in embodiments of the present disclosure; and one notch 11 can minimize the number of the insulating members 20', thus not only reducing the cost, but also improving the production efficiency. As the notch 11' is formed in the tail of the metal housing 10', on one hand, the notch 11 and the insulating member 20' are located at unusual positions of the cooking appliance, thereby improving the overall aesthetic degree of the cooking appliance; and on the other hand, the tail of the metal housing 10' is generally provided with the mounting groove 17' for mounting a hinge or matched with other structure of the cooking appliance, and the notch 11' is formed herein to reduce the size of the notch 11' relatively, thus further improving the aesthetic degree of the product.

As for the specific height b''' (along the axial direction of the metal housing 10') and the specific width a' (along the circumferential direction of the metal housing 10', preferably being greater than or equal to 2 mm) of the notch 11, adjustment may be made according to the structure of the product.

Of course, a plurality of notches 11' can also be formed, the plurality of notches 11' are all connected by the insulating member 20', and thus is also within the protection scope of the present disclosure; when there is one notch 11', it can also be formed in other position of the metal housing 10'.

In the above-mentioned third embodiment to the twelfth embodiment, the notch 11' is square, as shown in FIGS. 16 to 57.

The notch 11' is square (rectangular or foursquare), thereby being convenient to process and form and being convenient to assemble with the insulating member 20', and it has a regular shape and beautiful appearance. Of course, the shape of the notch 11' is not limited to the above-mentioned square, but can also be other shape, which will not be enumerated herein, but all shall fall within the protection scope of the present disclosure.

In the above-mentioned third embodiment to the twelfth embodiment, locating ribs 23' matched with the notch 11' are arranged on the insulating member 20', as shown in FIGS. 16 to 26.

The locating ribs 23' matched with the notch 11' and arranged on the insulating member 20' can be used for fool-proof purpose during the assembly. In one embodiment, during the assembly, the locating ribs 23' can be inserted into the notch 11' at first, in this way, the relative position relationship between the insulating member 20' and the metal housing 10' can be determined to achieve a locating effect, and the mutually connected portions (for example, the buckle and the clamping hole 12') of the metal housing 10' and the insulating member 20' can be aligned quickly, thus improving the assembly efficiency of the housing assembly.

In one embodiment, a plurality of locating ribs 23' are disposed, and the plurality of locating ribs 23' are arranged along the axial direction of the metal housing 10' in parallel.

Since the notch 11' penetrates through the axial direction of the metal housing 10', it has a certain height, accordingly the plurality of locating ribs 23' are arranged along the axial direction of the metal housing 10' in parallel and can be matched with a plurality of portions of the notch 11', and thus the locating is more accurate. In one embodiment, the heights of the plurality of locating ribs 23' can be the same or different, and the distances between the adjacent locating ribs 23' can be the same or different.

In the above-mentioned third embodiment to the ten embodiment, portions of the metal housing 10' located on two sides of the notch 11 are depressed inward to form sinking steps 18' matched with the size of the insulating member 20', so that an outer surface of the insulating member 20' is flush with an outer surface of the metal housing 10', as shown in FIGS. 16 to 49.

As the sinking steps 18' are arranged on the metal housing 10', the outer surface of the insulating member 20' can be flush with the outer surface of the metal housing 10', thus improving the aesthetic degree of the housing assembly, and thereby improving the level of the cooking appliance.

In the above-mentioned third embodiment to the twelfth embodiment, the insulating member 20' are simply divided into two or more pieces, which are arranged along the height direction of the metal housing in sequence, that is, one insulating member 20' comprises a plurality of sub insulating members arranged along the height direction of the metal housing in sequence, and the embodiments do not deviate from the design idea or spirit of the present disclosure, thus should belong to the protection scope of the present disclosure.

As shown in FIGS. 58 to 89, in some other embodiments of the present disclosure, a plurality of insulating members are disposed, the plurality of insulating members include a first insulating member and a second insulating member, and the first insulating member and the second insulating member connect the disconnected end of the metal housing and cover the notch, so that the housing assembly forms the closed-loop open circuit structure.

In these embodiments, the metal housing 10" is disconnected, and the disconnected portion of the metal housing is connected by the insulating member, so that the housing assembly is disconnected on the circuit, therefore, the magnetic field induction of the metal housing 10" can be weaken to reduce the temperature rise, and the problem that the metal housing 10" forms a closed loop circuit to easily induce a magnetic field generated by an induction coil disk to produce heat, resulting in too high temperature rise in the prior art is solved; and the two insulating members connect the disconnected portion of the metal housing 10" and cover the notch 11" so that the housing assembly forms the closed loop structure, thereby guaranteeing the integrity of the housing assembly, and guaranteeing the appearance of the cooking appliance as a result; and in addition, two insulating members are installed at one notch 11", and the two insulating members play a double coverage role on the notch 11", thereby guaranteeing the integrity of the housing assembly, and double connection with the metal housing 10" is achieved, thus ensuring the strength of the housing assembly.

It can be understood that as one notch 11" corresponds to the two disconnected ends of the metal housing 10", so the insulating member at one notch 11" should be connected with the two disconnected ends of the metal housing 10" at the notch 11" to guarantee that the housing assembly forms a complete ring-shaped structure.

In one embodiment, the first insulating member 20" and the second insulating member 30" are located on different sides of inner and outer sides of the metal housing 10", as shown in FIGS. 58 to 89.

In one embodiment, the first insulating member 20" and the second insulating member 30" are located on the same side of the metal housing 10", and the second insulating member 30" is located between the first insulating member 20" and the metal housing 10".

The first insulating member 20" and the second insulating member 30" are located on different sides of inner and outer sides of the metal housing 10", namely, the two insulating members are respectively located on the inner side and the outer side of the metal housing 10", specifically, the first insulating member 20" can be located on the inner side and the second insulating member 30" is located on the outer side, or the insulating member 20" is located on the outer side and the second insulating member 30" is located on the inner side, in this way, the two insulating members respectively cover the notch 11" from the inner side and the outer side and are connected with the disconnected ends of the metal housing 10", thus further ensuring the integrity and the strength of the housing assembly; moreover, the problem that the two insulating members are located on the same side of the notch 11" to lead to an overlarge thickness of the notch 11" can be avoided, which is conducive to improving the aesthetic degree of the housing assembly.

Of course, the two insulating members can also located on the same side of the metal housing 10", namely, both are located on the inner side of the metal housing 10", or both are located on the outer side of the metal housing 10", and embodiments of the present disclosure can also be fulfilled. In one embodiment, when the two insulating members are located on the inner side of the metal housing 10", the first insulating member 20" is located on the innermost side to ensure that the second insulating member 30" can be located between the first insulating member 20" and the metal housing 10"; when the two insulating members are located on the outer side of the metal housing 10", the first insulating member 20" is located on the outermost side to ensure that the second insulating member 30" can be located between the first insulating member 20" and the metal housing 10".

The assembly structure of the metal housing 10", the first insulating member 20" and the second insulating member 30" in the present application will be described below in detail in combination with some specific embodiments.

Thirteenth Embodiment (as Shown in FIGS. 58 to 62)

A clamping member is arranged on the first insulating member 20", a first clamping hole 12" and a second clamping hole 31" are respectively formed in the metal housing 10" and the second insulating member 30", and the clamping member is matched with the first clamping hole 12" and the second clamping hole 31", so that the first insulating member 20" and the second insulating member 30" are clamped on the metal housing 10".

The clamping member is an L-shaped buckle 21", and the L-shaped buckle 21" penetrates through the first clamping hole 12" and the second clamping hole 31" and is locked on one, which is away from the first insulating member 20", of the metal housing 10" and the second insulating member 30".

In the above-mentioned embodiment, the metal housing 10" and the two insulating members are clamped together through the cooperation of the clamping member and the first clamping hole 12" and the second clamping hole 31", which not only guarantees the fixed connection between the metal housing 10" and the two insulating members, but also ensures a simpler and quicker assembly process, and helps to improve the assembly efficiency. In one embodiment, as mentioned above, as one insulating member is connected with the two disconnected ends of the metal housing 10" two groups of clamping members and two groups of clamping holes are provided and are respectively located on the two sides of the notch 11" so as to guarantee the reliable connection between the two insulating members and the metal housing 10".

In one embodiment, with respect to the embodiment in which the two insulating members are located on the same side of the metal housing 10", the clamping member can penetrate through the second clamping hole 31" in the second insulating member 30" and then penetrates through the first clamping hole 12" in the metal housing 10"; and with respect to the embodiment in which the two insulating members are respectively located on the inner and outer sides of the metal housing 10", the clamping member can penetrate through the first clamping hole 12" in the metal housing 10" and then penetrates through the second clamping hole 31" in the second insulating member 30".

The clamping member is the L-shaped buckle 21", namely, the clamping member takes the shape of a single-sided hook, during mounting, the L-shaped buckle 21" penetrates through the first clamping hole 12" and the second clamping hole 31" at first, and after the two insulating members and the metal housing 10" are pressed in place, the L-shaped buckle 21" is pushed along the bent direction of the L-shaped buckle 21" until one end of the L-shaped buckle 21" abuts against the walls of the clamping holes, at this time, the other end of the L-shaped buckle 21" abuts against the metal housing 10" (when the two insulating members are located on the same side of the metal housing 10") or the second insulating member 30" (when the two insulating members are located on the inner and outer sides of the metal housing 10' respectively') to achieve the clamping between the metal housing 10" and the two insulating members.

In one embodiment, a plurality of L-shaped buckles 21" are disposed and are divided into two groups, and the two groups of L-shaped buckles 21" are respectively located on the two sides of the notch 11"; the two groups of L-shaped buckles 21" face to the same direction, as shown in FIG. 58; or, the L-shaped buckles 21" face to the notch 11".

As the plurality of L-shaped buckles 21" are disposed, the reliable connection between the metal housing 10" and the two insulating members can be further ensured; as the two groups of L-shaped buckles 21" face to the same direction (for example, both of them facing upward, or downward, or leftward or rightward), all L-shaped buckles 21" can be synchronously assembled to achieve one-step mounting; the two groups of L-shaped buckles 21" face to the notch 11", namely, the two groups of L-shaped buckles 21" face to opposite directions, and when the two groups of L-shaped buckles are assembled in place, as the two disconnected ends of the metal housing 10" have a trend of separating toward the two sides, which is just opposite to the disengaging direction of the L-shaped buckles 21" (when the two disconnected ends approach to each other, the L-shaped buckles 21" can be disengaged), therefore the L-shaped buckles 21" are not liable to disengage from the clamping holes, and the connection is more reliable.

In one embodiment, in each group of L-shaped buckles 21", a barb 211" is arranged at the tail of at least one of the L-shaped buckles 21", a slot 32" (as shown in FIG. 62) or a bump is arranged on one, which is away from the first insulating member 20", of the metal housing 10" and the second insulating member 30", and the barb 211" is clamped in the slot 32" or is hooked on the bump.

The barb 211" is matched with the slot 32" or the bump for retaining the L-shaped buckles 21" to prevent the L-shaped buckles 21" from sliding oppositely to result in the drop of the insulating members, thus further ensuring the reliable connection between the metal housing 10" and the insulating members.

Fourth Embodiment (as Shown in FIGS. 63 to 67)

The difference from the thirteenth embodiment lies in that the clamping member includes a plurality of elastic buckles 22", the plurality of elastic buckles 22" are arranged back to back and enclose an elastic column buckle, as shown in FIG. 63.

The clamping member includes the plurality of elastic buckles 22", the plurality of elastic buckles 22" are arranged back to back and enclose the elastic column buckle, during the mounting, the plurality of elastic buckles 22" are squeezed by the side walls of the two clamping holes to approach to each other, so that the diameter of the elastic column buckle becomes smaller; and when the two insulating members and the metal housing 10" are pressed in place, the end parts of the plurality of elastic buckles 22" protrude from the two clamping holes and restore the deformation, in this way, the diameter of the elastic column buckle is greater than the two clamping holes to be hooked on the metal housing 10" (when the two insulating members are located on the same side of the metal housing 10") or the second insulating member 30" (when the two insulating members are located on the inner and outer sides of the metal housing 10"), such that the metal housing 10" is firmly clamped, the clamping between the metal housing 10" and the two insulating members is achieved, the structure is simple, and the assembly is fast.

Fifteenth Embodiment (as Shown in FIGS. 68 to 73)

The difference from the thirteenth embodiment lies in that the clamping member includes a connecting column 23" with a radial through hole 231" and a spring latch 24" matched with the radial through hole 231", as shown in FIG.

68; the connecting column 23" penetrates through the first clamping hole 12" and the second clamping hole 31", and the spring latch 24" penetrates through the radial through hole 231" and is clamped on the connecting column 23", as shown in FIG. 73.

The clamping member includes the connecting column 23" and the spring latch 24", the radial through hole 231" is formed in the connecting column 23", during the mounting, the connecting column 23" firstly penetrates through the first clamping hole 12" and the second clamping hole 31", and after the two insulating members and the metal housing 10" are pressed in place, the spring latch 24" penetrates through the radial through hole 231", then the spring latch 24" is clamped on the connecting column 23" to avoid the connecting column 23" disengaging from the two clamping holes, the clamping between the metal housing 10" and the two insulating members is achieved, the structure is simple, and the assembly is fast.

Sixth Embodiment (as Shown in FIGS. 74 to 79)

A connecting column 23" capable of plastic deformation is arranged on the first insulating member 20", a first through hole 17" and a second through hole 35" are respectively formed in the metal housing 10" and the second insulating member 30", as shown in FIG. 74; the connecting column 23" penetrates through the first through hole 17" and the second through hole 35", a portion of the connecting column 23" protruding from the first through hole 17" and the second through hole 35" deforms into a stopper projection 232" with a section size greater than the size of one, which is away from the first insulating member 20", of the first through hole 17" and the second through hole 35", as shown in FIGS. 78 and 79, and the stopper projection 232" abuts against one, which is away from the first insulating member 20", of the metal housing 10" and the second insulating member 30", so that the first insulating member 20" and the second insulating member 30" are fixedly connected with the metal housing 10".

The connecting column 23" is arranged on the first insulating member 20", the first through hole 17" and the second through hole 35" are respectively formed in the metal housing 10" and the second insulating member 30", during the mounting, the connecting column 23" penetrates through the first through hole 17" and the second through hole 35" at first, and after the two insulating members and the metal housing 10" are pressed in place, the portion of the connecting column 23" protruding from the two through holes is welded flat by using a heat welding process or an ultrasonic welding process, so that it is close to the metal housing 10" or the second insulating member 30", the portion of the connecting column 23" protruding from the two through holes forms the stopper projection 232" after being cooled, as the size of the stopper projection 232" is greater than that of the through hole, the stopper projection can abut against the metal housing 10" or the second insulating member 30" to firmly clamp the metal housing 10" so as to achieve the fixed connection between the metal housing 10" and the two insulating members.

In one embodiment, when the two insulating members are located on the same side of the metal housing 10", the connecting column 23" penetrates through the second through hole 35" in the second insulating member 30" at first and then pentanes through the first through hole 17" in the metal housing 10", the size of the finally formed stopper projection 232" is greater than that of the first through hole 17", so that the stopper projection 232" abut against the metal housing 10" to guarantee the fixed connection between the metal housing 10" and the two insulating members; and when the two insulating members are located on different sides of the metal housing 10", the connecting column 23" penetrates through the first through hole 17" in the metal housing 10" at first and then pentanes through the second through hole 35" in the second insulating member 30", the size of the finally formed stopper projection 232" is greater than that of the second through hole 35", so that the stopper projection 232" abut against the second insulating member 30" to guarantee the fixed connection between the metal housing 10" and the two insulating members.

Seventh Embodiment (as Shown in FIGS. 80 to 84)

A first connecting hole 25", a second connecting hole 13" and a third connecting hole 33" are respectively formed in the first insulating member 20", the metal housing 10" and the second insulating member 30", and a fastener penetrates through the first connecting hole 25", the second connecting hole 13" and the third connecting hole 33", so that the first insulating member 20" and the second insulating member 30" are fixedly connected with the metal housing 10", as shown in FIGS. 80,83 and 84.

The connecting holes are formed in both of the two insulating members and the metal housing 10", the fastener penetrates through the connecting holes to fixedly connect the two insulating members with the metal housing 10" so as to form a stable entirety, which is very reliable. In one embodiment, the fastener can be a screw, a rivet 40" or other single component, and can also be screw-and-nut, bolt-and-nut, or other combined parts, which are not enumerated herein.

Eighteenth Embodiment (as Shown in FIGS. 85 to 89)

A glue tank 26" is formed in at least one of the first insulating member 20" and the second insulating member 30", and the first insulating member 20" and the second insulating member 30" are adhered with the metal housing 10" through an adhesive, as shown in FIGS. 85 and 89.

In one embodiment, a locating column 27" is arranged on the first insulating member 20", as shown in FIGS. 85 and 88, a first locating hole 14" and a second locating hole 34" are respectively formed in the metal housing 10" and the second insulating member 30", and the locating column 27" penetrates through the first locating hole 14" and the second locating hole 34".

By means of gluing, the fixed connection between the two insulating members and the metal housing 10" can also be conveniently achieved, and the price is low, and the assembly is convenient; and the arrangement of the glue tank 26" ensures that sufficient adhesive can be applied to ensure the adhesive strength, and the two insulating members can be conveniently attached to the metal housing 10" firmly to avoid gaps, adhesive overflow and other situations, which is conducive to improving the aesthetic degree of the product.

In one embodiment, when the two insulating members are located on the same side of the metal housing 10", the two insulating members are adhered by the adhesive, and the second insulating member 30" and the metal housing 10" are also adhered together through the adhesive; when the two insulating members are located on different sides of the metal housing 10", the glue tank 26" communicates with the notch 11", in this way, the glue tank 26" may be formed only in one insulating member and the adhesive can adhere three components together.

After the locating column 27" on the first insulating member 20" penetrates through the first through hole 14" and the second locating hole 34", on one hand, the three components achieve an effective locating effect, the relative position relationship between the three components is guaranteed, and the fool-proof purpose is achieved during the assembly; and on the other hand, the three components can be restricted from generating relative movement in the circumferential direction or the axial direction of the metal housing 10" so as to further improve the connection strength and the stability of the housing assembly.

In the above-mentioned thirteenth embodiment to the eighteenth embodiment, the first insulating member 20" is located on the outer side of the second insulating member 30" along the radial direction of the metal housing 10", as shown in FIGS. 58 to 89.

The first insulating member 20" is located on the outer side of the second insulating member 30" along the radial direction of the metal housing 10", then as for the embodiment in which the two insulating members are located on the same side of the metal housing 10" and the second insulating member 30" is located between the metal housing 10" and the first insulating member 20", the two insulating members are located on the outer side of the metal housing 10"; as for the embodiment in which the two insulating members are located on different sides of the metal housing 10", the first insulating member 20" is located on the outer side of the metal housing 10", and the second insulating member 30" is located on the outer side of the metal housing 10". In this way, it is guaranteed that the first insulating member 20" is located on the outermost side of the metal housing 10", so that the specific assembly structure of the two insulating members and the metal housing 10" can be hidden within the housing assembly instead of being exposed to the outside, such that the appearance of the housing assembly is smoother, and thus the aesthetic degree of the cooking appliance is further improved.

In the above-mentioned thirteenth embodiment to the eighteenth embodiment, the width of the notch 11" along the circumferential direction of the metal housing 10" is greater than or equal to 2 mm.

The width of the notch 11" along the circumferential direction of the metal housing 10" is greater than or equal to 2 mm, in order to ensure a certain distance at the disconnected portion of the metal housing 10" so as to avoid the occurrence of sparks, heating and other situations at the disconnected portion due to a very small distance, thereby guaranteeing the safety and the use reliability of the product In the above-mentioned thirteenth embodiment to the eighteenth embodiment, a mounting groove 16" is formed in a top end of the tail of the metal housing 10", one notch 11" is formed, and the notch 11" is located below the mounting groove 16" and communicates with the mounting groove 16", as shown in FIGS. 58 to 89.

Since one notch 11" can ensure that the housing assembly does not form a closed loop on the circuit, only one notch 11" is formed in embodiments of the present disclosure; and one notch 11" can minimize the number of the insulating members, thus not only reducing the cost, but also improving the production efficiency. As the notch 11" is formed in the tail of the metal housing 10", on one hand, the notch 11" and the insulating members are located at unusual positions of the cooking appliance, thereby improving the overall aesthetic degree of the cooking appliance; and on the other hand, the tail of the metal housing 10" is generally provided with the mounting groove 16" for mounting a hinge or matched with other structure of the cooking appliance, the notch 11" is formed herein to reduce the size of the notch 11" relatively, thus further improving the aesthetic degree of the product.

As for the specific height (along the axial direction of the metal housing 10") and the specific width (along the circumferential direction of the metal housing 10", preferably being greater than or equal to 2 mm) of the notch 11", adjustment may be made according to the structure of the product.

Of course, a plurality of notches 11" can also be formed, the plurality of notches 11" are all connected by the insulating members, and thus is also within the protection scope of the present disclosure; when there is one notch 11", it can also be formed in other position of the metal housing 10".

In the above-mentioned thirteenth embodiment to the eighteenth embodiment, the notch 11" is square, as shown in FIGS. 58 to FIG. 89.

The notch 11" is square (rectangular or foursquare), thereby being convenient to process and form and being convenient to assemble with the insulating member, and it has a regular shape and beautiful appearance. Of course, the shape of the notch 11" is not limited to the above-mentioned square, but can also be other shape, which will not be enumerated herein, but all shall fall within the protection scope of the present disclosure.

In any one of the above-mentioned embodiments, portions of the metal housing 10" located on two sides of the notch 11" are depressed inward to form sinking steps 15" matched with the size of the first insulating member 20" or the second insulating member 30", as shown in FIGS. 58 to 89, so that an outer surface of the first insulating member 20" or the second insulating member 30" is flush with an outer surface of the metal housing 10".

As the sinking steps 15" are arranged on the metal housing 10", the outer surface of the first insulating member 20" (when the first insulating member 20" is located on the outermost side) or the second insulating member 30" (when the second insulating member 30" is located on the outermost side) can be flush with the outer surface of the metal housing 10", thus improving the aesthetic degree of the housing assembly, and thereby improving the level of the cooking appliance.

As shown in FIGS. 90 to 96, the housing assembly provided by the embodiment of the second embodiment of the present disclosure is applied to an electromagnetic induction heating cooking appliance, the housing assembly being sleeved on the outer side of a liner of the cooking appliance, the housing assembly including: a base 30'''; a housing cover 40''', a metal housing 10''' and a shielding piece 20'''.

In one embodiment, the housing cover 40''' located above the base 30'''; the metal housing 10''' is arranged between the base 30''' and the housing cover 40''' and connected with the base 30''' and the housing cover 40''', the metal housing 10''' takes the shape of a disconnected ring on the whole, and a notch 11''' is formed at a disconnected portion of the metal housing 10'''; the shielding piece 20''' is an insulating member, and the shielding piece 20''' covers the notch 11''' to form a closed-loop open circuit structure with the metal housing 10'''.

In one embodiment, as the metal housing 10''' is disconnected, and the disconnected portion of the metal housing 10''' is shielded by the insulating shielding piece 20''', so that the housing assembly is disconnected on the circuit, therefore, the magnetic field induction of the metal housing 10''' can be weaken to reduce the temperature rise, and the problem that the metal housing 10''' forms a closed loop circuit to easily induce a magnetic field generated by an induction coil disk to produce heat, resulting in too high temperature rise in the prior art is solved; and the metal housing 10''' is connected with the base 30''' and the housing cover 40''', that is, the metal housing 10''' is retained between the base 30''' and the housing cover 40''', thereby ensuring that the disconnected end of the metal housing 10''' does not drop, and the shielding piece 20''' covers the notch 11''' of the metal housing 10''', thereby guaranteeing the integrity of the housing assembly, and guaranteeing the appearance of the cooking appliance as a result.

Further, curled edges 14''' are arranged on the upper end and the lower end of the metal housing 10''', a first stopper groove 31''' and a second stopper groove 41''' are respectively formed in the housing cover 40''' and the base 30''', the curled edges 14''' are embedded in the first stopper groove 31''' and the second stopper groove 41''', so that the metal housing 10''' is clamped and fixed between the housing cover 40''' and the base 30'''.

The curled edges 14''' on the upper end and the lower end of the metal housing 10''' are respectively embedded in the first stopper groove 31''' in the housing cover 40''' and the second stopper groove 41''' in the base 30''', so that the metal housing 10''' can be clamped between the housing cover 40''' and the base 30''', and the base 30''', the metal housing 10''' and the housing cover 40''' are assembled to form a stable entirety, and the assembly process is very convenient; and punching on the base 30''', the metal housing 10''' and the housing cover 40''' can be reduced as much as possible, thereby improving the assembly efficiency and improving the strength of the three components.

In the above-mentioned embodiment, as shown in FIG. 90, the width a''' of the notch 11''' along the circumferential direction of the metal housing 10''' is greater than or equal to 2 mm.

The width a''' of the notch 11''' along the circumferential direction of the metal housing 10''' is greater than or equal to 2 mm, in order to ensure a certain distance at the disconnected portion of the metal housing 10''' so as to avoid the occurrence of sparks, heating and other situations at the disconnected portion due to a very small distance, thereby guaranteeing the safety and the use reliability of the product.

In one embodiment, as shown in FIGS. 90 and 94, a mounting groove 12''' is formed in a top end of the tail of the metal housing 10''', one notch 11''' is formed, and the notch 11''' is located below the mounting groove 16''' and communicates with the mounting groove 12'''.

Since one notch 11''' can ensure that the housing assembly does not form a closed loop on the circuit, only one notch 11''' is formed in embodiments of the present disclosure; and one notch 11''' can minimize the number of the shielding pieces 20''', thus not only reducing the cost, but also improving the production efficiency. As the notch 11''' is formed in the tail of the metal housing 10''', on one hand, the notch 11''' and the shielding pieces 20''' are located at unusual positions of the cooking appliance, thereby improving the overall aesthetic degree of the cooking appliance; and on the other hand, the tail of the metal housing 10''' is generally provided with the mounting groove 12''' for mounting a hinge or matched with other structure of the cooking appliance, the notch 11''' is formed herein to reduce the size of the notch 11''' relatively, thus further improving the aesthetic degree of the product.

As for the specific height (along the axial direction of the metal housing 10''') and the specific width (along the circumferential direction of the metal housing 10''', preferably being greater than or equal to 2 mm) of the notch 11''', adjustment may be made according to the structure of the product.

Of course, a plurality of notches 11''' can also be formed, the plurality of notches 11''' are all connected by the shielding pieces 20''', which are according to embodiments of the present disclosure, and thus is also within the protection scope of the present disclosure; when there is one notch 11''', it can also be formed in other position of the metal housing 10'''.

In one embodiment, the notch 11''' is square, as shown in FIGS. 90 to 94.

The notch 11''' is square (rectangular or foursquare), thereby being convenient to process and form and being convenient to assemble with the shielding pieces 20''', and it has a regular shape and beautiful appearance. Of course, the shape of the notch 11''' is not limited to the above-mentioned square, but can also be other shape, which will not be enumerated herein, but all shall fall within the protection scope of the present disclosure.

In one embodiment, the shielding piece 20''' is fixedly connected with the base 30'''.

In one embodiment, the shielding piece 20''' and the base 30''' are of an integrated structure, as shown in FIGS. 90, 91, 93, 94, 95 and 96.

In one embodiment, the shielding piece 20''' is fixedly connected with the housing cover 40'''.

In one embodiment, the shielding piece 20''' and the housing cover 40''' are of an integrated structure.

The shielding piece 20''' and the base 30''' are fixedly connected (for example, through a screw, a rivet 50''' or other fastener) or are of an integrated structure (for example, integrally formed by injection molding), that is, the shielding piece 20''' is located on the base 30''' and extends out from bottom to top, that is, during the assembly, the base 30''', the metal housing 10''' and the housing cover 40''' are directly assembled in place, it is guaranteed that the metal housing 10''' is fixed between the base 30''' and the housing cover 40''', at this time, the shielding piece 20''' protruding upward is just located at the notch 11''' of the metal housing 10''' to shield the notch 11''', which is very convenient; meanwhile, the shielding piece 20''' extends out from the base 30''', thus being unlikely to drop, and the stable cooperation between the shielding piece 20''' and the metal housing 10''' can be guaranteed without separately fixing the shielding piece 20''' and the metal housing 10''', such that the assembly efficiency is improved; and in addition, as the shielding piece 20''' is integrally formed with the base 30''', the assembly procedure between the shielding piece 20''' and the base 30''' can be omitted, and thus the assembly efficiency is further improved.

Similarly, the shielding piece 20''' and the housing cover 40''' are fixedly connected (for example, through a fastener) or are of an integrated structure (for example, integrally formed by injection molding), that is, the shielding piece 20''' is fixed on the housing cover 40''' and extends out from bottom to top, that is, during the assembly, the base 30''', the metal housing 10''' and the housing cover 40''' are directly assembled in place, it is guaranteed that the metal housing 10''' is fixed between the base 30''' and the housing cover 40''', at this time, the shielding piece 20''' protruding upward is just located at the notch 11''' of the metal housing 10''' to shield the notch 11''', which is very convenient; meanwhile, the shielding piece 20''' extends out from the housing cover

40''', thus being unlikely to drop, and the stable cooperation between the shielding piece 20''' and the metal housing 10''' can be guaranteed without separately fixing the shielding piece 20''' and the metal housing 10''', such that the assembly efficiency is improved; and in addition, as the shielding piece 20''' and the housing cover 40''' are of the integrated structure, the assembly procedure between the shielding piece 20''' and the housing cover 40''' can be omitted, and thus the assembly efficiency is further improved.

In one embodiment, the shielding piece 20''' is adhered on the metal housing 10'''.

In one embodiment, the shielding piece 20''' is fixed to the metal housing 10''' through the fastener, as shown in FIGS. 94 to 96.

A package similar to a nameplate is adhered to the disconnected portion of the metal housing 10''' to shield the notch 11''', in accordance with embodiments of the present disclosure. The nameplate-like package serves as the shielding piece 20''', and the package is lower in cost and is convenient to design into a variety of more beautiful packages, thereby being conducive to further improving the aesthetic degree of the product.

Of course, the shielding piece 20''' can also be fixed to the metal housing 10''' by fasteners such as screws, rivets 50''' or the like, which ensures the stable connection between the shielding piece 20''' and the metal housing 10''', and guarantees that the shielding piece 20''' does not drop to expose the notch 11''' of the metal housing 10''', and accordingly the use reliability of the product is further improved.

It can be understood that no matter the shielding piece 20''' is adhered on the metal housing 10''' or fixed to the metal housing 10''' through the fastener, it is irrelevant to the connection relationship between the shielding piece 20''' and the base 30''' or the housing, that is, in the two solutions, the shielding piece 20''' can be fixedly connected with or integrally formed with the base 30''' or the housing cover 40''', and can also be a separate component, and the shielding piece 20''' is just fixedly connected.

In the embodiment, the metal housing 10''' is clamped between the base 30''' and the housing cover 40''', and the base 30''' and the housing cover 40''' are fixedly connected by the fastener, as shown in FIGS. 90 to 93.

In one embodiment, the metal housing 10''' is fixedly connected with the base 30''' through a fastener, as shown in FIGS. 94 to 96.

In one embodiment, the metal housing 10''' is fixedly connected with the housing cover 40''' through a fastener.

With respect to the fixing structure of the metal housing 10''', the metal housing 10''' can be directly clamped between the base 30''' and the housing cover 40''', and the base 30''' and the housing cover 40''' are fixedly connected by the fastener, in this way, the metal housing 10''' is fixed between the base 30''' and the housing cover 40''' through the assembly relationship of the three components so as to ensure the relative stability of the three components; and meanwhile, the base 30''' and the housing cover 40''' are further connected by the fastener (for example, a rivet 50''', a screw or other fastener or fastening combination), in order to restrict the disconnected end of the metal housing 10''' from dropping outward so as to further guarantee the effective fixation of the metal housing 10'''.

Of course, the metal housing 10''' can be fixed to the base 30''' through the fastener at first, and then the housing cover 40''', the metal housing 10''' and the base 30''' are assembled together; or, the metal housing 10''' is fixed to the housing cover 40''' through the fastener, and then the three components are assembled together to effectively restrict the disconnected end of the metal housing 10''' from dropping outward so as to further guarantee the effective fixation of the metal housing 10'''.

It should be noted that, for the embodiment in which the shielding piece 20''' is arranged on the base 30''' or the housing cover 40''', the specific fixing position of the fastener can be arranged on the shielding piece 20''' and the disconnected end of metal housing 10''', namely, connecting holes are respectively formed in the disconnected end of metal housing 10''' and the shielding piece 20''', the fastener penetrates through the through holes in the metal housing 10''' and the shielding piece 20''' to achieve the fixed connection between the metal housing 10''' and the base 30''' or the housing cover 40'''; this directly fixes the disconnected end of metal housing 10''' on one hand, therefore being the most firm, and meanwhile the fixed connection between the metal housing 10''' and the shielding piece 20''' is achieved, thereby saving the fasteners to reduce the cost and improve the assembly efficiency.

In one embodiment, the shielding piece 20''' is located on the inner side of the metal housing 10'''.

In one embodiment, the shielding piece 20''' is located on the outer side of the metal housing 10''', as shown in FIGS. 90, 91, 92, 94, 95 and 96.

No matter the shielding piece 20''' is located on the inner side or the outer side of the metal housing 10''', it can shield the notch 11''' so as to guarantee the integrity of the housing assembly.

In the above-mentioned embodiment, as shown in FIGS. 90 and 94, portions of the metal housing 10''' located on two sides of the notch 11''' are depressed inward to form sinking steps 13''' matched with the size of the shielding piece 20''', so that an outer surface of the shielding piece 20''' is flush with an outer surface of the metal housing 10'''.

With respect to the embodiment in which the shielding piece 20''' is located on the outer side of the metal housing 10''', the sinking steps 13''' is arranged on the metal housing 10''', in this way, the shielding piece 20''' is embedded in the sinking steps 13''', so that the outer surface of the shielding piece 20''' can be flush with the outer surface of the metal housing 10''', thus improving the aesthetic degree of the housing assembly, and thereby improving the level of the cooking appliance.

In one embodiment of the present disclosure will be described below in detail in combination with two specific embodiments.

Nineteenth Embodiment (as Shown in FIGS. 90 to 93)

The metal housing 10''' is clamped between the base 30''' and the housing cover 40''', and the base 30''' and the housing cover 40''' are fixedly connected by a screw; a mounting groove 12''' is formed in a top end of the tail of the metal housing 10''', one notch 11''' is formed and is located below the mounting groove 12''', and the notch 11''' is square; the shielding piece 20''' is integrally formed with the base 30''', and the shielding piece 20''' protrudes from the outer side of the metal housing 10''' and shields the disconnected portion of the metal housing 10''' at the tail; and a sinking step 13''' is arranged at the disconnected end of the metal housing 10''', and the shielding piece 20''' is located in the sinking step 13''', so that the outer surface of the shielding piece is flush with the outer surface of the metal housing 10'''.

Twentieth Embodiment (Not Shown in the Drawings)

The difference from the nineteenth embodiment lies in that the shielding piece 20''' is integrally formed with the housing cover 40'''.

Twenty First Embodiment (as Shown in FIGS. 94 to 96)

The difference from the nineteenth embodiment lies in that through holes are formed in the metal housing 10''' and the shielding piece 20''' of the base 30''', the metal housing 10''' and the base 30''' are firstly connected together through the rivet 50''', and finally the housing cover 40''', the metal housing 10''' and the base 30''' are assembled together to form an entirety.

Twenty Second Embodiment (Not Shown in the Drawings)

The difference from the twenty first embodiment lies in that the shielding piece 20''' is integrally formed with the housing cover 40''', through holes are formed in the metal housing 10''' and the shielding piece 20''' of the housing cover 40''', the metal housing 10''' and the housing cover 40''' are firstly connected together through the rivet 50''', and finally the housing cover 40''', the metal housing 10''' and the base 30''' are assembled together to form an entirety.

A cooking appliance (not shown in the drawings) provided by the embodiment of the present disclosure includes: an electromagnetic induction heating device, a liner and the housing assembly in any one of the embodiments of the present disclosure.

In one embodiment, a magnetic line of flux produced by the electromagnetic induction heating device can penetrate through the liner, so that the liner performs induction heating; and the housing assembly being sleeved on the outer side of the liner.

As the cooking appliance provided by the embodiment of the present disclosure includes the housing assembly in any one of the embodiments of the present disclosure, the cooking appliance has all beneficial effects of any one of the above-mentioned embodiments, which will not repeated herein.

In any one of the above-mentioned embodiments, the cooking appliance is an IH rice cooker or an IH electric pressure cooker. Of course, the cooking appliance is not limited to the IH rice cooker or the IH electric pressure cooker, and other cooking appliance adopting electromagnetic induction heating can also be adopted.

In summary, according to the housing assembly provided by the present disclosure, as the metal housing is disconnected, and the disconnected portion of the metal housing is connected by the insulating member, so that the housing assembly is disconnected on the circuit, therefore, the magnetic field induction of the metal housing can be weaken to reduce the temperature rise, and the problem that the metal housing forms a closed loop circuit to easily induce a magnetic field generated by an induction coil disk to produce heat, resulting in too high temperature rise in the prior art is solved; and the insulating member connects the disconnected portion of the metal housing and covers the notch so that the housing assembly forms the closed loop structure, thereby guaranteeing the integrity of the housing assembly, and guaranteeing the appearance of the cooking appliance as a result.

In spite of appended claims, the present disclosure is also defined by the following clauses:

1. A housing assembly for an electromagnetic induction heating cooking appliance, comprising: a metal housing which is an annular housing on the whole with one or a plurality of disconnected potions, with one or a plurality of notches correspondingly formed at each of the disconnected portions of the metal housing; and one or a plurality of insulating members, each connecting two ends of one of the disconnected portions of the metal housing and covering the notch correspondingly formed by the one of the disconnected portions so that the housing assembly forms a closed-loop open circuit structure, and the number of the insulating members is the same as the number of the notches, and the insulating members are in one-to-one correspondence with the notches.

2. The housing assembly according to clause 1, a clamping hole is formed in one of the metal housing and the insulating member, a clamping member is arranged on the other of the metal housing and the insulating member, and the clamping member is matched with the clamping hole, so that the insulating member is clamped with the metal housing.

3. The housing assembly according to clause 2, the clamping member is an L-shaped buckle, and the L-shaped buckle penetrates through the clamping hole and abuts against one of the metal housing and the insulating member.

4. The housing assembly according to clause 3, a plurality of L-shaped buckles are disposed and are divided into two groups, and the two groups of L-shaped buckles are respectively located on the two sides of the notch; the two groups of L-shaped buckles face to the same direction; or, the L-shaped buckles are located on the insulating member, and the two groups of L-shaped buckles face to the notch; or, the L-shaped buckles are located on the metal housing, and the two groups of L-shaped buckles face away from the notch.

5. The housing assembly according to clause 4, in each group of L-shaped buckles, a barb is arranged at the tail of at least one of the L-shaped buckles, a bump is arranged on one of the metal housing and the insulating member, and the barb is hooked on the bump.

6. The housing assembly according to clause 2, the clamping member comprises a plurality of elastic buckles, and the plurality of elastic buckles are arranged back to back and enclose an elastic column buckle.

7. The housing assembly according to clause 2, the clamping member comprises a connecting column with a radial through hole and a spring latch matched with the radial through hole, and the connecting column penetrates through the clamping hole, and the spring latch penetrates through the radial through hole and is clamped on the connecting column.

8. The housing assembly according to any one of clauses 2-7, a rim for protecting the clamping member is arranged on the peripheral edge of the clamping hole.

9. The housing assembly according to clause 1, a through hole is formed in one of the metal housing and the insulating member, and a connecting column capable of plastic deformation is arranged on the other; the connecting column penetrates through the clamping hole, a portion of the connecting column protruding from the through hole deforms into a stopper projection with a section size greater than the size of the through hole, and the stopper projection abuts against one of the metal housing and the insulating member, so that the insulating member is fixedly connected with the metal housing.

10. The housing assembly according to clause 9, when the connecting column is arranged on the metal housing, the connecting column is a hollow connecting column.

11. The housing assembly according to clause 1, through holes are formed in both of the insulating member and the metal housing, a fastener penetrates through the through holes in the insulating member and the metal housing, so that the insulating member is fixedly connected with the metal housing.

12. The housing assembly according to clause 1, a jagged through hole is formed in one of the metal housing and the insulating member, a connecting column is arranged on the other of the metal housing and the insulating member, and the connecting column penetrates through the jagged through hole and is retained in the jagged through hole, so that the insulating member is fixedly connected with the metal housing.

13. The housing assembly according to clause 1, a folded plate is arranged on the metal housing, a connecting hole matched with the folded plate is formed in the insulating member, and the folded plate is locked on the insulating member after penetrating through the connecting hole, so that the insulating member is fixedly connected with the metal housing.

14. The housing assembly according to clause 13, a boss is further arranged on the insulating member, the boss is located on the edge of the connecting hole, and the folded plate is firstly bent and pressed on the boss and then is bent and pressed on the insulating member.

15. The housing assembly according to clause 1, edges of the metal housing located on two sides of the notch are bent to form two first rail grooves with opposite openings, two ends of the insulating member are bent to form two second rail grooves with opposite openings, and the two first rail grooves are hooked with the two second rail grooves, so that the insulating member is fixedly connected with the metal housing.

16. The housing assembly according to clause 15, the openings of the two first rail grooves face away from the notch, and the openings of the two second rail grooves face to the notch.

17. The housing assembly according to clause 15, a free end of one of the first rail groove and the second rail groove is provided with a folded edge, and the folded edge abuts against the other of the first rail groove and the second rail groove.

18. A cooking appliance, comprising: an electromagnetic induction heating device; a liner, and a magnetic line of flux produced by the electromagnetic induction heating device can penetrate through the liner, so that the liner performs induction heating; and the housing assembly according to any one of clauses 1-18, which is sleeved on the outer side of the liner.

19. The cooking appliance according to clause 18, the cooking appliance is an IH rice cooker or an IH pressure cooker.

20. A housing assembly for an electromagnetic induction heating cooking appliance, comprising: a metal housing which takes the shape of a disconnected ring on the whole, with a notch formed at a disconnected portion of the metal housing; and a first insulating member and a second insulating member connecting a disconnected end of the metal housing and covering the notch so that the housing assembly forms a closed-loop open circuit structure.

21. The housing assembly according to clause 20, the first insulating member and the second insulating member are located on different sides of inner and outer sides of the metal housing.

22. The housing assembly according to clause 20, the first insulating member and the second insulating member are located on the same side of the metal housing, and the second insulating member is located between the first insulating member and the metal housing.

23. The housing assembly according to any one of clauses 20-22, a clamping member is arranged on the first insulating member, a first clamping hole and a second clamping hole are respectively formed in the metal housing and the second insulating member, and the clamping member is matched with the first clamping hole and the second clamping hole, so that the first insulating member and the second insulating member are clamped on the metal housing.

24. The housing assembly according to clause 23, the clamping member is an L-shaped buckle, and the L-shaped buckle penetrates through the first clamping hole and the second clamping hole and is locked on one, which is away from the first insulating member, of the metal housing and the second insulating member.

25. The housing assembly according to clause 24, a plurality of L-shaped buckles are disposed and are divided into two groups, and the two groups of L-shaped buckles are respectively located on the two sides of the notch; the two groups of L-shaped buckles face to the same direction; or, the two groups of L-shaped buckles face to the notch.

26. The housing assembly according to clause 25, in each group of L-shaped buckles, a barb is arranged at the tail of at least one of the L-shaped buckles, a slot or a bump is arranged on one, which is away from the first insulating member, of the metal housing and the second insulating member, and the barb is clamped in the slot or is hooked on the bump.

27. The housing assembly according to clause 23, the clamping member comprises a plurality of elastic buckles, and the plurality of elastic buckles are arranged back to back and enclose an elastic column buckle.

28. The housing assembly according to clause 23, the clamping member comprises a connecting column with a radial through hole and a spring latch matched with the radial through hole, and the connecting column penetrates through the first clamping hole and the second clamping hole, and the spring latch penetrates through the radial through hole and is clamped on the connecting column.

29. The housing assembly according to any one of clauses 20-22, a connecting column capable of plastic deformation is arranged on the first insulating member, a first through hole and a second through hole are respectively formed in the metal housing and the second insulating member, and the connecting column penetrates through the first through hole and the second through hole, a portion of the connecting column protruding from the first through hole and the second through hole deforms into a stopper projection with a section size greater than the size of one, which is away from the first insulating member, of the first through hole and the second through hole, and the stopper projection abuts against one, which is away from the first insulating member, of the metal housing and the second insulating member, so that the first insulating member and the second insulating member are fixedly connected with the metal housing.

30. The housing assembly according to any one of clauses 20-22, a first connecting hole, a second connecting hole and a third connecting hole are respectively formed in the first insulating member, the metal housing and the second insulating member, and a fastener penetrates through the first connecting hole, the second connecting hole and the third connecting hole, so that the first insulating member and the second insulating member are fixedly connected with the metal housing.

31. The housing assembly according to any one of clauses 20-22, a glue tank is formed in at least one of the first insulating member and the second insulating member, and the first insulating member and the second insulating member are adhered with the metal housing through an adhesive.

32. The housing assembly according to clause 31, a locating column is arranged on the first insulating member, a first locating hole and a second locating hole are respectively formed in the metal housing and the second insulating member, and the locating column penetrates through the first locating hole and the second locating hole.

33. The housing assembly according to any one of clauses 20-22, the first insulating member is located on the outer side of the second insulating member along the radial direction of the metal housing.

34. A cooking appliance, comprising: an electromagnetic induction heating device; a liner, and a magnetic line of flux produced by the electromagnetic induction heating device can penetrate through the liner, so that the liner performs induction heating; and the housing assembly according to any one of clauses 20-33, which is sleeved on the outer side of the liner.

35. The cooking appliance according to clause 34, the cooking appliance is an IH rice cooker or an IH pressure cooker.

In the present disclosure, the terms "first", "second", and "third" are used for the purpose of description only, and cannot be understood as indicating or implying relative importance; the term "plurality" means two or more, unless otherwise expressly defined. The terms "mounting", "connected" "connection", "fixing" and the like should be understood in a broad sense. For example, "connection" may be a fixed connection, a removable connection or an integral connection; the "connected" may be directly connected and may also be indirectly connected through the intermediary.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and does not indicate or imply that the pointed device or unit must have a particular direction and is constructed and operated in a specific orientation, and thus cannot be understood as the limitation of the present disclosure.

In the description of the present specification, descriptions of the terms "one embodiment", "some embodiments" and "specific embodiments" and the like mean that specific features, structures, materials or characteristics described in conjunction with the embodiment or example are included in at least one embodiment or example of the present disclosure. In the specification, the schematic representation of the above terms does not necessarily refer to the same embodiment or example. Moreover, the particular features, structures, materials or characteristics described may be combined in any suitable manner in one or more embodiments or examples.

What is claimed is:

1. A cooking appliance, comprising:
an electromagnetic induction heating device;
a liner, wherein a magnetic line of flux produced by the electromagnetic induction heating device can penetrate the liner, so that the liner performs induction heating; and
a housing assembly for the electromagnetic induction heating device, the housing assembly being sleeved on the outer side of the liner of the cooking appliance, wherein the housing assembly comprises:
a metal housing which is an annular housing on the whole with one or a plurality of disconnected potions, with one or a plurality of notches correspondingly formed at each of the disconnected portions of the metal housing, each notch having a width along the circumferential direction of the metal housing that is greater than or equal to 2 mm; and
one or a plurality of insulating members, each connecting two ends of one of the disconnected portions of the metal housing and covering the notch correspondingly formed by the one of the disconnected portions so that the housing assembly forms a closed-loop open circuit structure.

2. The housing assembly according to claim 1, wherein a buckle is arranged on one of the metal housing and each insulating member, a clamping hole is formed in the other of the metal housing and each insulating member, and the buckle is matched with the clamping hole, so that the metal housing is clamped with each insulating member.

3. The housing assembly according to claim 1, wherein at least one locating rib matching with each notch is arranged on each insulating member.

4. The housing assembly according to claim 3, wherein the number of the locating ribs at each notch is plural, and a plurality of the locating ribs are arranged in parallel along the axial direction of the metal housing.

5. The housing assembly according to claim 1, wherein the metal housing is an insert, each insulating member is made of plastic, and each insulating member and the metal housing are integrally formed by injection molding.

6. The housing assembly according to claim 5, wherein a through hole in which each insulating member is partially embedded is formed in the metal housing; and/or,
a stopper protrusion is arranged on the metal housing, and the stopper protrusion is embedded in each insulating member.

7. The housing assembly according to claim 1, wherein the number of the insulating members is equal to the number of the notches, and the insulating members correspond to the notches one by one.

8. The housing assembly according to claim 7, wherein a clamping hole is formed in one of the metal housing and each insulating member, a clamping member is arranged on the other of the metal housing and each insulating member, and the clamping member is matched with the clamping hole, so that each insulating member is clamped with the metal housing.

9. The housing assembly according to claim 8, wherein the clamping member is a n L-shaped buckle, and the L-shaped buckle penetrates the clamping hole and abuts against the one of the metal housing and the insulating member.

10. The housing assembly according to claim 9, wherein the number of L-shaped buckles is plural and are divided into two groups, and the two groups of L-shaped buckles are respectively located on two sides of the notch; and
the two groups of L-shaped buckles face to the same direction; or the L-shaped buckles are located on the insulating member, and the two groups of L-shaped buckles face to the notch; or the L-shaped buckles are located on the metal housing, and the two groups of L-shaped buckles face away from the notch.

11. The housing assembly according to claim 10, wherein a barb is arranged at the tail of at least one of the L-shaped buckles in each group of L-shaped buckles, a bump is arranged on one of the metal housing and the insulating member, and the barb is hooked on the bump.

12. The housing assembly according to claim 8, wherein the clamping member comprises a plurality of elastic buckles, and the plurality of elastic buckles are arranged back to back and enclose an elastic column buckle; or the clamping member comprises a connecting column with a radial through hole and a spring latch matched with the radial through hole, wherein the connecting column penetrates the clamping hole, and the spring latch penetrates the radial through hole and is clamped on the connecting column.

13. The housing assembly according to claim 8, wherein a rim for protecting the clamping member is arranged on the peripheral edge of the clamping hole.

14. The housing assembly according to claim 7, wherein a through hole is formed in one of the metal housing and each insulating member, and a connecting column having the ability of plastic deformation is arranged on the other of the metal housing and each insulating member;

the connecting column penetrates the clamping hole, a portion of the connecting column protruding from the through hole deforms into a stopper projection with a section size being greater than the size of the through hole, and the stopper projection abuts against the one of the metal housing and each insulating member, so that each insulating member is fixedly connected with the metal housing.

15. The housing assembly according to claim 14, wherein when the connecting column is arranged on the metal housing, and the connecting column is a hollow connecting column.

16. The housing assembly according to claim 7, wherein through holes are formed in both of each insulating member and the metal housing, a fastener penetrates the through holes in each insulating member and the metal housing, so that each insulating member is fixedly connected with the metal housing; or a jagged through hole is formed in one of the metal housing and each insulating member, a connecting column is arranged on the other of the metal housing and each insulating member, and the connecting column penetrates the jagged through hole and is limited in the jagged through hole, so that each insulating member is fixedly connected with the metal housing.

17. The housing assembly according to claim 7, wherein a folded plate is arranged on the metal housing, a connecting hole matched with the folded plate is formed in each insulating member, and the folded plate is pressed on each insulating member after penetrating the connecting hole, so that each insulating member is fixedly connected with the metal housing.

18. The housing assembly according to claim 17, wherein a boss is further arranged on each insulating member, the boss is located on an edge of the connecting hole, and the folded plate is firstly bent and pressed on the boss and then is bent and pressed on each insulating member.

* * * * *